(12) United States Patent
Donaldson et al.

(10) Patent No.: US 11,147,296 B2
(45) Date of Patent: Oct. 19, 2021

(54) METHOD FOR PRODUCING BEVERAGES BY ACID REMOVAL

(71) Applicant: Carlsberg Breweries A/S, Copenhagen V (DK)

(72) Inventors: Iain Donaldson, Copenhagen (DK); Zoran Gojkovic, Holte (DK); Pia Vaag, Lyngby (DK)

(73) Assignee: Carlsberg Breweries A/S, Copenhagen V (DK)

( * ) Notice: Subject to any disclaimer, the term of this patent is extended or adjusted under 35 U.S.C. 154(b) by 95 days.

(21) Appl. No.: 16/556,993

(22) Filed: Aug. 30, 2019

(65) Prior Publication Data
US 2020/0045999 A1 Feb. 13, 2020

Related U.S. Application Data

(62) Division of application No. 14/411,474, filed as application No. PCT/DK2013/050215 on Jun. 28, 2013, now Pat. No. 10,440,977.

(30) Foreign Application Priority Data
Jun. 29, 2012 (DK) .......................... PA 2012 70384

(51) Int. Cl.
| A23L 2/78 | (2006.01) |
| A23L 2/38 | (2021.01) |
| A23L 2/74 | (2006.01) |
| B01D 61/44 | (2006.01) |

(52) U.S. Cl.
CPC .............. *A23L 2/78* (2013.01); *A23L 2/382* (2013.01); *A23L 2/74* (2013.01); *B01D 61/44* (2013.01); *A23V 2002/00* (2013.01); *A23Y 2220/81* (2013.01); *A23Y 2240/41* (2013.01); *B01D 2317/04* (2013.01); *B01D 2317/08* (2013.01)

(58) Field of Classification Search
CPC ... A23L 2/78; A23L 2/74; A23L 2/382; B01D 61/44; B01D 2317/04; B01D 2317/08; A23V 2002/00; A23Y 2220/81; A23Y 2240/41
USPC .......................................................... 426/10
See application file for complete search history.

(56) References Cited

U.S. PATENT DOCUMENTS

| 3,165,415 A | * | 1/1965 | Gregor ................. B01D 61/422 426/239 |
| 3,265,607 A | * | 8/1966 | Gregor ...................... A23L 2/74 99/275 |
| 3,935,071 A | | 1/1976 | Bergmeyer et al. |
| 2011/0215000 A1 | * | 9/2011 | Garde .................... B01D 61/58 205/701 |
| 2012/0114791 A1 | | 5/2012 | den et al. |

FOREIGN PATENT DOCUMENTS

| CN | 1148479 A | 4/1997 |
| EP | 0049497 B1 | 4/1985 |
| EP | 0748168 B1 | 10/1998 |
| GB | 1037725 | 8/1966 |
| WO | 1995022911 A1 | 8/1995 |
| WO | 0248044 | 6/2002 |
| WO | 2010025933 A1 | 3/2010 |
| WO | 2010025935 A1 | 3/2010 |

OTHER PUBLICATIONS

Aziz, M. G. et al., "Biotransformation of pineapple juice sugars into dietetic derivatives by using a cell free oxidoreductase from Zymomonas mobilis together with commercial invertase", Enzyme and Microbial Technol. 48:85-91 (2011).
Taylor, J.R.N., "Role of Alpha-Glucosidase in the Fermentable Sugar Composition of Sorghum Malt Mashes", J. Inst. Brew., Nov.-Dec. 1994, 100:417-419.
Vogel, R. F. et al., "Development and potential of starter lactobacilli resulting from exploration of the sourdough ecosystem", Antonie van Leeuwenhoek, 81: 631-638, 2002.
Prosecution history of U.S. Appl. No. 14/411,474.
WIPO machine translation of WO1995022911.
English translation of CN1148479A.

* cited by examiner

*Primary Examiner* — Hamid R Badr
(74) *Attorney, Agent, or Firm* — McNeill Baur PLLC

(57) ABSTRACT

The present application relates to methods for producing beverages with low levels of acids, cations and/or sugars. The methods comprise the step of removing acidic ions through an AX-REED membrane stack and optionally removing cations through a CX-REED membrane stack. In certain embodiments, the AX-REED and the CX-REEF membrane stacks are operated in parallel. The methods may also comprise a step of converting sugar to organic acid, while simultaneously removing the generated organic acid through the AX-REED membrane stack. The sugar may for example be converted with the aid of enzymes and/or microorganisms.

20 Claims, 7 Drawing Sheets

Specification includes a Sequence Listing.

ized in ASCII format and is

SEQUENCE LISTING

<160> NUMBER OF SEQ ID NOS: 12

<210> SEQ ID NO 1
<211> LENGTH: 640
<212> TYPE: PRT
<213> ORGANISM: Aspergillus niger

<400> SEQUENCE: 1

```
Met Ser Phe Arg Ser Leu Leu Ala Leu Ser Gly Leu Val Cys Thr Gly
1               5                   10                  15

Leu Ala Asn Val Ile Ser Lys Arg Ala Thr Leu Asp Ser Trp Leu Ser
            20                  25                  30

Asn Glu Ala Thr Val Ala Arg Thr Ala Ile Leu Asn Asn Ile Gly Ala
        35                  40                  45

Asp Gly Ala Trp Val Ser Gly Ala Asp Ser Gly Ile Val Val Ala Ser
    50                  55                  60

Pro Ser Thr Asp Asn Pro Asp Tyr Phe Tyr Thr Trp Thr Arg Asp Ser
65                  70                  75                  80

Gly Leu Val Leu Lys Thr Leu Val Asp Leu Phe Arg Asn Gly Asp Thr
                85                  90                  95

Ser Leu Leu Ser Thr Ile Glu Asn Tyr Ile Ser Ala Gln Ala Ile Val
            100                 105                 110

Gln Gly Ile Ser Asn Pro Ser Gly Asp Leu Ser Ser Gly Ala Gly Leu
        115                 120                 125

Gly Glu Pro Lys Phe Asn Val Asp Glu Thr Ala Tyr Thr Gly Ser Trp
    130                 135                 140

Gly Arg Pro Gln Arg Asp Gly Pro Ala Leu Arg Ala Thr Ala Met Ile
145                 150                 155                 160

Gly Phe Gly Gln Trp Leu Leu Asp Asn Gly Tyr Thr Ser Thr Ala Thr
                165                 170                 175

Asp Ile Val Trp Pro Leu Val Arg Asn Asp Leu Ser Tyr Val Ala Gln
            180                 185                 190

Tyr Trp Asn Gln Thr Gly Tyr Asp Leu Trp Glu Glu Val Asn Gly Ser
        195                 200                 205

Ser Phe Phe Thr Ile Ala Val Gln His Arg Ala Leu Val Glu Gly Ser
    210                 215                 220

Ala Phe Ala Thr Ala Val Gly Ser Ser Cys Ser Trp Cys Asp Ser Gln
225                 230                 235                 240

Ala Pro Glu Ile Leu Cys Tyr Leu Gln Ser Phe Trp Thr Gly Ser Phe
                245                 250                 255

Ile Leu Ala Asn Phe Asp Ser Ser Arg Ser Gly Lys Asp Ala Asn Thr
            260                 265                 270

Leu Leu Gly Ser Ile His Thr Phe Asp Pro Glu Ala Ala Cys Asp Asp
        275                 280                 285

Ser Thr Phe Gln Pro Cys Ser Pro Arg Ala Leu Ala Asn His Lys Glu
    290                 295                 300

Val Val Asp Ser Phe Arg Ser Ile Tyr Thr Leu Asn Asp Gly Leu Ser
305                 310                 315                 320

Asp Ser Glu Ala Val Ala Val Gly Arg Tyr Pro Glu Asp Thr Tyr Tyr
                325                 330                 335

Asn Gly Asn Pro Trp Phe Leu Cys Thr Leu Ala Ala Ala Glu Gln Leu
            340                 345                 350

Tyr Asp Ala Leu Tyr Gln Trp Asp Lys Gln Gly Ser Leu Glu Val Thr
        355                 360                 365
```

-continued

Asp Val Ser Leu Asp Phe Phe Lys Ala Leu Tyr Ser Asp Ala Ala Thr
    370                 375                 380

Gly Thr Tyr Ser Ser Ser Ser Thr Tyr Ser Ser Ile Val Asp Ala
385                 390                 395                 400

Val Lys Thr Phe Ala Asp Gly Phe Val Ser Ile Val Glu Thr His Ala
                405                 410                 415

Ala Ser Asn Gly Ser Met Ser Glu Gln Tyr Asp Lys Ser Asp Gly Glu
                420                 425                 430

Gln Leu Ser Ala Arg Asp Leu Thr Trp Ser Tyr Ala Ala Leu Leu Thr
                435                 440                 445

Ala Asn Asn Arg Arg Asn Ser Val Val Pro Ala Ser Trp Gly Glu Thr
450                 455                 460

Ser Ala Ser Ser Val Pro Gly Thr Cys Ala Ala Thr Ser Ala Ile Gly
465                 470                 475                 480

Thr Tyr Ser Ser Val Thr Val Thr Ser Trp Pro Ser Ile Val Ala Thr
                485                 490                 495

Gly Gly Thr Thr Thr Ala Thr Pro Thr Gly Ser Gly Ser Val Thr
                500                 505                 510

Ser Thr Ser Lys Thr Thr Ala Thr Ala Ser Lys Thr Ser Thr Ser Thr
                515                 520                 525

Ser Ser Thr Ser Cys Thr Thr Pro Thr Ala Val Ala Val Thr Phe Asp
530                 535                 540

Leu Thr Ala Thr Thr Thr Tyr Gly Glu Asn Ile Tyr Leu Val Gly Ser
545                 550                 555                 560

Ile Ser Gln Leu Gly Asp Trp Glu Thr Ser Asp Gly Ile Ala Leu Ser
                565                 570                 575

Ala Asp Lys Tyr Thr Ser Ser Asp Pro Leu Trp Tyr Val Thr Val Thr
                580                 585                 590

Leu Pro Ala Gly Glu Ser Phe Glu Tyr Lys Phe Ile Arg Ile Glu Ser
                595                 600                 605

Asp Asp Ser Val Glu Trp Glu Ser Asp Pro Asn Arg Glu Tyr Thr Val
                610                 615                 620

Pro Gln Ala Cys Gly Thr Ser Thr Ala Thr Val Thr Asp Thr Trp Arg
625                 630                 635                 640

<210> SEQ ID NO 2
<211> LENGTH: 612
<212> TYPE: PRT
<213> ORGANISM: Aspergillus oryzae

<400> SEQUENCE: 2

Met Val Ser Phe Ser Ser Cys Leu Arg Ala Leu Ala Leu Gly Ser Ser
1               5                   10                  15

Val Leu Ala Val Gln Pro Val Leu Arg Ala Thr Gly Leu Asp Thr
                20                  25                  30

Trp Leu Ser Thr Glu Ala Asn Phe Ser Arg Gln Ala Ile Leu Asn Asn
                35                  40                  45

Ile Gly Ala Asp Gly Gln Ser Ala Gln Gly Ala Ser Pro Gly Val Val
        50                  55                  60

Ile Ala Ser Pro Ser Lys Ser Asp Pro Asp Tyr Phe Tyr Thr Trp Thr
65                  70                  75                  80

Arg Asp Ser Gly Leu Val Met Lys Thr Leu Val Asp Leu Phe Arg Gly
                85                  90                  95

Gly Asp Ala Asp Leu Leu Pro Ile Ile Glu Glu Phe Ile Ser Ser Gln
                100                 105                 110

```
Ala Arg Ile Gln Gly Ile Ser Asn Pro Ser Gly Ala Leu Ser Ser Gly
            115                 120                 125

Gly Leu Gly Glu Pro Lys Phe Asn Val Asp Glu Thr Ala Phe Thr Gly
            130                 135                 140

Ala Trp Gly Arg Pro Gln Arg Asp Gly Pro Ala Leu Arg Ala Thr Ala
145                 150                 155                 160

Met Ile Ser Phe Gly Glu Trp Leu Val Glu Asn Gly His Thr Ser Ile
                165                 170                 175

Ala Thr Asp Leu Val Trp Pro Val Val Arg Asn Asp Leu Ser Tyr Val
            180                 185                 190

Ala Gln Tyr Trp Ser Gln Ser Gly Phe Asp Leu Trp Glu Glu Val Gln
            195                 200                 205

Gly Thr Ser Phe Phe Thr Val Ala Val Ser His Arg Ala Leu Val Glu
            210                 215                 220

Gly Ser Ser Phe Ala Lys Thr Val Gly Ser Ser Cys Pro Tyr Cys Asp
225                 230                 235                 240

Ser Gln Ala Pro Gln Val Arg Cys Tyr Leu Gln Ser Phe Trp Thr Gly
                245                 250                 255

Ser Tyr Ile Gln Ala Asn Phe Gly Gly Gly Arg Ser Gly Lys Asp Ile
            260                 265                 270

Asn Thr Val Leu Gly Ser Ile His Thr Phe Asp Pro Gln Ala Thr Cys
            275                 280                 285

Asp Asp Ala Thr Phe Gln Pro Cys Ser Ala Arg Ala Leu Ala Asn His
290                 295                 300

Lys Val Val Thr Asp Ser Phe Arg Ser Ile Tyr Ala Ile Asn Ser Gly
305                 310                 315                 320

Arg Ala Glu Asn Gln Ala Val Ala Val Gly Arg Tyr Pro Glu Asp Ser
                325                 330                 335

Tyr Tyr Asn Gly Asn Pro Trp Phe Leu Thr Thr Leu Ala Ala Ala Glu
            340                 345                 350

Gln Leu Tyr Asp Ala Leu Tyr Gln Trp Asp Lys Ile Gly Ser Leu Ala
            355                 360                 365

Ile Thr Asp Val Ser Leu Pro Phe Phe Lys Ala Leu Tyr Ser Ser Ala
            370                 375                 380

Ala Thr Gly Thr Tyr Ala Ser Ser Thr Val Tyr Lys Asp Ile Val
385                 390                 395                 400

Ser Ala Val Lys Ala Tyr Ala Asp Gly Tyr Val Gln Ile Val Gln Thr
                405                 410                 415

Tyr Ala Ala Ser Thr Gly Ser Met Ala Glu Gln Tyr Thr Lys Thr Asp
            420                 425                 430

Gly Ser Gln Thr Ser Ala Arg Asp Leu Thr Trp Ser Tyr Ala Ala Leu
            435                 440                 445

Leu Thr Ala Asn Asn Arg Arg Asn Ala Val Val Pro Ala Pro Trp Gly
450                 455                 460

Glu Thr Ala Ala Thr Ser Ile Pro Ser Ala Cys Ser Thr Thr Ser Ala
465                 470                 475                 480

Ser Gly Thr Tyr Ser Ser Val Val Ile Thr Ser Trp Pro Thr Ile Ser
                485                 490                 495

Gly Tyr Pro Gly Ala Pro Asp Ser Pro Cys Gln Val Pro Thr Thr Val
            500                 505                 510

Ser Val Thr Phe Ala Val Lys Ala Thr Thr Val Tyr Gly Glu Ser Ile
            515                 520                 525
```

```
Lys Ile Val Gly Ser Ile Ser Gln Leu Gly Ser Trp Asn Pro Ser Ser
            530                 535                 540

Ala Thr Ala Leu Asn Ala Asp Ser Tyr Thr Thr Asp Asn Pro Leu Trp
545                 550                 555                 560

Thr Gly Thr Ile Asn Leu Pro Ala Gly Gln Ser Phe Glu Tyr Lys Phe
                    565                 570                 575

Ile Arg Val Gln Asn Gly Ala Val Thr Trp Glu Ser Asp Pro Asn Arg
                580                 585                 590

Lys Tyr Thr Val Pro Ser Thr Cys Gly Val Lys Ser Ala Val Gln Ser
                595                 600                 605

Asp Val Trp Arg
    610

<210> SEQ ID NO 3
<211> LENGTH: 604
<212> TYPE: PRT
<213> ORGANISM: Rhizopus oryzae

<400> SEQUENCE: 3

Met Gln Leu Phe Asn Leu Pro Leu Lys Val Ser Phe Leu Val Leu
1                5                  10                  15

Ser Tyr Phe Ser Leu Leu Val Ser Ala Ala Ser Ile Pro Ser Ser Ala
                20                  25                  30

Ser Val Gln Leu Asp Ser Tyr Asn Tyr Asp Gly Ser Thr Phe Ser Gly
            35                  40                  45

Lys Ile Tyr Val Lys Asn Ile Ala Tyr Ser Lys Lys Val Thr Val Ile
    50                  55                  60

Tyr Ala Asp Gly Ser Asp Asn Trp Asn Asn Asn Gly Asn Thr Ile Ala
65                  70                  75                  80

Ala Ser Tyr Ser Ala Pro Ile Ser Gly Ser Asn Tyr Glu Tyr Trp Thr
                85                  90                  95

Phe Ser Ala Ser Ile Asn Gly Ile Lys Glu Phe Tyr Ile Lys Tyr Glu
                100                 105                 110

Val Ser Gly Lys Thr Tyr Tyr Asp Asn Asn Ser Ala Asn Tyr Gln
            115                 120                 125

Val Ser Thr Ser Lys Pro Thr Thr Thr Ala Thr Ala Thr Thr Thr
            130                 135                 140

Thr Ala Pro Ser Thr Ser Thr Thr Pro Pro Ser Arg Ser Glu Pro
145                 150                 155                 160

Ala Thr Phe Pro Thr Gly Asn Ser Thr Ile Ser Ser Trp Ile Lys Lys
                165                 170                 175

Gln Glu Gly Ile Ser Arg Phe Ala Met Leu Arg Asn Ile Asn Pro Pro
                180                 185                 190

Gly Ser Ala Thr Gly Phe Ile Ala Ala Ser Leu Ser Thr Ala Gly Pro
                195                 200                 205

Asp Tyr Tyr Tyr Ala Trp Thr Arg Asp Ala Ala Leu Thr Ser Asn Val
    210                 215                 220

Ile Val Tyr Glu Tyr Asn Thr Thr Leu Ser Gly Asn Lys Thr Ile Leu
225                 230                 235                 240

Asn Val Leu Lys Asp Tyr Val Thr Phe Ser Val Lys Thr Gln Ser Thr
                245                 250                 255

Ser Thr Val Cys Asn Cys Leu Gly Glu Pro Lys Phe Asn Pro Asp Ala
                260                 265                 270

Ser Gly Tyr Thr Gly Ala Trp Gly Arg Pro Gln Asn Asp Gly Pro Ala
            275                 280                 285
```

```
Glu Arg Ala Thr Thr Phe Ile Leu Phe Ala Asp Ser Tyr Leu Thr Gln
    290                 295                 300

Thr Lys Asp Ala Ser Tyr Val Thr Gly Thr Leu Lys Pro Ala Ile Phe
305                 310                 315                 320

Lys Asp Leu Asp Tyr Val Val Asn Val Trp Ser Asn Gly Cys Phe Asp
                325                 330                 335

Leu Trp Glu Glu Val Asn Gly Val His Phe Tyr Thr Leu Met Val Met
            340                 345                 350

Arg Lys Gly Leu Leu Gly Ala Asp Phe Ala Lys Arg Asn Gly Asp
        355                 360                 365

Ser Thr Arg Ala Ser Thr Tyr Ser Ser Thr Ala Ser Thr Ile Ala Asn
    370                 375                 380

Lys Ile Ser Ser Phe Trp Val Ser Ser Asn Asn Trp Ile Gln Val Ser
385                 390                 395                 400

Gln Ser Val Thr Gly Val Ser Lys Lys Gly Leu Asp Val Ser Thr
                405                 410                 415

Leu Leu Ala Ala Asn Leu Gly Ser Val Asp Asp Gly Phe Phe Thr Pro
                420                 425                 430

Gly Ser Glu Lys Ile Leu Ala Thr Ala Val Ala Val Glu Asp Ser Phe
            435                 440                 445

Ala Ser Leu Tyr Pro Ile Asn Lys Asn Leu Pro Ser Tyr Leu Gly Asn
450                 455                 460

Ser Ile Gly Arg Tyr Pro Glu Asp Thr Tyr Asn Gly Asn Gly Asn Ser
465                 470                 475                 480

Gln Gly Asn Ser Trp Phe Leu Ala Val Thr Gly Tyr Ala Glu Leu Tyr
                485                 490                 495

Tyr Arg Ala Ile Lys Glu Trp Ile Gly Asn Gly Gly Val Thr Val Ser
            500                 505                 510

Ser Ile Ser Leu Pro Phe Phe Lys Lys Phe Asp Ser Ser Ala Thr Ser
    515                 520                 525

Gly Lys Lys Tyr Thr Val Gly Thr Ser Asp Phe Asn Asn Leu Ala Gln
530                 535                 540

Asn Ile Ala Leu Ala Ala Asp Arg Phe Leu Ser Thr Val Gln Leu His
545                 550                 555                 560

Ala His Asn Asn Gly Ser Leu Ala Glu Glu Phe Asp Arg Thr Thr Gly
                565                 570                 575

Leu Ser Thr Gly Ala Arg Asp Leu Thr Trp Ser His Ala Ser Leu Ile
            580                 585                 590

Thr Ala Ser Tyr Ala Lys Ala Gly Ala Pro Ala Ala
    595                 600

<210> SEQ ID NO 4
<211> LENGTH: 484
<212> TYPE: PRT
<213> ORGANISM: Aspergillus niger

<400> SEQUENCE: 4

Leu Ser Ala Ala Ser Trp Arg Thr Gln Ser Ile Tyr Phe Leu Leu Thr
1               5                   10                  15

Asp Arg Phe Gly Arg Thr Asp Asn Ser Thr Thr Ala Thr Cys Asn Thr
                20                  25                  30

Gly Asn Glu Ile Tyr Cys Gly Gly Ser Trp Gln Gly Ile Ile Asp His
            35                  40                  45

Leu Asp Tyr Ile Glu Gly Met Gly Phe Thr Ala Ile Trp Ile Ser Pro
```

-continued

```
            50                  55                  60
Ile Thr Glu Gln Leu Pro Gln Asp Thr Ala Asp Gly Glu Ala Tyr His
 65                  70                  75                  80

Gly Tyr Trp Gln Gln Lys Ile Tyr Asp Val Asn Ser Asn Phe Gly Thr
                 85                  90                  95

Ala Asp Asn Leu Lys Ser Leu Ser Asp Ala Leu His Ala Arg Gly Met
            100                 105                 110

Tyr Leu Met Val Asp Val Val Pro Asp His Met Gly Tyr Ala Gly Asn
            115                 120                 125

Gly Asn Asp Val Asp Tyr Ser Val Phe Asp Pro Phe Asp Ser Ser Ser
130                 135                 140

Tyr Phe His Pro Tyr Cys Leu Ile Thr Asp Trp Asp Asn Leu Thr Met
145                 150                 155                 160

Val Glu Asp Cys Trp Glu Gly Asp Thr Ile Val Ser Leu Pro Asp Leu
                165                 170                 175

Asp Thr Thr Glu Thr Ala Val Arg Thr Ile Trp Tyr Asp Trp Val Ala
            180                 185                 190

Asp Leu Val Ser Asn Tyr Ser Val Asp Gly Leu Arg Ile Asp Ser Val
            195                 200                 205

Leu Glu Val Gln Pro Asp Phe Phe Pro Gly Tyr Asn Lys Ala Ser Gly
210                 215                 220

Val Tyr Cys Val Gly Glu Ile Asp Asn Gly Asn Pro Ala Ser Asp Cys
225                 230                 235                 240

Pro Tyr Gln Lys Val Leu Asp Gly Val Leu Asn Tyr Pro Ile Tyr Trp
                245                 250                 255

Gln Leu Leu Tyr Ala Phe Glu Ser Ser Gly Ser Ile Ser Asn Leu
                260                 265                 270

Tyr Asn Met Ile Lys Ser Val Ala Ser Asp Cys Ser Asp Pro Thr Leu
            275                 280                 285

Leu Gly Asn Phe Ile Glu Asn His Asp Asn Pro Arg Phe Ala Lys Tyr
            290                 295                 300

Thr Ser Asp Tyr Ser Gln Ala Lys Asn Val Leu Ser Tyr Ile Phe Leu
305                 310                 315                 320

Ser Asp Gly Ile Pro Ile Val Tyr Ala Gly Glu Gln His Tyr Ala
                325                 330                 335

Gly Gly Lys Val Pro Tyr Asn Arg Glu Ala Thr Trp Leu Ser Gly Tyr
            340                 345                 350

Asp Thr Ser Ala Glu Leu Tyr Thr Trp Ile Ala Thr Asn Ala Ile
            355                 360                 365

Arg Lys Leu Ala Ile Ala Ala Asp Ser Ala Tyr Ile Thr Tyr Ala Asn
            370                 375                 380

Asp Ala Phe Tyr Thr Asp Ser Asn Thr Ile Ala Met Ala Lys Gly Thr
385                 390                 395                 400

Ser Gly Ser Gln Val Ile Thr Val Leu Ser Asn Lys Gly Ser Ser Gly
                405                 410                 415

Ser Ser Tyr Thr Leu Thr Leu Ser Gly Ser Gly Tyr Thr Ser Gly Thr
            420                 425                 430

Lys Leu Ile Glu Ala Tyr Thr Cys Thr Ser Val Thr Val Asp Ser Ser
            435                 440                 445

Gly Asp Ile Pro Val Pro Met Ala Ser Gly Leu Pro Arg Val Leu Leu
450                 455                 460

Pro Ala Ser Val Val Asp Ser Ser Ser Leu Cys Gly Gly Ser Gly Arg
465                 470                 475                 480
```

Leu Tyr Val Glu

<210> SEQ ID NO 5
<211> LENGTH: 499
<212> TYPE: PRT
<213> ORGANISM: Aspergillus oryzae

<400> SEQUENCE: 5

Met Met Val Ala Trp Trp Ser Leu Phe Leu Tyr Gly Leu Gln Val Ala
1               5                   10                  15

Ala Pro Ala Leu Ala Ala Thr Pro Ala Asp Trp Arg Ser Gln Ser Ile
            20                  25                  30

Tyr Phe Leu Leu Thr Asp Arg Phe Ala Arg Thr Asp Gly Ser Thr Thr
        35                  40                  45

Ala Thr Cys Asn Thr Ala Asp Arg Lys Tyr Cys Gly Gly Thr Trp Gln
    50                  55                  60

Gly Ile Ile Asp Lys Leu Asp Tyr Ile Gln Gly Met Gly Phe Thr Ala
65                  70                  75                  80

Ile Trp Ile Thr Pro Val Thr Ala Gln Leu Pro Gln Thr Thr Ala Tyr
                85                  90                  95

Gly Asp Ala Tyr His Gly Tyr Trp Gln Gln Asp Ile Tyr Ser Leu Asn
            100                 105                 110

Glu Asn Tyr Gly Thr Ala Asp Asp Leu Lys Ala Leu Ser Ser Ala Leu
        115                 120                 125

His Glu Arg Gly Met Tyr Leu Met Val Asp Val Val Ala Asn His Met
130                 135                 140

Gly Tyr Asp Gly Ala Gly Ser Ser Val Asp Tyr Ser Val Phe Lys Pro
145                 150                 155                 160

Phe Ser Ser Gln Asp Tyr Phe His Pro Phe Cys Leu Ile Gln Asn Tyr
                165                 170                 175

Glu Asp Gln Thr Gln Val Glu Asp Cys Trp Leu Gly Asp Asn Thr Val
            180                 185                 190

Ser Leu Pro Asp Leu Asp Thr Thr Lys Asp Val Val Lys Asn Glu Trp
        195                 200                 205

Tyr Asp Trp Val Gly Ser Leu Val Ser Asn Tyr Ser Ile Asp Gly Leu
210                 215                 220

Arg Ile Asp Thr Val Lys His Val Gln Lys Asp Phe Trp Pro Gly Tyr
225                 230                 235                 240

Asn Lys Ala Ala Gly Val Tyr Cys Ile Gly Glu Val Leu Asp Gly Asp
                245                 250                 255

Pro Ala Tyr Thr Cys Pro Tyr Gln Asn Val Met Asp Gly Val Leu Asn
            260                 265                 270

Tyr Pro Ile Tyr Tyr Pro Leu Leu Asn Ala Phe Lys Ser Thr Ser Gly
        275                 280                 285

Ser Met Asp Asp Leu Tyr Asn Met Ile Asn Thr Val Lys Ser Asp Cys
290                 295                 300

Pro Asp Ser Thr Leu Leu Gly Thr Phe Val Glu Asn His Asp Asn Pro
305                 310                 315                 320

Arg Phe Ala Ser Tyr Thr Asn Asp Ile Ala Leu Ala Lys Asn Val Ala
                325                 330                 335

Ala Phe Ile Ile Leu Asn Asp Gly Ile Pro Ile Ile Tyr Ala Gly Gln
            340                 345                 350

Glu Gln His Tyr Ala Gly Gly Asn Asp Pro Ala Asn Arg Glu Ala Thr
        355                 360                 365

Trp Leu Ser Gly Tyr Pro Thr Asp Ser Glu Leu Tyr Lys Leu Ile Ala
        370                 375                 380

Ser Ala Asn Ala Ile Arg Asn Tyr Ala Ile Ser Lys Asp Thr Gly Phe
385                 390                 395                 400

Val Thr Tyr Lys Asn Trp Pro Ile Tyr Lys Asp Asp Thr Thr Ile Ala
                405                 410                 415

Met Arg Lys Gly Thr Asp Gly Ser Gln Ile Val Thr Ile Leu Ser Asn
            420                 425                 430

Lys Gly Ala Ser Gly Asp Ser Tyr Thr Leu Ser Leu Ser Gly Ala Gly
                435                 440                 445

Tyr Thr Ala Gly Gln Gln Leu Thr Glu Val Ile Gly Cys Thr Thr Val
        450                 455                 460

Thr Val Gly Ser Asp Gly Asn Val Pro Val Pro Met Ala Gly Gly Leu
465                 470                 475                 480

Pro Arg Val Leu Tyr Pro Thr Glu Lys Leu Ala Gly Ser Lys Ile Cys
                485                 490                 495

Ser Ser Ser

<210> SEQ ID NO 6
<211> LENGTH: 462
<212> TYPE: PRT
<213> ORGANISM: Rhizopus oryzae

<400> SEQUENCE: 6

Met Lys Ser Phe Leu Ser Leu Leu Cys Ser Val Phe Leu Leu Pro Leu
1               5                   10                  15

Val Val Gln Ser Val Pro Val Ile Lys Arg Ala Ser Ala Ser Asp Trp
                20                  25                  30

Glu Asn Arg Val Ile Tyr Gln Leu Leu Thr Asp Arg Phe Ala Lys Ser
            35                  40                  45

Thr Asp Asp Thr Asn Gly Cys Ser Asn Leu Ser Asp Tyr Cys Gly Gly
        50                  55                  60

Thr Phe Gln Gly Ile Ile Asn His Leu Asp Tyr Ile Ala Gly Met Gly
65                  70                  75                  80

Phe Asp Ala Ile Trp Ile Ser Pro Ile Pro Lys Asn Val Asn Gly Gly
                85                  90                  95

Tyr His Gly Tyr Trp Ala Ser Asp Phe Ser Gln Ile Asn Glu His Phe
            100                 105                 110

Gly Thr Ala Asp Asp Leu Lys Lys Leu Val Ala Ala His Ala Lys
        115                 120                 125

Asn Met Tyr Val Met Leu Asp Val Val Ala Asn His Ala Gly Thr Pro
130                 135                 140

Ser Ser Gly Gly Asp Tyr Ser Gly Tyr Thr Phe Gly Gln Ser Ser Glu
145                 150                 155                 160

Tyr His Arg Ala Cys Asp Ile Asn Tyr Asn Asp Gln Asn Ser Ile Glu
                165                 170                 175

Gln Cys Trp Ile Ser Gly Leu Pro Asp Ile Asn Thr Glu Asp Ser Ala
            180                 185                 190

Ile Val Ser Lys Leu Asn Ser Ile Val Ser Gly Trp Val Ser Asp Tyr
        195                 200                 205

Gly Phe Asp Gly Leu Arg Ile Asp Thr Val Lys His Val Arg Lys Asp
    210                 215                 220

Phe Trp Asp Gly Tyr Val Ser Ala Ala Gly Val Phe Ala Thr Gly Glu
225                 230                 235                 240

Val Leu Ser Gly Asp Val Ser Tyr Val Ser Pro Tyr Gln His Val
            245                 250                 255

Pro Ser Leu Ile Asn Tyr Pro Leu Tyr Tyr Pro Val Tyr Asp Val Phe
            260                 265                 270

Thr Lys Ser Arg Thr Met Ser Arg Leu Ser Ser Gly Phe Ser Asp Ile
            275                 280                 285

Lys Asn Gly Asn Phe Lys Asn Ile Asp Val Leu Val Asn Phe Ile Asp
            290                 295                 300

Asn His Asp Gln Pro Arg Leu Leu Ser Lys Ala Asp Gln Ser Leu Val
305                 310                 315                 320

Lys Asn Ala Leu Ala Tyr Ser Phe Met Val Gln Gly Ile Pro Val Leu
            325                 330                 335

Tyr Tyr Gly Thr Glu Gln Ser Phe Lys Gly Gly Asn Asp Pro Asn Asn
            340                 345                 350

Arg Glu Val Leu Trp Thr Thr Gly Tyr Ser Thr Thr Ser Asp Met Tyr
            355                 360                 365

Lys Phe Val Thr Thr Leu Val Lys Ala Arg Lys Gly Ser Asn Ser Thr
            370                 375                 380

Val Asn Met Gly Ile Ala Gln Thr Asp Asn Val Tyr Val Phe Gln Arg
385                 390                 395                 400

Gly Gly Ser Leu Val Val Asn Asn Tyr Gly Gln Gly Ser Thr Asn
            405                 410                 415

Thr Ile Thr Val Lys Ala Gly Ser Phe Ser Asn Gly Asp Thr Leu Thr
            420                 425                 430

Asp Val Phe Ser Asn Lys Ser Val Thr Val Gln Asn Asn Gln Ile Thr
            435                 440                 445

Phe Gln Leu Gln Asn Gly Asn Pro Ala Ile Phe Gln Lys Asn
            450                 455                 460

<210> SEQ ID NO 7
<211> LENGTH: 718
<212> TYPE: PRT
<213> ORGANISM: Bacillus subtilis

<400> SEQUENCE: 7

Met Val Ser Ile Arg Arg Ser Phe Glu Ala Tyr Val Asp Asp Met Asn
1               5                   10                  15

Ile Ile Thr Val Leu Ile Pro Ala Glu Gln Lys Glu Ile Met Thr Pro
            20                  25                  30

Pro Phe Arg Leu Glu Thr Glu Ile Thr Asp Phe Pro Leu Ala Val Arg
            35                  40                  45

Glu Glu Tyr Ser Leu Glu Ala Lys Tyr Lys Tyr Val Cys Val Ser Asp
            50                  55                  60

His Pro Val Thr Phe Gly Lys Ile His Cys Val Arg Ala Ser Ser Gly
65                  70                  75                  80

His Lys Thr Asp Leu Gln Ile Gly Ala Val Ile Arg Thr Ala Ala Phe
            85                  90                  95

Asp Asp Glu Phe Tyr Tyr Asp Gly Glu Leu Gly Ala Val Tyr Thr Ala
            100                 105                 110

Asp His Thr Val Phe Lys Val Trp Ala Pro Ala Ala Thr Ser Ala Ala
            115                 120                 125

Val Lys Leu Ser His Pro Asn Lys Ser Gly Arg Thr Phe Gln Met Thr
            130                 135                 140

Arg Leu Glu Lys Gly Val Tyr Ala Val Thr Val Thr Gly Asp Leu His

```
            145                 150                 155                 160
Gly Tyr Glu Tyr Leu Phe Cys Ile Cys Asn Asn Ser Glu Trp Met Glu
                165                 170                 175

Thr Val Asp Gln Tyr Ala Lys Ala Val Thr Val Asn Gly Glu Lys Gly
                180                 185                 190

Val Val Leu Arg Pro Asp Gln Met Lys Trp Thr Ala Pro Leu Lys Pro
                195                 200                 205

Phe Ser His Pro Val Asp Ala Val Ile Tyr Glu Thr His Leu Arg Asp
                210                 215                 220

Phe Ser Ile His Glu Asn Ser Gly Met Ile Asn Lys Gly Lys Tyr Leu
225                 230                 235                 240

Ala Leu Thr Glu Thr Asp Thr Gln Thr Ala Asn Gly Ser Ser Ser Gly
                245                 250                 255

Leu Ala Tyr Val Lys Glu Leu Gly Val Thr His Val Glu Leu Leu Pro
                260                 265                 270

Val Asn Asp Phe Ala Gly Val Asp Glu Glu Lys Pro Leu Asp Ala Tyr
                275                 280                 285

Asn Trp Gly Tyr Asn Pro Leu His Phe Phe Ala Pro Glu Gly Ser Tyr
                290                 295                 300

Ala Ser Asn Pro His Asp Pro Gln Thr Arg Lys Thr Glu Leu Lys Gln
305                 310                 315                 320

Met Ile Asn Thr Leu His Gln His Gly Leu Arg Val Ile Leu Asp Val
                325                 330                 335

Val Phe Asn His Val Tyr Lys Arg Glu Asn Ser Pro Phe Glu Lys Thr
                340                 345                 350

Val Pro Gly Tyr Phe Phe Arg His Asp Glu Cys Gly Met Pro Ser Asn
                355                 360                 365

Gly Thr Gly Val Gly Asn Asp Ile Ala Ser Glu Arg Arg Met Ala Arg
                370                 375                 380

Lys Phe Ile Ala Asp Cys Val Val Tyr Trp Leu Glu Glu Tyr Asn Val
385                 390                 395                 400

Asp Gly Phe Arg Phe Asp Leu Leu Gly Ile Leu Asp Ile Asp Thr Val
                405                 410                 415

Leu Tyr Met Lys Glu Lys Ala Thr Lys Ala Lys Pro Gly Ile Leu Leu
                420                 425                 430

Phe Gly Glu Gly Trp Asp Leu Ala Thr Pro Leu Pro His Glu Gln Lys
                435                 440                 445

Ala Ala Leu Ala Asn Ala Pro Arg Met Pro Gly Ile Gly Phe Phe Asn
450                 455                 460

Asp Met Phe Arg Asp Ala Val Lys Gly Asn Thr Phe His Leu Lys Ala
465                 470                 475                 480

Thr Gly Phe Ala Leu Gly Asn Gly Glu Ser Ala Gln Ala Val Met His
                485                 490                 495

Gly Ile Ala Gly Ser Ser Gly Trp Lys Ala Leu Ala Pro Ile Val Pro
                500                 505                 510

Glu Pro Ser Gln Ser Ile Asn Tyr Val Glu Ser His Asp Asn His Thr
                515                 520                 525

Phe Trp Asp Lys Met Ser Phe Ala Leu Pro Gln Glu Asn Asp Ser Arg
                530                 535                 540

Lys Arg Ser Arg Gln Arg Leu Ala Ala Ile Ile Leu Leu Ala Gln
545                 550                 555                 560

Gly Val Pro Phe Ile His Ser Gly Gln Glu Phe Phe Arg Thr Lys Gln
                565                 570                 575
```

Gly Val Glu Asn Ser Tyr Gln Ser Ser Asp Ser Ile Asn Gln Leu Asp
580 585 590

Trp Asp Arg Arg Glu Thr Phe Lys Glu Asp Val His Tyr Ile Arg Arg
595 600 605

Leu Ile Ser Leu Arg Lys Ala His Pro Ala Phe Arg Leu Arg Ser Ala
610 615 620

Ala Asp Ile Gln Arg His Leu Glu Cys Leu Thr Leu Lys Glu His Leu
625 630 635 640

Ile Ala Tyr Arg Leu Tyr Asp Leu Asp Glu Val Asp Glu Trp Lys Asp
645 650 655

Ile Ile Val Ile His His Ala Ser Pro Asp Ser Val Glu Trp Arg Leu
660 665 670

Pro Asn Asp Ile Pro Tyr Arg Leu Leu Cys Asp Pro Ser Gly Phe Gln
675 680 685

Glu Asp Pro Thr Glu Ile Lys Lys Thr Val Ala Val Asn Gly Ile Gly
690 695 700

Thr Val Ile Leu Tyr Leu Ala Ser Asp Leu Lys Ser Phe Ala
705 710 715

<210> SEQ ID NO 8
<211> LENGTH: 850
<212> TYPE: PRT
<213> ORGANISM: Bacillus cereus (strain ZK / E33L)

<400> SEQUENCE: 8

Met Thr Lys Arg Leu Ile Asn Lys Ser Val Leu Leu Leu Thr Ile Ile
1 5 10 15

Val Met Leu Ser Ser Val Tyr Ser Phe Gln Asn Val Lys Ala Val Ser
20 25 30

Asn Ser Lys Thr Thr Glu Val Ile Ile His Tyr Lys Glu Gln Ser Gly
35 40 45

Asn Thr Lys Asp Trp Asn Leu Trp Ile Trp Gly Glu Asn Ser Asn Gly
50 55 60

Lys Ser Tyr Glu Phe Thr Gly Glu Asp Glu Phe Gly Lys Tyr Ala Lys
65 70 75 80

Ile Asn Ile Asp Gly Asp Tyr Asn Arg Leu Gly Phe Ile Ile Arg Thr
85 90 95

Ser Glu Trp Glu Lys Asp Gly Gly Asp Arg Trp Ile Glu Asn Ile Lys
100 105 110

Asp Gly Arg Ala Glu Val Trp Ile Leu Ser Gly Asp Glu Lys Val Tyr
115 120 125

Asn Ser Lys Pro Ser Ser Asp Leu Ser Ile Gln Lys Ala Thr Ile Asp
130 135 140

Ser Phe His Glu Ile Thr Val Thr Thr Asn Val Pro Phe His Ile Lys
145 150 155 160

Glu Lys Lys Ile Glu Met Glu Gly Ile Lys Ile Lys Ser Ile Ser Pro
165 170 175

Tyr Asp Ile Asn Ser Gly Asp Ile Thr Asn Lys Val Lys Ile Ile Thr
180 185 190

Asp Gln Lys Ile Asp Leu Lys Gln Thr Tyr Lys Val Lys Ile Glu Asn
195 200 205

Leu Ala Asp Thr Asn Thr Glu Ile Gly Lys Val Ile Arg Thr Glu Glu
210 215 220

Phe Asp Lys Leu Phe Tyr Tyr Gly Gly Asn Asp Leu Gly Asn Ile Tyr

-continued

```
            225                 230                 235                 240

Thr Pro Gln His Thr Lys Phe Arg Val Trp Ala Pro Thr Ala Ser Glu
                        245                 250                 255

Ala Lys Leu Val Thr Tyr Lys Lys Trp Asn Asp Lys Ile Gly Thr Glu
                        260                 265                 270

Ile Asn Met Gln Gln Gly Glu Gly Thr Trp Lys Ala Glu Leu Lys
                        275                 280                 285

Gly Asn Gln Lys Gly Leu Tyr Tyr Thr Tyr Lys Val Lys Ile Gly Asp
                        290                 295                 300

Lys Trp Thr Glu Ala Val Asp Pro Tyr Ala Arg Ala Ala Ser Val Asn
        305                 310                 315                 320

Gly Asp Lys Gly Ala Val Val Asp Leu Glu Thr Asn Pro Lys Arg
                        325                 330                 335

Trp Asn Thr Asn Lys Lys Pro Lys Leu Lys Asn Pro Glu Asp Ala Ile
                        340                 345                 350

Ile Tyr Glu Leu His Val Arg Asp Leu Ser Ile Gln Pro Glu Ser Gly
                        355                 360                 365

Ile Lys Gln Lys Gly Lys Tyr Leu Gly Val Thr Glu Lys Gly Thr Lys
                        370                 375                 380

Gly Pro Glu Gly Val Lys Thr Gly Leu Asp His Met Lys Asp Leu Gly
        385                 390                 395                 400

Val Thr His Val Gln Leu Leu Pro Ile Phe Asp Tyr Ala Ser Val Asn
                        405                 410                 415

Glu Glu Lys Val Asn Glu Pro Gln Tyr Asn Trp Gly Tyr Asp Pro Lys
                        420                 425                 430

Asn Phe Asn Val Pro Glu Gly Ser Tyr Ser Thr Asn Pro Tyr Glu Pro
                        435                 440                 445

Thr Val Arg Ile Thr Glu Leu Lys Gln Met Ile Gln Thr Leu His Asp
                        450                 455                 460

Asn Asn Leu Arg Val Val Met Asp Val Val Tyr Asn His Met Tyr Asn
        465                 470                 475                 480

Ala Ala Glu Ser Asn Phe His Lys Leu Val Pro Gly Tyr Tyr Arg
                        485                 490                 495

Tyr Asn Glu Asp Gly Thr Phe Ala Asn Gly Thr Gly Val Gly Asn Asp
                        500                 505                 510

Thr Ala Ser Glu Arg Lys Met Met Arg Lys Phe Met Ile Asp Ser Val
                        515                 520                 525

Thr Tyr Trp Ala Lys Glu Tyr Asn Leu Asp Gly Phe Arg Phe Asp Leu
                        530                 535                 540

Met Gly Ile His Asp Tyr Glu Thr Met Asn Glu Ile Arg Lys Ala Val
        545                 550                 555                 560

Asn Gln Ile Asp Pro Ser Ile Ile Leu His Gly Glu Gly Trp Asp Leu
                        565                 570                 575

Asn Thr Pro Leu Ala Ala Glu Leu Lys Ala Asn Gln Lys Asn Ala Glu
                        580                 585                 590

Lys Met Lys Gly Ile Ala His Phe Asn Asp Asn Ile Arg Asp Gly Leu
                        595                 600                 605

Lys Gly Ser Val Phe Glu Lys Glu Asn Gly Phe Val Asn Gly Lys
                        610                 615                 620

Glu Asn Met Glu Asp Arg Ile Lys Lys Gly Ile Thr Ala Gly Ile Asp
        625                 630                 635                 640

Tyr Asp Thr Asn Ser Ser Thr Tyr Leu Asp Pro Glu Gln Val Leu Thr
                        645                 650                 655
```

```
Tyr Val Glu Ala His Asp Asn His Thr Leu Trp Asp Lys Leu Glu Leu
            660             665             670

Thr Asn Pro Gly Asp Ser Glu Ala Arg Lys Gln Met His Lys Leu
            675             680             685

Ser Ser Ser Ile Leu Leu Thr Ser Gln Gly Ile Pro Phe Leu His Ala
690             695             700

Gly Gln Glu Phe Met Arg Thr Lys Tyr Gly Asp His Asn Ser Tyr Lys
705             710             715             720

Ser Pro Asp Ser Ile Asn Gln Met Asp Trp Leu Arg Arg Ala Ala Phe
            725             730             735

Asn Asn Glu Val Asp Tyr Met Lys Gly Leu Ile Glu Leu Arg Lys Lys
            740             745             750

Tyr Pro Ala Phe Arg Met Thr Ser Ala Glu Gln Ile Lys Thr His Val
            755             760             765

Ser Phe Ile Asp Ala Pro Lys Asn Thr Val Ala Tyr Thr Ile Glu Gly
            770             775             780

Asn Lys Asn Glu Tyr Phe Thr Val Ala His Asn Ala Asn Arg Glu Ser
785             790             795             800

Val Glu Ile Ser Leu Pro Ser Lys Gly Pro Trp Lys Val Leu Val Asp
            805             810             815

Gly Lys Gln Ala Gly Ser Lys Pro Leu Tyr Val Val His Asp Asn Lys
            820             825             830

Ile Lys Val Pro Ala Leu Ser Ser Leu Val Leu Lys Thr Glu Lys Pro
            835             840             845

Ile Lys
    850

<210> SEQ ID NO 9
<211> LENGTH: 589
<212> TYPE: PRT
<213> ORGANISM: Lactobacillus acidophilus (strain ATCC 700396 / NCK56 /
      N2 / NCFM)

<400> SEQUENCE: 9

Met Lys Ile Thr Tyr Asp Ser Trp Gln Glu Gln Tyr Lys Asn Pro Phe
1               5                   10                  15

Gly Ala Val Lys Ala Gly Asn Thr Val Lys Trp Ser Ile Lys Ile Asp
            20                  25                  30

Gln Val Ile Gln Gly Ala Val Leu Trp Leu Thr Lys Ser Arg Glu Thr
        35                  40                  45

Pro Val Ala Tyr Pro Met Asn Tyr Asp Glu Gln Thr Lys Met Tyr Thr
    50                  55                  60

Thr Gln Val Lys Ile Gly Thr Ser Gly Leu Tyr Asn Tyr Tyr Phe Ala
65                  70                  75                  80

Leu Gln Gln Asn Asn Gln Ile Val Tyr Ile Asp Gln Gly Leu Phe Gly
                85                  90                  95

Lys Gly His Val Thr Lys Ser Asp His Asp Leu Arg Gln Phe Gln Leu
            100                 105                 110

Thr Cys Tyr Asp Ile Ala Thr Pro Arg Ile Asp Trp Tyr Gln Lys Gly
        115                 120                 125

Ile Val Tyr Gln Ile Phe Pro Asp Arg Phe Ala Asn Gly Asn Pro Tyr
    130                 135                 140

Glu Glu Val Ile Gly Lys Lys Arg Asn Ser Phe Ile Tyr Ala Thr Lys
145                 150                 155                 160
```

```
Glu Asp Ile Pro Tyr Tyr Ile Lys Asn Ser Glu Gly Ala Ile Val Arg
            165                 170                 175
Trp Asp Phe Phe Gly Gly Asn Leu Thr Gly Ile Arg Lys Lys Ile Pro
            180                 185                 190
Tyr Leu Lys Gln Leu Gly Val Thr Val Leu Tyr Leu Asn Pro Ile Phe
            195                 200                 205
Leu Ala Lys Ser Asn His Arg Tyr Asp Thr Thr Asp Phe Met Lys Ile
            210                 215                 220
Asp Pro Met Leu Gly Asp Glu Lys Asp Leu Ala Asp Leu Ile Arg Glu
225                 230                 235                 240
Leu His Glu Asn Asn Met His Leu Ile Leu Asp Gly Val Phe Asn His
                245                 250                 255
Val Gly Phe Asp Ser Ile Tyr Phe Gln Gly Ala Ile Thr Asp Lys Asn
                260                 265                 270
Ser Asn Tyr Arg Ser Trp Phe Asn Phe Gln Asp Tyr Pro Asn Lys Tyr
            275                 280                 285
Gln Ser Trp Trp Gly Val Lys Ser Leu Pro Thr Val Asn Lys Asp Asn
            290                 295                 300
Ser Glu Tyr Gln Asn Leu Val Tyr Gly Asp His Gly Val Leu Ala Lys
305                 310                 315                 320
Trp Lys Val Asp Gly Trp Arg Leu Asp Val Ala Asp Glu Leu Pro Met
                325                 330                 335
Asp Phe Leu Arg Asn Ile Arg Asn Arg Leu Ile Lys Glu Asn Cys Pro
                340                 345                 350
Ile Leu Ile Gly Glu Val Trp Glu Asp Ala Ser Asn Lys Phe Val Asn
            355                 360                 365
Gly Glu Tyr Arg Thr Tyr Thr Ala Gly Asp Asn Leu Met Gly Val Met
            370                 375                 380
Asn Tyr Pro Ile Arg Asn Phe Ile Ile Ser Leu Leu Ser Ala Gln Asp
385                 390                 395                 400
Ser Thr Ile Glu Ile Glu Ala Met Asn Asp Leu Ala Leu Leu Ile Glu
                405                 410                 415
Asn Tyr Pro Thr Asp Phe Leu His Asn Cys Leu Asn Asn Ile Gly Thr
                420                 425                 430
His Asp Thr Val Arg Ile Lys Thr Val Leu Asn Lys Asn Asp Asn Leu
            435                 440                 445
Val Met Met Ala Phe Gly Leu Leu Phe Met Met Pro Gly Val Pro Cys
450                 455                 460
Ile Tyr Tyr Gly Asp Glu Ala Gly Leu Ile Gly Lys Glu Asp Pro Asp
465                 470                 475                 480
Asn Arg Arg Tyr Phe Leu Trp Gly His Glu Asp Lys Lys Leu Ile Asp
                485                 490                 495
Cys Val Ser Ser Trp Thr Lys Ile Arg Lys Gln Asn Pro Val Leu Val
            500                 505                 510
Asn Gly Lys Ile Gly Phe Val His Leu Ser Ala Gly Val Asn Ser Ile
            515                 520                 525
Val Arg Tyr Asn Asp Gln Glu Met Ile Met Tyr Cys Val Asn Cys Thr
530                 535                 540
Asn Glu Asp Val Ile Pro Leu Arg Glu Lys Tyr Ser Phe Tyr Trp Leu
545                 550                 555                 560
Pro Ser Ile Ile Ile Asp Lys Ile Lys Asp Thr Leu Asp Gln Ile Gln
                565                 570                 575
Leu Lys Ala Gln Thr Asp Phe Ile Lys Lys Ile Ser Leu
```

<210> SEQ ID NO 10
<211> LENGTH: 605
<212> TYPE: PRT
<213> ORGANISM: Aspergillus niger

<400> SEQUENCE: 10

```
Met Gln Thr Leu Leu Val Ser Ser Leu Val Ser Leu Ala Ala Ala
1               5                   10                  15

Leu Pro His Tyr Ile Arg Ser Asn Gly Ile Glu Ala Ser Leu Leu Thr
            20                  25                  30

Asp Pro Lys Asp Val Ser Gly Arg Thr Val Asp Tyr Ile Ile Ala Gly
            35                  40                  45

Gly Gly Leu Thr Gly Leu Thr Thr Ala Ala Arg Leu Thr Glu Asn Pro
50                  55                  60

Asn Ile Ser Val Leu Val Ile Glu Ser Gly Ser Tyr Glu Ser Asp Arg
65                  70                  75                  80

Gly Pro Ile Ile Glu Asp Leu Asn Ala Tyr Gly Asp Ile Phe Gly Ser
                85                  90                  95

Ser Val Asp His Ala Tyr Glu Thr Val Glu Leu Ala Thr Asn Asn Gln
            100                 105                 110

Thr Ala Leu Ile Arg Ser Gly Asn Gly Leu Gly Gly Ser Thr Leu Val
            115                 120                 125

Asn Gly Gly Thr Trp Thr Arg Pro His Lys Ala Gln Val Asp Ser Trp
130                 135                 140

Glu Thr Val Phe Gly Asn Glu Gly Trp Asn Trp Asp Asn Val Ala Ala
145                 150                 155                 160

Tyr Ser Leu Gln Ala Glu Arg Ala Arg Ala Pro Asn Ala Lys Gln Ile
                165                 170                 175

Ala Ala Gly His Tyr Phe Asn Ala Ser Cys His Gly Val Asn Gly Thr
            180                 185                 190

Val His Ala Gly Pro Arg Asp Thr Gly Asp Asp Tyr Ser Pro Ile Val
            195                 200                 205

Lys Ala Leu Met Ser Ala Val Glu Asp Arg Gly Val Pro Thr Lys Lys
210                 215                 220

Asp Phe Gly Cys Gly Asp Pro His Gly Val Ser Met Phe Pro Asn Thr
225                 230                 235                 240

Leu His Glu Asp Gln Val Arg Ser Asp Ala Ala Arg Glu Trp Leu Leu
                245                 250                 255

Pro Asn Tyr Gln Arg Pro Asn Leu Gln Val Leu Thr Gly Gln Tyr Val
            260                 265                 270

Gly Lys Val Leu Leu Ser Gln Asn Gly Thr Thr Pro Arg Ala Val Gly
            275                 280                 285

Val Glu Phe Gly Thr His Lys Gly Asn Thr His Asn Val Tyr Ala Lys
290                 295                 300

His Glu Val Leu Leu Ala Ala Gly Ser Ala Val Ser Pro Thr Ile Leu
305                 310                 315                 320

Glu Tyr Ser Gly Ile Gly Met Lys Ser Ile Leu Glu Pro Leu Gly Ile
                325                 330                 335

Asp Thr Val Val Asp Leu Pro Val Gly Leu Asn Leu Gln Asp Gln Thr
            340                 345                 350

Thr Ala Thr Val Arg Ser Arg Ile Thr Ser Ala Gly Ala Gly Gln Gly
            355                 360                 365
```

```
Gln Ala Ala Trp Phe Ala Thr Phe Asn Glu Thr Phe Gly Asp Tyr Ser
    370                 375                 380

Glu Lys Ala His Glu Leu Leu Asn Thr Lys Leu Glu Gln Trp Ala Glu
385                 390                 395                 400

Glu Ala Val Ala Arg Gly Gly Phe His Asn Thr Thr Ala Leu Leu Ile
                405                 410                 415

Gln Tyr Glu Asn Tyr Arg Asp Trp Ile Val Asn His Asn Val Ala Tyr
                420                 425                 430

Ser Glu Leu Phe Leu Asp Thr Ala Gly Val Ala Ser Phe Asp Val Trp
            435                 440                 445

Asp Leu Leu Pro Phe Thr Arg Gly Tyr Val His Ile Leu Asp Lys Asp
450                 455                 460

Pro Tyr Leu His His Phe Ala Tyr Asp Pro Gln Tyr Phe Leu Asn Glu
465                 470                 475                 480

Leu Asp Leu Leu Gly Gln Ala Ala Thr Gln Leu Ala Arg Asn Ile
            485                 490                 495

Ser Asn Ser Gly Ala Met Gln Thr Tyr Phe Ala Gly Glu Thr Ile Pro
            500                 505                 510

Gly Asp Asn Leu Ala Tyr Asp Ala Asp Leu Ser Ala Trp Thr Glu Tyr
            515                 520                 525

Ile Pro Tyr His Phe Arg Pro Asn Tyr His Gly Val Gly Thr Cys Ser
        530                 535                 540

Met Met Pro Lys Glu Met Gly Gly Val Val Asp Asn Ala Ala Arg Val
545                 550                 555                 560

Tyr Gly Val Gln Gly Leu Arg Val Ile Asp Gly Ser Ile Pro Pro Thr
                565                 570                 575

Gln Met Ser Ser His Val Met Thr Val Phe Tyr Ala Met Ala Leu Lys
            580                 585                 590

Ile Ser Asp Ala Ile Leu Glu Asp Tyr Ala Ser Met Gln
        595                 600                 605

<210> SEQ ID NO 11
<211> LENGTH: 587
<212> TYPE: PRT
<213> ORGANISM: Penicillium amagasakiense

<400> SEQUENCE: 11

Tyr Leu Pro Ala Gln Gln Ile Asp Val Gln Ser Ser Leu Leu Ser Asp
1               5                   10                  15

Pro Ser Lys Val Ala Gly Lys Thr Tyr Asp Tyr Ile Ile Ala Gly Gly
            20                  25                  30

Gly Leu Thr Gly Leu Thr Val Ala Ala Lys Leu Thr Glu Asn Pro Lys
        35                  40                  45

Ile Lys Val Leu Val Ile Glu Lys Gly Phe Tyr Glu Ser Asn Asp Gly
50                  55                  60

Ala Ile Ile Glu Asp Pro Asn Ala Tyr Gly Gln Ile Phe Gly Thr Thr
65                  70                  75                  80

Val Asp Gln Asn Tyr Leu Thr Val Pro Leu Ile Asn Asn Arg Thr Asn
                85                  90                  95

Asn Ile Lys Ala Gly Lys Gly Leu Gly Gly Ser Thr Leu Ile Asn Gly
            100                 105                 110

Asp Ser Trp Thr Arg Pro Asp Lys Val Gln Ile Asp Ser Trp Glu Lys
        115                 120                 125

Val Phe Gly Met Glu Gly Trp Asn Trp Asp Asn Met Phe Glu Tyr Met
130                 135                 140
```

-continued

```
Lys Lys Ala Glu Ala Ala Arg Thr Pro Thr Ala Ala Gln Leu Ala Ala
145                 150                 155                 160

Gly His Ser Phe Asn Ala Thr Cys His Gly Thr Asn Gly Thr Val Gln
                165                 170                 175

Ser Gly Ala Arg Asp Asn Gly Gln Pro Trp Ser Pro Ile Met Lys Ala
            180                 185                 190

Leu Met Asn Thr Val Ser Ala Leu Gly Val Pro Val Gln Gln Asp Phe
        195                 200                 205

Leu Cys Gly His Pro Arg Gly Val Ser Met Ile Met Asn Asn Leu Asp
    210                 215                 220

Glu Asn Gln Val Arg Val Asp Ala Ala Arg Ala Trp Leu Leu Pro Asn
225                 230                 235                 240

Tyr Gln Arg Ser Asn Leu Glu Ile Leu Thr Gly Gln Met Val Gly Lys
                245                 250                 255

Val Leu Phe Lys Gln Thr Ala Ser Gly Pro Gln Ala Val Gly Val Asn
            260                 265                 270

Phe Gly Thr Asn Lys Ala Val Asn Phe Asp Val Phe Ala Lys His Glu
        275                 280                 285

Val Leu Leu Ala Ala Gly Ser Ala Ile Ser Pro Leu Ile Leu Glu Tyr
    290                 295                 300

Ser Gly Ile Gly Leu Lys Ser Val Leu Asp Gln Ala Asn Val Thr Gln
305                 310                 315                 320

Leu Leu Asp Leu Pro Val Gly Ile Asn Met Gln Asp Gln Thr Thr Thr
                325                 330                 335

Thr Val Ser Ser Arg Ala Ser Ser Ala Gly Ala Gly Gln Gly Gln Ala
            340                 345                 350

Val Phe Phe Ala Asn Phe Thr Glu Thr Phe Gly Asp Tyr Ala Pro Gln
        355                 360                 365

Ala Arg Asp Leu Leu Asn Thr Lys Leu Asp Gln Trp Ala Glu Glu Thr
    370                 375                 380

Val Ala Arg Gly Gly Phe His Asn Val Thr Ala Leu Lys Val Gln Tyr
385                 390                 395                 400

Glu Asn Tyr Arg Asn Trp Leu Leu Asp Glu Asp Val Ala Phe Ala Glu
                405                 410                 415

Leu Phe Met Asp Thr Glu Gly Lys Ile Asn Phe Asp Leu Trp Asp Leu
            420                 425                 430

Ile Pro Phe Thr Arg Gly Ser Val His Ile Leu Ser Ser Asp Pro Tyr
        435                 440                 445

Leu Trp Gln Phe Ala Asn Asp Pro Lys Phe Phe Leu Asn Glu Phe Asp
    450                 455                 460

Leu Leu Gly Gln Ala Ala Ala Ser Lys Leu Ala Arg Asp Leu Thr Ser
465                 470                 475                 480

Gln Gly Ala Met Lys Glu Tyr Phe Ala Gly Glu Thr Leu Pro Gly Tyr
                485                 490                 495

Asn Leu Val Gln Asn Ala Thr Leu Ser Gln Trp Ser Asp Tyr Val Leu
            500                 505                 510

Gln Asn Phe Arg Pro Asn Trp His Ala Val Ser Ser Cys Ser Met Met
        515                 520                 525

Ser Arg Glu Leu Gly Gly Val Val Asp Ala Thr Ala Lys Val Tyr Gly
    530                 535                 540

Thr Gln Gly Leu Arg Val Ile Asp Gly Ser Ile Pro Pro Thr Gln Val
545                 550                 555                 560
```

```
Ser Ser His Val Met Thr Ile Phe Tyr Gly Met Ala Leu Lys Val Ala
            565                 570                 575

Asp Ala Ile Leu Asp Asp Tyr Ala Lys Ser Ala
        580                 585

<210> SEQ ID NO 12
<211> LENGTH: 730
<212> TYPE: PRT
<213> ORGANISM: Aspergillus niger

<400> SEQUENCE: 12

Met Arg His Phe Trp Leu Leu Pro Ala Val Ala Gly Ile Ala Gly Ala
1               5                   10                  15

Gln Cys Pro Tyr Leu Ser Gly Glu Met Ser Phe Thr Gln Glu Gln Asp
            20                  25                  30

Asn Ala Gly Asp Thr Ile Glu Val Thr Glu Gln Pro Ile Asp Asn Thr
        35                  40                  45

Leu Tyr Val Asn Asp Thr Gly Ser Tyr Met Thr Thr Asp Phe Gly Thr
    50                  55                  60

Pro Ile Ser Asp Gln Thr Ser Leu Lys Ala Gly Pro Arg Gly Pro Thr
65                  70                  75                  80

Leu Leu Glu Asp Phe Ile Phe Arg Gln Lys Leu Gln Arg Phe Asp His
                85                  90                  95

Glu Arg Val Pro Glu Arg Val Val His Ala Arg Gly Ala Gly Ala Tyr
            100                 105                 110

Gly Thr Phe Lys Ser Tyr Ala Asp Trp Ser Asn Val Thr Ala Ala Asp
        115                 120                 125

Phe Leu Ser Ala Asn Asp Lys Glu Thr Pro Met Phe Cys Arg Phe Ser
    130                 135                 140

Thr Val Val Gly Phe Arg Gly Ser Val Asp Thr Ala Arg Asp Val His
145                 150                 155                 160

Gly His Ala Cys Arg Phe Tyr Thr Asp Glu Gly Asn Tyr Asp Ile Val
                165                 170                 175

Gly Ile Asn Phe Ala Pro Phe Phe Ile Gln Asp Ala Ile Gln Phe Pro
            180                 185                 190

Asp Leu Val His Ala Ile Lys Pro Met Pro Asn Asn Glu Ile Pro Gln
        195                 200                 205

Ala Ala Thr Ala His Thr Ser Ala Trp Asp Phe Phe Ser Gln Gln Ser
    210                 215                 220

Thr Ala Leu His Ser Ala Leu Trp Leu Met Ser Gly Asn Gly Ile Pro
225                 230                 235                 240

Arg Ser Phe Arg His Met Asn Gly Tyr Gly Val His Ser Phe Arg Phe
                245                 250                 255

Val Ala Ala Asn Gly Thr Ser Lys Val Val Arg Thr Pro Trp Lys Ser
            260                 265                 270

Gln Gln Gly Val Ala Ser Leu Val Trp Asp Glu Ala Gln Ala Ala Ala
        275                 280                 285

Gly Lys Asn Ser Asp Tyr His Arg Gln Asp Leu Tyr Asn Ala Met Pro
    290                 295                 300

Asn Gly His Tyr Pro Lys Tyr Glu Leu Gln Ala Gln Ile Met Asp Glu
305                 310                 315                 320

Ala Asp Met Leu Arg Phe Gly Phe Asp Leu Leu Asp Pro Thr Lys Leu
                325                 330                 335

Val Pro Glu Glu Val Val Pro Tyr Thr Pro Leu Gly Met Met Glu Leu
            340                 345                 350
```

```
Asn Ala Asn Pro Thr Asn Tyr Phe Ala Glu Val Glu Gln Ala Gly Phe
        355                 360                 365
Gln Pro Gly His Val Val Pro Gly Ile Asp Phe Thr Asp Asp Pro Leu
    370                 375                 380
Leu Gln Gly Arg Leu Phe Ser Tyr Leu Asp Thr Gln Leu Thr Arg His
385                 390                 395                 400
Gly Gly Pro Asn Phe Glu Gln Ile Pro Val Asn Arg Pro Arg Lys Pro
                405                 410                 415
Val His Asn Asn Asn Arg Asp Gly Phe Gly Gln Gln Gln Ile Pro Thr
                    420                 425                 430
Asn Asn Trp Ala Tyr Thr Pro Asn Ser Met Ser Asn Gly Tyr Pro Met
                435                 440                 445
Gln Ala Asn Gln Thr Gln Gly His Gly Phe Phe Thr Ala Pro Tyr Arg
    450                 455                 460
Tyr Ala Ser Gly His Leu Val Arg Gln Thr Ser Pro Thr Phe Asn Asp
465                 470                 475                 480
His Trp Ser Gln Pro Ala Met Phe Trp Asn Ser Leu Ile Pro Ala Glu
                485                 490                 495
Gln Gln Met Val Val Asn Ala Ile Val Phe Glu Asn Ser Lys Val Asn
                500                 505                 510
Ser Pro His Val Arg Lys Asn Val Asn Gln Leu Asn Met Val Asn
                515                 520                 525
Asn Asn Leu Ala Val Arg Val Ala Arg Gly Leu Gly Leu Asp Glu Pro
                530                 535                 540
Ser Pro Asn Pro Thr Tyr Tyr Thr Ser Asn Lys Thr Ser Asn Val Gly
545                 550                 555                 560
Thr Phe Gly Lys Pro Leu Leu Ser Ile Glu Gly Leu Gln Val Gly Phe
                565                 570                 575
Leu Ala Ser Asn Ser His Pro Glu Ser Ile Lys Gln Gly Gln Ala Met
                580                 585                 590
Ala Ala Gln Phe Ser Ala Gly Val Asp Leu Asn Ile Val Thr Glu
                595                 600                 605
Ala Tyr Ala Asp Gly Val Asn Thr Thr Tyr Ala Leu Ser Asp Ala Ile
                610                 615                 620
Asp Phe Asp Ala Leu Ile Ile Ala Asp Gly Val Gln Ser Leu Phe Ala
625                 630                 635                 640
Ser Pro Ala Leu Ala Asn Gln Met Asn Ser Thr Ala Thr Ser Thr Leu
                645                 650                 655
Tyr Pro Pro Ala Arg Pro Phe Gln Ile Leu Val Asp Ser Phe Arg Tyr
                660                 665                 670
Gly Lys Pro Val Ala Val Gly Ser Gly Ser Val Ala Leu Lys Asn
                675                 680                 685
Ala Gly Ile Asp Ser Ser Arg Ser Gly Val Tyr Thr Gly Ser Ser Glu
                690                 695                 700
Thr Thr Glu Lys Ile Ala Lys Glu Val Leu Glu Gly Leu Tyr Thr Phe
705                 710                 715                 720
Arg Phe Val Asp Arg Phe Ala Leu Asp Glu
                725                 730
```

METHOD FOR PRODUCING BEVERAGES BY ACID REMOVAL

CROSS-REFERENCE TO RELATED APPLICATIONS

This application is a divisional of U.S. application Ser. No. 14/411,474, which has a 35 USC Section 371(c) date of Dec. 26, 2014, and which is the US national stage of International Application No. PCT/DK2013/050215, filed Jun. 28, 2013, which claims priority to Danish application PA 2012 70384, filed Jun. 29, 2012, all of which are incorporated herein by reference in their entirety.

REFERENCE TO ELECTRONIC COPY OF THE SEQUENCE LISTING

The instant application contains a Sequence Listing, which is submitted electronically in ASCII format and is hereby incorporated by reference in its entirety. Said ASCII copy, created on Jul. 9, 2013, is named pctdk2013050215-seq1.txt and is approximately 64 kilobytes in size.

FIELD OF INVENTION

The present invention relates to the field of beverages.

BACKGROUND OF INVENTION

The World Health Organization (WHO) predicts that overweight and obesity may soon be the most significant cause of poor health. Food and beverages supporting a healthy life style are therefore in high demand. Such products should preferably be low in calories, but high in other beneficial nutrients.

EP 0748 168 relates to an alcohol free refreshing drink, which is prepared by fermenting glucose to gluconic acid using a microorganism. However, after the bacterial fermentation, the resulting liquid contains a high level of gluconic acid and gluconate. In order to reduce this, the beverage has to be diluted, thus reducing the level of other micro nutrients.

US20120114791 relates to methods for production of alcoholic beverages with reduced content of alcohol. The methods comprise treatment of an unfermented beverage starting solution with glucose oxidase and glucose isomerase, which may lead to a sugar reduction of around 19%. The methods may contain an optional step of removing at least a portion of the gluconic acid generated e.g. by means of neutralization by addition of a substance forming a sparingly soluble salt of gluconic acid, preferably calcium carbonate.

SUMMARY OF INVENTION

The present invention provides methods for preparing beverages low in calories and high in beneficial micro-nutrients. In particular, the invention provides methods for removal of organic acids during beverage production. As described above, reduction of glucose level may lead to production of acids, e.g. gluconic acid. The present inventors have found that the prior art methods are restricted, because the acid production ultimately inhibits the glucose removal, and thus only relatively low levels of glucose can be removed and/or high levels of acids are produced. Interestingly, the present invention provides methods, wherein the generated organic acids continuously are removed, preferably simultaneously with the generation of the organic acids. Thus, in the methods of the invention, the removal of sugar is not impaired by accumulating high levels of organic acids, because the organic acids may be removed continuously.

Interestingly, the invention demonstrates that such beverages are palatable providing a good taste. If the acidity is kept at a low level, then the sugars can be kept at a low level, allowing for a beverage with low calorie content.

The invention provides methods for reducing the level of organic acid, while at the same time retaining the level of one or more micro-nutrients. Interestingly, the methods described herein leads to palatable beverages, e.g. beverages with a good flavour and taste. The important aroma compounds are retained in the beverages. Another interesting feature of the beverages prepared according to the methods of the invention is that even in absence of adding non-natural ingredients, the beverages are palatable and contain a good level of micronutrients.

In one aspect the invention provides methods of preparing a beverage, wherein the method comprises the steps of
a) providing a starting liquid comprising at least one micro-nutrient and at least one sugar; and
b) if said sugar is not glucose converting at least some of said sugar to glucose; and
c) optionally incubating said liquid with
  (i) one or more glucose fermenting microorganisms and/or
  (ii) an enzyme or a mixture of enzymes capable of catalysing conversion of glucose to an organic acid; and
d) removing at least 10% of one or more acidic ions from said liquid while retaining said at least one micro-nutrient in said liquid, thereby obtaining an AX-REED liquid,
  wherein said acidic ion is removed through an Anion Exchange Reverse Electro-Enhanced Dialysis (AX-REED) membrane stack, said membrane stack containing
i) at least one cell consisting of:
  1. two an-ion exchange membranes defining a chamber for the starting liquid; and
  2. two further chambers for a dialysis liquid, wherein said two further chambers are positioned adjacent to the chamber for the starting liquid on opposing sides and wherein said two further chambers may be connected
ii) a set of end membranes
iii) means for applying an electric field over the membrane stack by means of at least two electrodes
iv) means for reversing the direction of the electric field within said membrane stack
and wherein the removal involves the steps of
i) inserting the starting liquid into the chamber for the starting liquid; and
ii) inserting a dialysis liquid in the two further chambers for the dialysis liquid; and
iii) applying an electric field over the membrane stack;
iv) incubating said starting liquid in said chamber, whereby the direction of electric field is reversed at intervals,
wherein said AX-REED liquid is the beverage or said AX-REED liquid may be further processed to obtain the beverage.

The starting liquid may be incubated in the chamber for the starting liquid for a predetermined retention time.

Step d) may in particular involve removing at least 10% of one or more acidic ions from said liquid while retaining at least 65% of said at least one micro-nutrient in said liquid, thereby obtaining an AX-REED liquid,

Dotted line: Beverage B (based on diluted wort).

Figure 7:
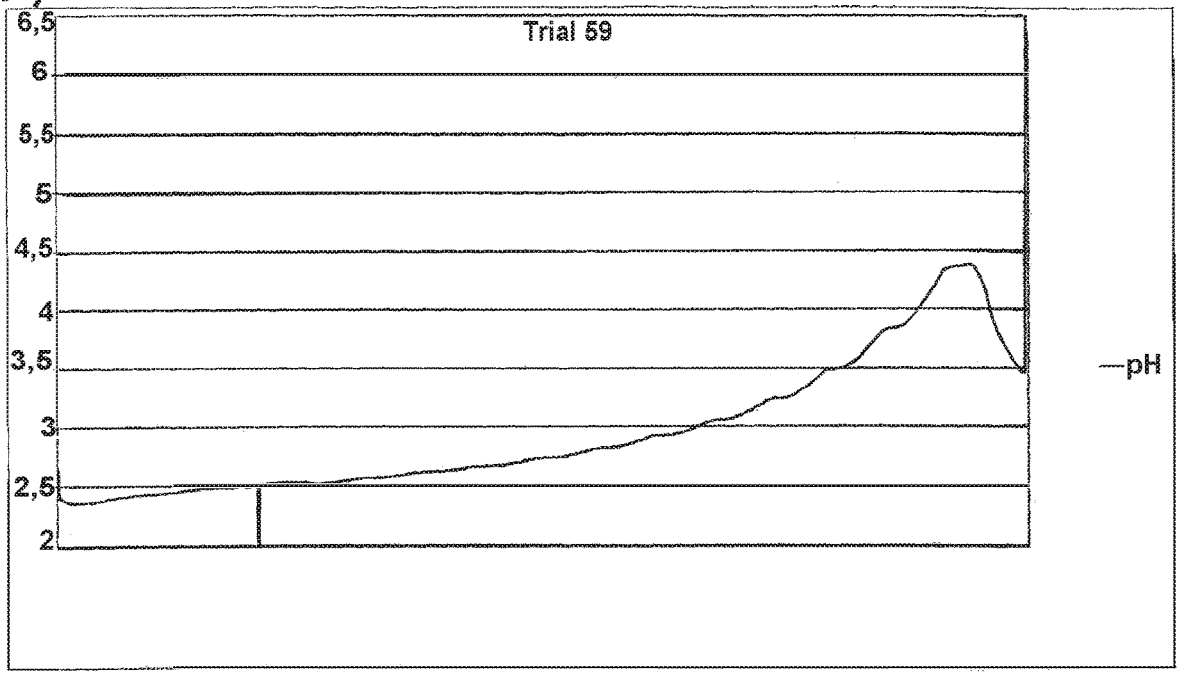
Figure 7:
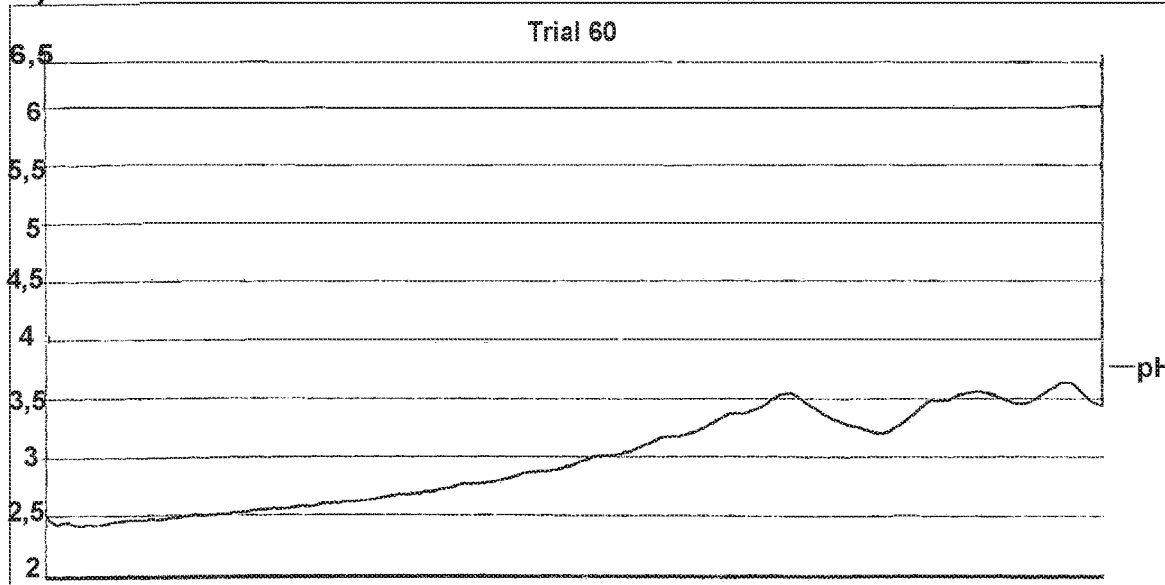

FIG. 7 shows the pH profile during trial 59 (panel A)) and during trial 60 (panel B)).

DETAILED DESCRIPTION OF THE INVENTION

Method of Producing a Beverage

The present invention relates to methods for producing a beverage or a drinks base, wherein said drinks base may be processed into a beverage by addition of one or more flavour compounds.

In particular, the methods of the invention are useful for preparing beverages with a ratio of sugar to organic acid of in the range of 60:1 to 1:2, which the present inventors have found to be particularly palatable. Said ratio of sugar to organic acid may be any of the ratios described herein below in the section "Ratio of sugar to organic acid".

The methods of the invention are also useful for preparing beverages with reduced acidity.

The methods of the invention in general comprise the steps of:
a) providing a starting liquid comprising at least one micro-nutrient and at least one sugar; and
b) if said sugar is not glucose converting at least some of said sugar to glucose; and
c) optionally incubating said liquid with
   (i) one or more glucose fermenting microorganisms and/or
   (ii) an enzyme or a mixture of enzymes capable of catalysing conversion of glucose to an organic acid; and
d) removing at least 10% of one or more acidic ions from said liquid while retaining said at least one micro-nutrient in said liquid, thereby obtaining an AX-REED liquid, wherein said acidic ion is removed through an Anion Exchange Reverse Electro-Enhanced Dialysis (AX-REED) membrane stack.

Step d) may in particular removing at least 10% of one or more acidic ions from said liquid while retaining at least 65% of said at least one micro-nutrient in said liquid, thereby obtaining an AX-REED liquid. wherein said acidic ion is removed through an Anion Exchange Reverse Electro-Enhanced Dialysis (AX-REED) membrane stack The AX-REED liquid may be the final beverage, however the AX-REED liquid may also be further processed to obtain the final beverage. Thus in one embodiment of the invention, the methods comprises performing steps a), b), c) and d), wherein the beverage is the obtained AX-REED liquid.

The starting liquid of step a) may be any liquid useful as a starting liquid for preparation of a beverage. In particular, it may be any of the starting liquids described herein below in the sections "Method of producing fermented beverage" and "Method of producing a beverage without bacterial fermentation" and "Method of producing a beverage with enzymatic conversion of sugar".

The micro-nutrient of step a) may be any of the micro-nutrients described herein below in the section "Micro-nutrient".

The sugar of the starting liquid may be any of the sugars described in the section "Sugar".

Step b) of the method is an optional step, which may be performed in order to convert one or more sugars to glucose. Whether or not this step is performed will be dependent on whether the starting liquid contains other sugars than glucose and on whether it is desirable to convert one or more of said other sugars to glucose.

In some embodiments of the invention, the method mainly removes organic acids from the starting liquid to produce a beverage or drink base with less acidity. In these embodiments, if the starting liquid comprises a sugar level and composition, which is also desirable in the final beverage or drink base, then step b) will in general be excluded.

In other embodiments of the invention the method comprises a fermentation step (step c (i))). In these embodiments, it is preferable that if the starting liquid only comprises low levels of glucose or if the starting liquid comprises high levels of other sugars than glucose, then step b) is performed. Step b) may be formed in any of the ways described herein below in the section "Converting sugar to glucose".

Step c) is also an optional step. In step c (i) the glucose level is reduced by fermenting glucose preferably to obtain an organic acid. In general step c) is performed in embodiments of the invention where the starting liquid comprises a sugar level, which is higher than desirable. Thus, step c), such as step c (i) is in particular part of the method in embodiments of the invention where the starting liquid comprises more than 10%, for example more than 9%, such as more than 8%, for example more than 7% sugar. Said percentages are given as w/w. The sugar may be any of the sugars described herein below in the section "Sugar". Step c (i) may be performed in any of the ways described herein below in the section "Incubation with glucose fermenting microorganism".

In other embodiments of the invention the method comprises a step c, which comprises incubation with an enzyme or a mixture of enzymes capable of catalysing conversion of glucose to an organic acid (step c (ii)). In these embodiments, it is preferable that if the starting liquid only comprises low levels of glucose or if the starting liquid comprises high levels of other sugars than glucose, then step b) is performed. Step b) may be formed in any of the ways described herein below in the section "Converting sugar to glucose".

Step c (ii) comprising incubation with an enzyme or a mixture of enzymes capable of catalysing conversion of glucose to an organic acid is also an optional step. Step c (ii) reduces the glucose level by enzymatically degrading glucose to obtain organic acid(s). In general step c) is performed in embodiments of the invention where the starting liquid comprises a sugar level, which is higher than desirable. Thus, step c), such as step c (ii) is in particular part of the method in embodiments of the invention where the starting liquid comprises more than 10%, for example more than 9%, such as more than 8%, for example more than 7% sugar. Said percentages are given as w/w. The sugar may be any of the sugars described herein below in the section "Sugar". Step c (ii) may be performed in any of the ways described herein below in the section "Incubation with glucose degrading enzyme".

Removal of one or more acidic ions from the liquid is performed using AX-REED membrane stack. As used herein the term "removing an organic acid" refers to removing the acidic ion of said organic acid. The AX-REED membrane stack may be any of the AX-REED membrane stacks described herein below in the section "AX-REED" and the removal may be performed in any of the ways described herein below in the section "AX-REED". Removal of said acidic ions is preferably performed in a manner, wherein at least one micro-nutrient is retained in the liquid. Said micro-nutrient may be any of the micro-nutrients described herein below in the section "Micro-nutrient". The term "retaining said at least one micro-nutrient" as used herein means that the concentration of said at least one micro-nutrient has not decreased by more than 30%, preferably not by more than 20%, such as not more than 10%, for example the concentration of said micro-nutrient has not decreased by more than 5% during performance of step d). Even more preferably "retaining said at least one micro-nutrient" means that the concentration of said micro-nutrient is the same or higher before and after performance of step d).

Step d) in general involves removal of acidic ions by the following steps:
 i) inserting the starting liquid into the chamber for the starting liquid in the AX-REED membrane stack; and
 ii) inserting a dialysis liquid in the two further chambers for the dialysis liquid in the AX-REED membrane stack; and
 iii) applying an electric field over the membrane stack;
 iv) incubating said starting liquid in said chamber, whereby the direction of electric field is reversed at intervals.

Said incubation of the starting liquid in said chamber may be performed for a predetermined retention time. The predetermined retention time may be selected according to the specific method. In general the methods described in the section "Method of producing a beverage without bacterial fermentation" requires shorter retentions times. Whereas the methods described in the sections "Methods of producing a fermented beverage" and "Methods of producing a beverage with enzymatic conversion of sugar" in general requires longer retention times. The retention time may be selected to obtain a desired pH. In particular the retention time may be selected to obtain a desirable contact time, which may be any of the contact times described herein below in the section "Contact time".

In addition to steps a) to d) outlined above, the methods of the invention may also comprise a step e), wherein step e) comprises removing at least part of one cation from the liquid, while retaining at least 65% of said at least one micro-nutrient in said liquid, wherein said cation is removed through an Cation Exchange Reverse Electro-Enhanced Dialysis (CX-REED) membrane stack. The CX-REED membrane stack may be any of the CX-REED membrane stacks described herein below in the section "CX-REED" and step e) may be performed in any of the ways described in the section "CX-REED". Thus, in one embodiment the invention relates to a method for preparing a beverage with reduced acidity, said method comprising the steps of a) providing a starting liquid comprising at least one micro-nutrient and at least one sugar; and
b) if said sugar is not glucose converting at least some of said sugar to glucose; and
c) optionally incubating said liquid with one or more glucose fermenting microorganisms; and
d) removing at least 10% of one or more acidic ions from said liquid while retaining at least 65% of said at least one micro-nutrient in said liquid, thereby obtain an AX-REED liquid
 wherein said acidic ion is removed through an Anion Exchange Reverse Electro-Enhanced Dialysis (AX-REED) membrane stack; and
e) removing at least part of one cation from the AX-REED liquid, while retaining said at least one micro-nutrient in said liquid, thereby obtaining a CX-REED liquid,
 wherein said cation is removed through an Cation Exchange Reverse Electro-Enhanced Dialysis (CX-REED) membrane stack.

Step e) may in particular involve removing at least part of one cation from the AX-REED liquid, while retaining at least 65% of said at least one micro-nutrient in said liquid, thereby obtaining a CX-REED liquid,
wherein said cation is removed through an Cation Exchange Reverse Electro-Enhanced Dialysis (CX-REED) membrane stack.

Step e) in general involve removal of cations by the following steps:
 i) inserting the starting liquid, the partly AX-REED treated liquid or the AX-REED liquid into the chamber for the AX-REED liquid; and
 ii) inserting a second dialysis liquid in the two further chambers for the second dialysis liquid; and
 iii) applying an electric field over the membrane stack;
 iv) incubating said liquid in said chamber, whereby the direction of electric field is reversed at intervals.

Said incubation of the starting liquid in said chamber may be performed for a predetermined retention time. The predetermined retention time may be selected according to the specific method. The retention time may be selected to obtain a desired conductivity. In particular the retention time may be selected to obtain a desirable contact time, which may be any of the contact times described herein below in the section "Contact time".

The CX-REED liquid may be the final beverage. However, the CX-REED liquid may also be further processed to obtain the final beverage. For example the CX-REED liquid will be the final beverage or it will be a drink base, which will be a final beverage after addition of one or more additional compounds as described herein below for step f). Thus, in one embodiment the invention provides methods of preparing a beverages, wherein the methods comprise performing steps a), b), c), d) an e) as outlined above, wherein the beverage is the CX-REED liquid.

As described herein elsewhere, then steps d) and e) may be performed simultaneously or partly simultaneously. In these embodiments the resulting liquid may also be referred to as "REED liquid".

Thus, in one embodiment the invention relates to a method for preparing a beverage with reduced acidity, said method comprising the steps of
a) providing a starting liquid comprising at least one micro-nutrient and at least one sugar; and
b) if said sugar is not glucose converting at least some of said sugar to glucose; and
c) optionally incubating said liquid with one or more glucose fermenting microorganisms; and d) removing at least 10% of one or more acidic ions from said liquid,
   wherein said acidic ion is removed through an Anion Exchange Reverse Electro-Enhanced Dialysis (AX-REED) membrane stack; and
e) at least partly simultaneously removing at least part of one cation from the starting liquid or the partly AX-REED treated liquid, thereby obtaining a REED liquid, wherein said REED liquid retains at least 65% of said at least one micro-nutrient,
   wherein said cation is removed through an Cation Exchange Reverse Electro-Enhanced Dialysis (CX-REED) membrane stack.

The REED liquid may be the final beverage. However, the REED liquid may also be further processed to obtain the final beverage. For example the REED liquid will be the final beverage or it will be a drink base, which will be a final beverage after addition of one or more additional compounds as described herein below for step f). The REED liquid may also be treated with one or both of steps g) and h) described herein below.

In addition to the aforementioned steps the method may further comprise a step f), wherein step f) comprises adding one or more additional compounds to the starting liquid and/or to the liquid during the method and/or to the beverage. Said additional compounds may be any compound desirable to add to a beverage, for example the additional compounds may be one or more selected from the group consisting of flavour compounds and preservatives. The flavour compound may for example be any of the flavour compounds described herein below in the section "Flavour compound".

Thus, in one aspect the invention relates to a method for preparing a beverage, said method comprising the steps of
a) providing a starting liquid comprising at least one micro-nutrient and at least one sugar; and
b) if said sugar is not glucose converting at least some of said sugar to glucose; and
c) optionally incubating said liquid with one or more glucose fermenting microorganisms; and
d) removing at least 10% of one or more acidic ions from said liquid while retaining said at least one micro-nutrient in said liquid, thereby obtaining an AX-REED liquid
   wherein said acidic ion is removed through an Anion Exchange Reverse Electro-Enhanced Dialysis (AX-REED) membrane stack; and
e) removing at least part of one cation from the AX-REED liquid, while retaining said at least one micro-nutrient in said liquid, thereby obtaining a CX-REED liquid,
   wherein said cation is removed through an Cation Exchange Reverse Electro-Enhanced Dialysis (CX-REED) membrane stack; and
f) adding one or more additional compounds, preferably one or more additional compound selected from the group consisting of flavour compounds and preservatives, thereby obtaining a beverage.

Method of Producing Fermented Beverage

As outlined in the above section step c) of the method of the invention is an optional step. However, in one preferred embodiment of the invention the methods comprise performing step c). In particular the methods of the invention may preferably comprise performing step c (i). Thus, in one embodiment the invention relates to a method of preparing a beverage, wherein the method comprises the steps of
   a) providing a starting liquid comprising at least one micro-nutrient and at least one sugar; and
   c) incubating said liquid with
      (i) one or more microorganisms capable of fermenting said sugar to produce an organic acid; and
   d) removing at least 10% of one or more acidic ions from said liquid while retaining at least 65% of said at least one micro-nutrient in said liquid, thereby obtaining an AX-REED liquid, The microorganism capable of fermenting said sugar to produce an organic acid may be any useful microorganism, with these characteristics. In particular, it is preferred that the microorganism is a glucose fermenting microorganism. Thus, the invention provides methods for producing a beverage comprising the steps of
a) providing a starting liquid comprising at least one micro-nutrient and at least one sugar; and
b) if said sugar is not glucose converting at least some of said sugar to glucose; and
c) incubating said liquid with one or more glucose fermenting microorganisms capable of fermenting glucose to an organic acid; and
d) removing at least 10% of said organic acid from said liquid while retaining at least 65% of said at least one micro-nutrient in said liquid, thereby obtaining an AX-REED liquid
   wherein said organic acid is removed through an Anion Exchange Reverse Electro-Enhanced Dialysis (AX-REED) membrane stack.

Said AX-REED liquid may be the final beverage or it may be further processed to obtain the final beverage as described below.

This method may furthermore comprise step e) and thus in one aspect the invention relates to a method of preparing a beverage, wherein the method comprises the steps of
a) providing a starting liquid comprising at least one micro-nutrient and at least one sugar; and
b) if said sugar is not glucose converting at least some of said sugar to glucose; and
c) incubating said liquid with one or more glucose fermenting microorganisms capable of fermenting glucose to an organic acid; and
d) removing at least 10% of said organic acid from said liquid while retaining said at least 65% of said one micro-nutrient in said liquid, thereby obtaining an AX-REED liquid
   wherein said organic is removed through an Anion Exchange Reverse Electro-Enhanced Dialysis (AX-REED) membrane stack; and
e) removing at least part of one cation from the AX-REED liquid, while retaining at least 65% of said at least one micro-nutrient in said liquid, thereby obtaining a CX-REED liquid,
   wherein said cation is removed through an Cation Exchange Reverse Electro-Enhanced Dialysis (CX-REED) membrane stack.

The CX-REED liquid may be the final beverage or it may be further processed to obtain the final beverage. It is preferred that the CX-REED liquid is the final beverage or that the final beverage is obtained by adding one or more additional compounds to the CX-REED liquid.

Step d) and e) may be performed at least partly simultaneously and thus in one aspect the invention relates to a method of preparing a beverage, wherein the method comprises the steps of
a) providing a starting liquid comprising at least one micro-nutrient and at least one sugar; and
b) if said sugar is not glucose converting at least some of said sugar to glucose; and c) incubating said liquid with one or more glucose fermenting microorganisms capable of fermenting glucose to an organic acid; and
d) removing at least 10% of said organic acid from said liquid,
   wherein said organic is removed through an Anion Exchange Reverse Electro-Enhanced Dialysis (AX-REED) membrane stack; and
e) at least partly simultaneously removing at least part of one cation from the starting liquid or the partly AX-REED treated liquid, thereby obtaining a REED liquid, wherein said REED liquid retains at least 65% of said at least one micro-nutrient,
   wherein said cation is removed through an Cation Exchange Reverse Electro-Enhanced Dialysis (CX-REED) membrane stack.

The REED liquid may be the final beverage or it may be further processed to obtain the final beverage. It is preferred that the REED liquid is the final beverage or that the final beverage is obtained by adding one or more additional compounds to the REED liquid.

Thus, the method may furthermore comprise a step f) of adding one or more additional compounds to the starting liquid, the AX-REED liquid, the CX-REED liquid or the REED liquid. In embodiments of the invention not containing step e), then step f) preferably comprises adding one or more additional compounds to the AX-REED liquid. In one aspect the invention relates to a method of preparing a beverage, wherein the method comprises the steps of
a) providing a starting liquid comprising at least one micro-nutrient and at least one sugar; and
b) if said sugar is not glucose converting at least some of said sugar to glucose; and
c) incubating said liquid with one or more glucose fermenting microorganisms capable of fermenting glucose to an organic acid; and
d) removing at least 10% of said organic acid from said liquid while retaining at least 65% of said at least one micro-nutrient in said liquid, thereby obtaining a AX-REED liquid
   wherein said organic acid is removed through an Anion Exchange Reverse Electro-Enhanced Dialysis (AX-REED) membrane stack; and
e) removing at least part of one cation from the AX-REED liquid, while retaining at least 65% of said at least one micro-nutrient in said liquid, thereby obtaining a CX-REED liquid,
   wherein said cation is removed through an Cation Exchange Reverse Electro-Enhanced Dialysis (CX-REED) membrane stack; and
f) adding one or more additional compounds to the CX-REED liquid, preferably one or more additional compound selected from the group consisting of flavour compounds and preservatives, thereby obtaining the beverage.

The method may also comprise a step g) of adding one or more additional liquids to the AX-REED liquid, the CX-REED liquid or the REED liquid in order to obtain the final beverage. In particular said additional liquids may be beverages, so that the final beverage is a mixture between the CX-REED liquid and an additional beverage or a mixture between the REED liquid and an additional beverage. Thus, in one aspect the invention relates to a method of preparing a beverage, wherein the method comprises the steps of
a) providing a starting liquid comprising at least one micro-nutrient and at least one sugar; and
b) if said sugar is not glucose converting at least some of said sugar to glucose; and
c) incubating said liquid with one or more glucose fermenting microorganisms capable of fermenting glucose to an organic acid; and
d) removing at least 10% of said organic acid from said liquid while retaining at least 65% of said at least one micro-nutrient in said liquid, thereby obtaining a AX-REED liquid
   wherein said organic acid is removed through an Anion Exchange Reverse Electro-Enhanced Dialysis (AX-REED) membrane stack; and
e) removing at least part of one cation from the AX-REED liquid, while retaining at least 65% of said at least one micro-nutrient in said liquid, thereby obtaining a CX-REED liquid,
   wherein said cation is removed through an Cation Exchange Reverse Electro-Enhanced Dialysis (CX-REED) membrane stack; and
f) optionally adding one or more additional compounds to the CX-REED liquid, preferably one or more additional compound selected from the group consisting of flavour compounds and preservatives; and
g) providing an additional liquid, for example a beverage and mixing said CX-REED liquid with said additional liquid, thereby obtaining the beverage.

Said additional liquid may be any liquid, which is desirable to mix with the CX-REED liquid. In particular the additional liquid may be a beverage. In one embodiment said additional liquid is an alcoholic beverage, such as a fermented beverage, such as fermented wort or fruit juice. For example the additional liquid may be selected from the group consisting of beer, wine and cider. The additional liquid may also be a fermented fruit juice obtained by mixing fruit juice with sugar followed by fermentation with yeast to yield a liquid with high alcohol content. Herein such liquids are also referred to as fermented high sugar fruit juice. In this regard the term "high sugar" thus refers to that additional sugar is added to the fruit juice before fermentation. For example the additional beverage may be fermented fruit juice with added sugar containing at least 10%, such as at least 12% alcohol. Said fermented fruit juice, may for example be fermented apple juice, and may then be referred to as fermented high sugar apple juice.

The methods of the invention may be useful for preparing low alcohol beverage by mixing a conventional alcoholic beverage, with a CX-REED liquid obtained using the same base as used for the conventional alcoholic beverage as starting liquid.

Thus, in one embodiment the final beverage may be a low alcohol beer, such as a beer containing less than 0.5% alcohol, for example a beer containing less than 0.1% alcohol or even an "alcohol free" beer, which is obtained by diluting a conventional beer with CX-REED liquid or REED liquid prepared according to the present invention. Frequently, the CX-REED liquid is low in sugar and in general free of alcohol, but still retains other taste attributes of the starting liquid and accordingly, provides the final beverage with all of these taste attributes. Thus, the CX-REED liquid in general retains one or more aroma compounds present in the starting liquid as described herein below in the section "Aroma compounds". In this embodiment the starting liquid for preparing the CX-REED liquid or the REED liquid preferably comprises a cereal extract, more preferably wort.

Similarly, in another embodiment the final beverage may be a low alcohol cider, such as a cider containing less than 0.5% alcohol, for example a cider containing less than 0.1% alcohol or even an "alcohol free" cider, which is obtained by diluting a conventional cider with CX-REED liquid or REED-liquid prepared according to the present invention. In this embodiment the starting liquid for preparing the CX-REED liquid or the REED liquid preferably comprises or consists of pear juice or apple juice, preferably apple juice.

In yet another embodiment the final beverage may be a low calorie cider, which is obtained by diluting a conventional fermented high sugar apple juice with the CX-REED liquid or the REED liquid. In this embodiment the starting liquid for preparing the CX-REED liquid preferably comprises or consists of pear juice or apple juice, preferably apple juice.

Furthermore, in this embodiment the CX-REED liquid preferably has a glucose content of at the most 60 g/L, such as at the most 50 g/L, for example at the most 40 g/L. In embodiments where a REED liquid is prepared, then the REED liquid preferably has a glucose content of at the most 60 g/L, such as at the most 50 g/L, for example at the most 40 g/L.

In another embodiment the final beverage may be a low alcohol wine, such as a wine containing less than 0.5% alcohol, for example a wine containing less than 0.1% alcohol or even an "alcohol free" wine, which is obtained by diluting a conventional wine with CX-REED liquid or REED liquid prepared according to the present invention. In this embodiment the starting liquid for preparing the CX-REED liquid or the REED liquid preferably comprises or consists of a grape juice.

It is also comprised within the present invention that the methods may comprise a step h) of further processing the AX-REED liquid or the CX-REED liquid or the REED liquid in order to obtain the final beverage. Said further processing may for example be a step of incubation of the AX-REED liquid or the CX-REED liquid or the REED liquid with one or more microorganisms, such as yeast. Said methods may comprise above described step g), and thus the methods may comprise incubation of the liquid obtained in step g) with one or more microorganisms, such as yeast. The microorganisms to be employed in step h) may in particular be yeast, such as Brewer's yeast, for example yeast *Saccharomyces cerevisiae* or *Saccharomyces pastorianus*, formerly known as *S. carlsbergensis*. Thus, in one aspect the invention relates to a method of preparing a beverage, wherein the method comprises the steps of a) providing a starting liquid comprising at least one micro-nutrient and at least one sugar; and
b) if said sugar is not glucose converting at least some of said sugar to glucose; and
c) incubating said liquid with one or more glucose fermenting microorganisms capable of fermenting glucose to an organic acid; and
d) removing at least 10% of said organic acid from said liquid while retaining at least 65% of said at least one micro-nutrient in said liquid, thereby obtaining a AX-REED liquid
   wherein said organic acid is removed through an Anion Exchange Reverse Electro-Enhanced Dialysis (AX-REED) membrane stack; and
e) removing at least part of one cation from the AX-REED liquid, while retaining at least 65% of said at least one micro-nutrient in said liquid, thereby obtaining a CX-REED liquid,
   wherein said cation is removed through an Cation Exchange Reverse Electro-Enhanced Dialysis (CX-REED) membrane stack; and
f) optionally adding one or more additional compounds to the CX-REED liquid, preferably one or more additional compound selected from the group consisting of flavour compounds and preservatives; and
h) incubating said AX-REED liquid or said X-REED liquid with one or more microorganisms, such as yeast, optionally followed removal of said microorganism, thereby obtaining the beverage.

Said step h) may in particular be included in embodiments of the invention where the beverage is a beer, such as a low alcohol beer or an alcohol free beer.

During step c) organic acid is generated and during step d) at least some of said generated organic acid is removed. As described elsewhere steps c) and d) may be performed simultaneously, and thus the organic acid may be continuously generated by said microorganisms and at least some or the generated organic acid may continuously be removed through said AX-REED membrane stack. While at least 10% of the organic acid is removed it is contained within the invention that at least some of the generated organic acid is maintained in the beverage and thus it is comprised within the invention, that the beverage may contain more organic acid than the starting liquid. This is in particular the case, when the starting liquid has a high level of sugar and a low level of organic acids. In order to reach a palatable ratio between sugar and organic acid, such as any of the ratios described herein below in the section "Ratio of sugar to organic acid", then it may be preferable that the beverage contains more organic acid that the starting liquid. Thus, preferably the beverage has a ratio of sugar to organic acid as described herein below in the section "Ratio of sugar to organic acid".

It is preferred that at least 10% of the generated organic acid is removed during step d). Thus for example at least 15%, for example at least 20%, such as at least 25%, such as at least 30% of the organic acid generated in step c) is preferably removed in step d). Said organic acid may be any of the organic acids described herein below in the section "Organic acid".

In particular it is preferred that at least 10% of generated lactic acid, citric acid, acetic acid and malic acid is removed during step d). More preferably, at least 10% of generated lactic acid, citric acid and acetic acid is removed during step d). Thus, step d) may in a preferred embodiment comprise removal of at least 10% of the lactic acid, for example at least 15% of the lactic acid, for example at least 20% of the lactic acid, such as at least 25% of the lactic acid, such as at least 30% of the lactic acid generated in step c). This is in particular the case in embodiments of the invention, where said glucose fermenting microorganism is capable of fermenting glucose to lactic acid.

Step d) may in another preferred embodiment comprise removal of at least 10% of the citric acid, for example at least 15% of the citric acid, for example at least 20% of the citric acid, such as at least 25% of the citric acid, such as at least 30% of the citric acid generated in step c). This is in particular the case in embodiments of the invention, where said glucose fermenting microorganism is capable of fermenting glucose to citric acid.

Step d) may in another embodiment comprise removal of at least 10% of the malic acid, for example at least 15% of the malic acid, for example at least 20% of the malic acid, such as at least 25% of the malic acid, such as at least 30% of the malic acid generated in step c). This is in particular the case in embodiments of the invention, where said glucose fermenting microorganism is capable of fermenting glucose to malic acid.

Step d) may in another preferred embodiment comprise removal of at least 10% of the acetic acid, for example at least 15% of the acetic acid, for example at least 20% of the acetic acid, such as at least 25% of the acetic acid, such as at least 30% of the acetic acid generated in step c). This is in particular the case in embodiments of the invention, where said glucose fermenting microorganism is capable of fermenting glucose to acetic acid.

In these embodiments of the invention the micro-nutrient may for example be any of the micro-nutrients described herein below in the section "Micro-nutrient"; and the sugar may for example be any of the sugars described in the section "Sugar", and step d) may for example be performed in any of the ways described in the section "AX-REED and step e) may for example be performed in any of the ways described in the section "CX-REED". Said ratio of sugar to organic acid may be any of the ratios described herein below in the section "Ratio of sugar to organic acid".

In particular, in embodiments of the invention relating to methods of producing fermented beverages, then it is preferred that said micro-nutrient is selected from the group consisting of minerals, and in particular from the group of minerals described herein below in the section "Micro-nutrient". Within these embodiments it is preferred that steps d) and e) are performed so that at least 65% of at least 2, preferably of at least 3 minerals selected from the group consisting of calcium, magnesium and iron are retained in the liquid. Thus, it is preferred that the final beverage contains at least 65% of the level of at least 2, preferably of at least 3, minerals present in the starting liquid, wherein said minerals are selected from the group consisting of calcium, magnesium and iron present in the starting liquid. Within these embodiments it is also preferred that steps d) and e) are performed so that at least 80% of at least 2, preferably of at least 3 minerals selected from the group consisting of calcium, magnesium and iron are retained in the liquid. Thus, it is preferred that the final beverage contains at least 80% of the level of at least 2, preferably of at least 3 minerals present in the starting liquid, wherein said minerals are selected from the group consisting of calcium, magnesium and iron present in the starting liquid.

The starting liquid may be any liquid useful for preparing a beverage. It is generally preferred that the starting liquid is a natural product. The term "natural product" as used herein refers to a product obtain from natural sources by extraction in water or by squeezing, wherein no extra chemicals are added. Thus, in one embodiment the starting liquid is an extract, concentrate or a juice of a plant or a plant part, where no extra sugar has been added.

In embodiments of the invention relating to producing a fermented beverage, it is preferred that the starting liquid has a relatively high level of one or more sugars, for example a high level of one or more of the sugars described herein below in the section "Sugar". Thus, the starting liquid may for example comprises more than 10%, for example more than 9%, such as more than 8%, for example more than 7% sugar. Said percentages are given as w/w.

In one embodiment of the invention the starting liquid is a liquid with a high level of maltose. Thus the starting liquid may be a liquid containing more than 40 g/L, such as more than 50 g/L, for example more than 60 g/L maltose.

In particular, the starting liquid may be an extract of one or more cereals. Said cereals may for example be selected from the group consisting of barley, wheat, rye, oat, maize, rice, sorghum, millet, triticale, buckwheat, fonio and quinoa. More preferably, the cereal is selected from the groups consisting of barley, wheat, rye, oat, maize and rice, more preferably the cereal is barley.

The extract may be an extract of the cereal per se, however the cereal may also be malted and the extract may be an extract of the malted cereal. As used herein the term "malted", refers to the cereal grains having been subjected to steeping, allowed to germinate and then dried. Said drying may for example be kiln drying.

Said extract of a cereal or a malted cereal is preferably an aqueous extract.

Thus, in a preferred embodiment of the invention, and in particular in embodiments of the invention relating to methods of producing a fermented beverage, then the starting liquid may be a malt extract, such as a barley malt extract. More preferably the starting liquid may be wort. The starting liquid may also be an extract of a mixture or barley malt and other cereals.

In a particularly preferred embodiment the starting liquid is wort. By the term "wort" as used herein is meant a liquid extract of malt. Wort may also be prepared by incubating an extract of un-malted barley with an enzyme mixture that hydrolyzes the barley components. In addition to said malt or barley-derived extracts, the wort may be prepared from malt and additional components, such as additional starch-containing material partly converted into fermentable sugars. The wort is in general obtained by mashing, optionally followed by sparging.

The term "Mashing" as used herein refers to the incubation of milled malt in water. Mashing is preferably performed at a specific temperature, and in a specific volume of water. Mashing can occur in the presence of adjuncts, which is understood to comprise any carbohydrate source other than malt, such as, but not limited to, unmalted barley, barley syrups, or maize, or rice—either as whole kernels or processed products like grits, syrups or starch.

The term "sparging" as used herein refers to a process of extracting residual sugars and other compounds from spent grains after mashing with hot water. Sparging is typically conducted in a lauter tun, a mash filter, or another apparatus to allow separation of the extracted water from spent grains.

The wort obtained after mashing is generally referred to as "first wort", while the wort obtained after sparging is generally referred to as the "second wort". If not specified, the term wort may be first wort, second wort, or a combination of both.

Thus, the starting liquid may be wort, such as first wort, second wort or a mixture thereof.

It is also comprised within the invention that the starting liquid may be an extract, a concentrate or a juice of a plant or a plant part, which has been treated with one of more enzymes. For example said extract, concentrate or juice of a plant or a plant part, may have been treated with one or more enzymes selected from the group consisting of glucosidases, proteases, pectinases and cellulases. In embodiments of the invention, where the starting liquid is wort, the said starting liquid may have been prepared employing a step of enzyme treatment with one or more enzymes selected from the group consisting of glucosidases, proteases, pectinases and cellulases, preferably from the group consisting of glucan 1,4-α-glucosidases, proteases, pullulanases, α-amylases, β-amylases, limit dextrinases and β-glucosidases. Treatment with glucan 1,4-α-glucosidases may be considered as step b) of the methods of the invention.

However in one embodiment it is preferred that no proteases are added at any step during the procedure.

In one embodiment of the invention the starting liquid is a fruit juice or extract containing a high level of sugar. In particular, the starting liquid may be a fruit juice or extract, which naturally contains a high level of sugar, such as more than 40 g/L, such as more than 50 g/L, for example more than 60 g/L sugar. Said fruit juice may for example be grape juice, pear juice or apple juice. The methods of the invention may be used to produce a palatable beverage with reduced sugar content compared to the fruit juice or extract, while retaining one or more valuable micronutrients.

In certain embodiments of the invention the pH of the starting liquid may be adjusted by addition of base or acid, such as potassium hydroxide or lactic acid. This may for example be done in order to start the fermentation at a pH agreeable to the microorganism, such as the glucose fermenting microorganism.

In embodiments of the invention, wherein the starting liquid comprises a malt extract and/or wort, then the starting liquid in general will comprise high levels of maltose, and in these embodiments of the invention the methods preferably comprises a step of converting at least some of said maltose to glucose.

Accordingly, it is also one aspect of the invention to provide methods of preparing a beverage, wherein the methods comprise the steps of a) providing a starting liquid comprising at least one micro-nutrient and maltose, wherein said starting liquid for example may comprise or even consist of a malt extract and/or wort; and
b) converting at least some of said maltose to glucose; and
c) incubating said liquid with one or more glucose fermenting microorganisms capable of fermenting glucose to an organic acid; and
d) removing at least 10% of said organic acid from said liquid while retaining at least 65% of said at least one micro-nutrient in said liquid, thereby obtaining an AX-REED liquid,
   wherein said acidic ion is removed through an Anion Exchange Reverse Electro-Enhanced Dialysis (AX-REED) membrane stack as described herein below in the section "AX-REED"
and optionally the method further comprises one of both of the steps e) and f) as outlined above.

Step b) of converting maltose to glucose may be performed in any of the ways described below in the section "Converting sugar to glucose", Step c) of the methods for producing a fermented beverage as described in this section may be performed in any of the ways described herein below in the section "Incubation with glucose fermenting microorganism".

Step b) and step c) may be performed sequentially, by first performing step b) and then step c). It is however also comprised in the invention that step b) and step c) can be performed simultaneously or at least partly simultaneously. For example, when step b) is performed with the aid of an enzyme as described in the section "Converting sugar to glucose" herein below, then the enzyme may be added to the starting liquid together with the glucose fermenting microorganism. When step b) is performed with the aid of a microorganism such as a maltose catabolising microorganism as described in the section "Converting sugar to glucose" herein below, then the starting liquid may be incubated with said microorganism and with the glucose fermenting microorganism simultaneously. In embodiments of the invention where step b) is performed with the aid of a microorganism it is preferred that step b) and step c) are performed simultaneously.

Steps c) and d) may also be performed sequentially, by first performing step c) and then step d). It is however preferred that step c) and step d) are performed simultaneously or at least partly simultaneously. Thus, the liquid may be incubated with one or more glucose fermenting microorganisms capable of fermenting glucose to an organic acid and simultaneously at least some of said organic acid is removed from the liquid. Thus, as the organic acid is produced from the glucose fermenting microorganism, then it is removed from the liquid, ensuring a constant low level of said organic acid in the liquid during the fermentation.

Accordingly, the steps b), c) and d) may all be performed simultaneously. Alternatively, step b) may be performed first, and then steps c) and d) may be performed simultaneously.

In general step d) will be performed prior to step e), however it is also contained within the invention that steps d) and e) may be performed simultaneously. Preferably however, step d) is performed prior to step e).

In another very preferred embodiment of the invention steps d) and e) are performed simultaneously. Thus, in this embodiment steps b), c), d) and e) may all be performed simultaneously. Alternatively, steps b) may be performed first and then steps c), d) and e) may be performed simultaneously. Steps d) and e) may in particular be performed simultaneously by using a REED equipment containing at least one AX-REED and at least one CX-REED membrane stack, wherein said AX-REED and said CX-REED membrane stacks are connected in parallel.

In yet another very preferred embodiment of the invention steps d) and e) are performed partly simultaneously. In this embodiment step d) may for example be performed for a given time period, where after both steps d) and e) are performed simultaneously. Thus, one or more acidic ions may be removed from the liquid through AX-REED for a given time period, where after both acidic ions and at least one cation are removed respectively through AX-REED and CX-REED, wherein the AX-REED and the CX-REED are performed simultaneously. Thus, in this embodiment steps b), c), d) and e) may all be performed at least partly simultaneously. Alternatively, steps b) may be performed first and then steps c), d) and e) may be performed at least partly simultaneously. When steps d) and e) are performed at least partly simultaneously, this is preferably done by using a REED equipment containing at least one AX-REED and at least one CX-REED membrane stack, wherein said AX-REED and said CX-REED membrane stacks are connected in parallel.

In one embodiment of the invention it is preferred that no sugar is added to starting liquid and furthermore, it is preferred that no sugar is added at any step during the method. In addition it is preferred that no sugar is added to the final beverage.

It is comprised within the invention that any of the methods may comprise as a last step, the step i) of adding $CO_2$ in order to obtain a carbonated beverage.

Converting Sugar to Glucose

The methods of the invention may comprise a step b) of converting at least some sugar, which is not glucose to glucose. This step is an optional step, which may be performed only in embodiments of the invention where it is desirable to reduce the level of sugar or in embodiments of the invention where it is desirable to reduce the level of a particular sugar, which is not glucose.

The sugar may for example be selected from the group consisting of fructose, maltose, maltotriose, lactose and sucrose. Thus step b) may comprise one or more of the following:
  i. Converting fructose to glucose
  ii. Converting maltose to glucose
  iii. Converting maltotriose to glucose
  iv. Converting lactose to glucose
  v. Converting sucrose to glucose In particular step b) may comprise one or more of the following:
  i. Converting maltose to glucose
  ii. Converting maltotriose to glucose
  iii. Converting sucrose to glucose Said conversion may be done by any suitable method known to the skilled person. In one embodiment this may be done enzymatically by contacting the starting liquid with an enzyme capable of catalysing conversion the particular sugar in question to glucose. This may also be done employing one or more microorganisms capable of catabolising said sugar to form glucose.

In preferred embodiments of the invention, then step b) comprises converting maltose to glucose. In addition, step b) may comprise converting maltotriose to glucose. This is in particular the case in embodiments of the invention where the starting liquid comprises maltose and/or maltotriose, for example in embodiments of the invention where the starting liquid comprises a malt extract and/or wort.

Thus step b) may comprise converting at least some of said maltose to glucose and at least some of said maltotriose to glucose by contacting the starting liquid with one or more enzymes capable of catalysing hydrolysis of maltose to glucose and maltotriose to glucose.

Thus step b) may comprise converting at least some of said maltose to glucose by contacting the starting liquid with an enzyme capable of catalysing hydrolysis of maltose to glucose.

Said enzyme may in a preferred embodiment be an enzyme capable of catalysing hydrolysis of terminal (1→4)-linked α-D-glucose residues successively from non-reducing ends of an oligosaccharide resulting in release of β-D-glucose. In particular, the enzyme is preferably capable of catalysing hydrolysis of maltose. The enzyme may in particular be an enzyme classified under EC 3.2.1.3. Thus the enzyme may be a glucan 1,4-α-glucosidase. Said glucan 1,4-α-glucosidase may be of any useful source organism, for example it may be a glucan 1,4-α-glucosidase of microbial origin or of plant origin. In one embodiment the enzyme is a glucan 1,4-α-glucosidases of SEQ ID NO: 1 or a functional homologue thereof sharing at least 70%, such as at least 80%, for example at least 85%, such as at least 90%, for example at least 95% sequence identity therewith. In one embodiment the enzyme is a glucan 1,4-α-glucosidases of SEQ ID NO: 2 or a functional homologue thereof sharing at least 70%, such as at least 80%, for example at least 85%, such as at least 90%, for example at least 95% sequence identity therewith. In one embodiment the enzyme is a glucan 1,4-α-glucosidases of SEQ ID NO: 3 or a functional homologue thereof sharing at least 70%, such as at least 80%, for example at least 85%, such as at least 90%, for example at least 95% sequence identity therewith. A functional homologue of a glucan 1,4-α-glucosidase is a polypeptide capable of catalysing hydrolysis of terminal (1→4)-linked α-D-glucose residues successively from non-reducing ends of an oligosaccharide with release of β-D-glucose and which have the aforementioned sequence identity with a reference glucan 1,4-α-glucosidase.

Said enzyme may also be an enzyme capable of catalysing endohydrolysis of (1→4)-α-D-glucosidic linkages in polysaccharides containing three or more (1→4)-α-linked D-glucose units. The enzyme may in particular be an enzyme classified under EC 3.2.1.1. Thus the enzyme may be an α-amylase. Said α-amylase may be of any useful source organism, for example it may be a α-amylase of microbial origin or of plant origin. In one embodiment the enzyme is an α-amylase of SEQ ID NO: 4 or a functional homologue thereof sharing at least 70%, such as at least 80%, for example at least 85%, such as at least 90%, for example at least 95% sequence identity therewith. In one embodiment the enzyme is an α-amylase of SEQ ID NO: 5 or a functional homologue thereof sharing at least 70%, such as at least 80%, for example at least 85%, such as at least 90%, for example at least 95% sequence identity therewith. In one embodiment the enzyme is an α-amylase of SEQ ID NO: 6 or a functional homologue thereof sharing at least 70%, such as at least 80%, for example at least 85%, such as at least 90%, for example at least 95% sequence identity therewith. A functional homologue of an α-amylase is a polypeptide capable of catalysing endohydrolysis of (1→4)-α-D-glucosidic linkages in polysaccharides containing three or more (1→4)-α-linked D-glucose units and which have the aforementioned sequence identity with a reference α-amylase.

Said enzyme may also be an enzyme capable of catalysing lysis of (1→6)-α-D-glucosidic linkages in pullulan, amylopectin and glycogen, and in the α- and β-limit dextrins of amylopectin and glycogen. The enzyme may in particular be an enzyme classified under EC 3.2.1.41. Thus the enzyme may be a pullulanase. Said pullulanase may be of any useful source organism, for example it may be a pullulanase of microbial origin. In one embodiment the enzyme is a pullulanase of SEQ ID NO: 7 or a functional homologue thereof sharing at least 70%, such as at least 80%, for example at least 85%, such as at least 90%, for example at least 95% sequence identity therewith. In one embodiment the enzyme is a pullulanase of SEQ ID NO: 8 or a functional homologue thereof sharing at least 70%, such as at least 80%, for example at least 85%, such as at least 90%, for example at least 95% sequence identity therewith. In one embodiment the enzyme is a pullulanase of SEQ ID NO: 9 or a functional homologue thereof sharing at least 70%, such as at least 80%, for example at least 85%, such as at least 90%, for example at least 95% sequence identity therewith. A functional homologue of a pullulanase is a polypeptide capable of catalysing lysis of (1→6)-α-D-glucosidic linkages in pullulan, amylopectin and glycogen, and in the α- and β-limit dextrins of amylopectin and glycogen and which have the aforementioned sequence identity with a reference pullulanase.

The determination of percent sequence identity between two sequences can be accomplished using a mathematical algorithm. A preferred, non-limiting example of a mathematical algorithm utilized for the comparison of two sequences is the algorithm of Karlin and Altschul (1990) Proc. Natl. Acad. Sci. USA 87:2264-2268, modified as in Karlin and Altschul (1993) Proc. Natl. Acad. Sci. USA 90:5873-5877. Such an algorithm is incorporated into the BLASTN and BLASTP programs of Altschul, et al. (1990) J. Mol. Biol. 215:403-410.

In order to characterize the identity, subject sequences are aligned so that the highest order homology (match) is obtained. Based on these general principles the "percent identity" of two amino acid sequences may be determined using the BLASTP algorithm [Tatiana A. Tatusova, Thomas L. Madden: Blast 2 sequences—a new tool for comparing protein and nucleotide sequences; FEMS Microbiol. Lett. 1999 174 247-250], which is available from the National Center for Biotechnology Information (NCBI) web site (http://www.ncbi.nlm.nih.gov), and using the default settings suggested here (i.e. Matrix=Blosum62; Open gap=11; Extension gap=1; Penalties gap x_dropoff=50; Expect=10; Word size=3; Filter on). The BLAST algorithm performs a two-step operation by first aligning two sequences based on the settings and then determining the % sequence identity in a range of overlap between two aligned sequences. In addition to % sequence identity, BLASTP also determines the % sequence similarity based on the settings.

Another preferred, non-limiting example of a mathematical algorithm utilized for the comparison of sequences is the algorithm of Myers and Miller, CABIOS (1989). Such an algorithm is incorporated into the ALIGN program (version 2.0) which is part of the FASTA sequence alignment software package (Pearson W R, Methods Mol Biol, 2000, 132:185-219). Align calculates sequence identities based on a global alignment. Align0 does not penalise to gaps in the end of the sequences. When utilizing the ALIGN or Align0 program for comparing amino acid sequences, a BLOSUM50 substitution matrix with gap opening/extension penalties of −12/−2 is preferably used.

Sequence identity according to the present invention is determined over the entire length of the reference sequence.

The starting liquid may be contacted by said enzyme capable of catalysing conversion of a sugar to glucose, for example an enzyme capable of catalysing hydrolysis of maltose to glucose, at any suitable time during the methods. Thus, this step may be performed prior to performed step c). It is also possible that this is done simultaneously with step c). It is furthermore possible that this is done at the same time as preparing the starting liquid. Thus, the starting liquid may be prepared by contacting any suitable liquid with said enzyme and optionally one or more additional compounds.

In one embodiment of the invention the starting liquid is prepared by contacting an extract of a plant or a fruit, e.g. a malt extract with an enzyme capable of catalysing conversion of a sugar to glucose, for example an enzyme capable of catalysing hydrolysis of maltose to glucose as well as with one or more additional enzymes. The enzyme capable of catalysing conversion of a sugar to glucose may in particular be a glucan 1,4-α-glucosidases, whereas the additional enzymes for example may be one or more selected from the group consisting of proteases, pullulanases, α-amylases, β-amylases, β-glucosidases, pectinases and cellulases.

Step b) of the methods of the invention may in one embodiment comprise contacting the starting liquid with one or more enzymes selected from the group consisting of enzymes classified under EC 3.2.1.3, enzymes classified under EC 3.2.1.1 and enzymes classified under EC 3.2.1.41. In particular, Step b) of the methods of the invention may in one embodiment comprise contacting the starting liquid with one or more enzymes selected from the group consisting of glucan 1,4-α-glucosidases, α-amylases and pullulanases, wherein said glucan 1,4-α-glucosidase, α-amylase and pullulanase may be any of the glucan 1,4-α-glucosidases, α-amylases and pullulanases described herein above.

The enzymes may be provided in any suitable manner for example as recombinant polypeptides or purified from a source organism. The enzyme may also be provided within an enzyme mixture or as a crude extract of the source organism. Source organisms may for example be *Aspergillus* spp. or *Rhizopus* spp. This may in particular be the case for glucan 1,4-α-glucosidases and α-amylases. The source organism may also be *Bacillus* spp. or *Lactobacillus* spp. This may in particular be the case for pullulanase. Suitable enzyme preparations are commercially available for example from Novozymes, Denmark.

The step b) may comprise converting at least 50%, such as at least 60%, for example at least 70%, such as at least 80%, for example at least 90% of the sugar in the starting liquid, which is not glucose into glucose.

Thus, step b) may comprise converting at least 50%, such as at least 60%, for example at least 70%, such as at least 80%, for example at least 90%, such as at least 95%, for example at least 98% of the maltose in the starting liquid to glucose, In particular, when the starting liquid is wort, step b) may comprise converting at least 50%, such as at least 60%, for example at least 70%, such as at least 80%, for example at least 90%, such as at least 95%, for example at least 98% of the maltose in said wort to glucose, Step b) may comprise converting at least 50%, such as at least 60%, for example at least 70%, such as at least 80%, for example at least 90%, such as at least 95%, for example at least 98% of the maltotriose in the starting liquid to glucose, Step b) may comprise converting at least 50%, such as at least 60%, for example at least 70%, such as at least 80%, for example at least 90%, such as at least 95%, for example at least 98% of the sucrose in the starting liquid to glucose.

Step b) may comprise converting at least 50%, such as at least 60%, for example at least 70%, such as at least 80%, for example at least 90%, such as at least 95%, for example at least 98% of the fructose in the starting liquid to glucose.

When said sugar is converted to glucose with the aid of an enzyme, the amount of sugar converted to glucose may be adjusted by adjusting time of enzyme treatment, the temperature and/or the amount of enzyme used. The skilled person will be able to determine a useful time, temperature and amount to obtain the desired amount of sugar conversion.

In another embodiment of the invention step b) is performed with the aid of a microorganism. Said microorganism should be capable of catabolizing said sugar to form glucose. It is furthermore preferred that said microorganism is capable of excreting at least part of the formed glucose to the surrounding liquid.

It is furthermore preferred that said microorganism is completely devoid of extracellular proteases, i.e. that said microorganism does not express and excrete any protease.

In preferred embodiments of the invention, then step b) comprises converting maltose to glucose. This is in particular the case in embodiments of the invention where the starting liquid comprises maltose and/or maltotriose, for example in embodiments of the invention where the starting liquid comprises a malt extract and/or wort. Thus, step may comprise converting maltose to glucose by contacting the starting liquid with a maltose catabolising microorganism capable of converting maltose to glucose.

Preferably said maltose catabolising microorganism is capable of excreting at least part of said glucose. More preferably said maltose catabolising microorganism is capable of taking up maltose from the starting liquid, hydrolysing said maltose to glucose and excreting at least part of said glucose.

The maltose catabolising microorganism may be any microorganism, but in one embodiment it is a bacterium. An example of a useful maltose catabolising microorganism is *Lactobacillus sanfransiscensis*.

Incubation with Glucose Fermenting Microorganism

The methods of the invention may comprise a step c) of incubating the liquid with one or more glucose fermenting microorganism.

The term "glucose fermenting microorganism" as used herein refers to any microorganism capable of converting glucose to alcohols and/or acids under anaerobic conditions. Preferably, the glucose fermenting microorganism is a microorganism capable of converting glucose to an organic acid under anaerobic conditions. Said organic acid may be any of the organic acids described herein below in the section "Organic acid". In particular, the organic acid may be selected from the group consisting of lactic acid, citric acid, malic acid, tartaric acid, acetic acid, succinic acid, isocitric acid, α-ketoglutaric acid, fumaric acid and oxaloacetic acid. In a preferred embodiment the organic acid is lactic acid.

Accordingly, in a preferred embodiment of the invention glucose fermenting microorganism is capable of fermenting glucose to obtain lactic acid. More preferably the glucose fermenting microorganism is capable of taking up glucose, converting the glucose to lactic acid under anaerobic conditions and excreting at least some of said lactic acid.

The glucose fermenting microorganism to be used with the present invention may preferably be selected from the group consisting of yeast and bacteria. In particular, the glucose fermenting microorganism may be a food grade microorganism, i.e. a microorganism which is acceptable for use in production of food and beverages for human beings.

In one embodiment it is preferred that the glucose fermenting microorganism is a microorganism, which cannot grow to any significant extent in beer, more preferably said microorganism is not capable of growing in beer. In particular, the microorganism may be a bacterium not capable of growing in beer.

It is furthermore preferred that said microorganism is completely devoid of extracellular proteases, i.e. that said microorganism does not express and excrete any protease.

In one embodiment the microorganism is yeast. Said yeast may for example be a yeast of the Kluyveromyces family, e.g. *K. lactis* or *K. marxianus*. The yeast may also be any of the organic acid producing yeasts described in Loureiro V, Malfeito-Ferreira M: Spoilage yeasts in the wine industry, International Journal of Food Microbiology 2003:86:23-50. For example the yeast may be of the *Kloeckera*, *Dekkera/Brettanomyces* or *Pichia* family.

In one embodiment of the invention the yeast may be selected from the group consisting of yeasts listed in table 1.

TABLE 1

| Genus | Species |
| --- | --- |
| *Ambrosiozyma* van der Walt | *A. philentoma* |
| | *A. platypodis* |
| *Cyniclomyces* van der Walt et Scott | *C. guttulatus* |
| *Debaryomyces* | *D. marama* |
| | *D. tamarii* |
| | *D. ranriji* var. *Vanriji* |
| *Guilliermondella* Nadson et Krassinikov | *G. selenospa* |
| *Hanseniaspora* zikes | *H. guilliermondii* |
| | *H. occidentalis* |
| | *H. osmophila* |
| | *H. uvarum* |
| | *H. valbyensis* |
| | *H. vineae* |
| *Hansenula* H. et P. Sydow | *H. alni* |
| | *H. americana* |
| | *H. beckii* |
| | *H. beijerinckii* |
| | *H. bimundalis* |

TABLE 1-continued

| Genus | Species |
| --- | --- |
| | *H. californica* |
| | *H. canadensis* |
| | *H. capsulata* |
| | *H. dimennae* |
| | *H. holstii* |
| | *H. jadinii* |
| | *H. minuta* |
| | *H. petersonii* |
| | *H. polymorpha* |
| | *H. saturnus* var. *Saturnus* |
| *Issatchenkia* Kudriavzev | *I. iccidentalis* |
| | *I. orientalis* |
| | *I. scutulata* var. *scutulata* |
| | *I. terricola* |
| *Kluyveromyces* van der Walt emend van der Walt | *K. delphensis* |
| | *K. phaffii* |
| | *K. africanus* |
| | *K. blattae* |
| | *K. waltii* |
| | *K. lodderi* |
| | *K. polysparus* |
| | *K. wickerhomii* |
| | *K. aestuarii* |
| *Metschnikowia* Kamienski | *M. bicuspidata* var. *bicuspidata* |
| | *M. lunata* |
| | *M. pulcherrima* |
| | *M. zobellii* |
| *Nadsonia* Sydow | *N. elongata* |
| *Pachysolen* Boidin et Adzet | *P. tannophilus* |
| *Pachytichospora* van der Walt | *P. transvaalensis* |
| *Pichia* Hansen | *P. abadieae* |
| | *P. amylophia* |
| | *P. besseyi* |
| | *P. bovis* |
| | *P. cactophila* |
| | *P. delftensis* |
| | *P. dispora* |
| | *P. farinosa* |
| | *P. fermentans* |
| *Saccharomyces* Meyen ex Reess | *S. aceti* |
| | *S. capensis* |
| | *S. chevalieri* |
| | *S. coreanus* |
| | *S. globosus* |
| | *S. norbensis* |
| | *S. oleaceus* |
| | *S. servazzii* |
| | *S. telluris* |
| | *S. unisporus* |
| *Saccharomyces* Hansen Synonym: *Saccharomyces ludwigii* Hansen var. vini Kroemer et Heinrich (1922) | *S. ludwigii* |
| *Saccharomycopsis* Schonning | *S. crataegensis* |
| | *S. vini* |
| *Schizosaccharomyces* Lindner | *S. malide vorans* |
| *Torulaspora* Lindner | *T. globosa* |
| *Zygosaccharomyces* Barkev | *Z. bailii* |
| | *Z. bisporus* |
| | *Z. microellipsoides* |
| | *Z. mrakii* |
| *Leucosporidium* Fell, Statzell, Hunter et Phaff | *L. frigidium* |
| | *L. nivalis* |
| *Brettanomyces* Kufferath et van Laer | *B. abstinens* |
| | *B. custersianus* |
| | *B. naardensis* |
| *Candida* Berkout | *C. anatomiae* |
| | *C. apicola* |
| | *C. atlantica* |
| | *C. atmospherica* |
| *Kloeckera* Janke | *K. apiculata* |
| | *K. apis* |
| | *K. Corticis* |
| | *K. japonica* |
| | *K. javanica* |
| *Trichosporon* Behrend | *T. eriense* |
| | *T. fermentans* |

In one embodiment of the invention the glucose fermenting microorganism is a lactic acid bacterium. The lactic acid bacterium may for example be a bacterium of the order Lactobacillales. In particular the lactic acid bacterium may be a bacterium of a genus selected from the group consisting of *Bifidobacterium, Lactobacillus, Leuconostoc, Pediococcus, Lactococcus, Aerococcus, Carnobacterium, Enterococcus, Oenococcus, Sporolactobacillus, Streptococcus, Tetragenococcus, Vagococcus* and *Weisella*. In particular, the lactic acid bacterium may be a bacterium of a genus selected from the group consisting of *Bifidobacterium, Lactobacillus, Lactococcus* and *Streptococcus*.

Thus, in one embodiment the glucose fermenting microorganism may be a *lactobacillus* selected from the group consisting of *L. chungangensis, L. fujiensis, L. garvieae, L. lactis, L. piscium, L. plantarum* and *L. raffinolactis*. Preferably the glucose fermenting microorganism may be *Lactococcus lactis*.

Thus, in one embodiment the glucose fermenting microorganism may be a *lactobacillus* selected from the group consisting of *L. acetotolerans, L. acidifarinae, L. acidipiscis, L. acidophilus, L. agilis, L. algidus, L. alimentarius, L. amylolyticus, L. amylophilus, L. amylotrophicus, L. amylovorus, L. animalis, L. antri, L. apodemi, L. aviarius, L. bifermentans, L. brevis, L. buchneri, L. camelliae, L. casei, L. catenaformis, L. ceti, L. coleohominis, L. collinoides, L. composti, L. concavus, L. coryniformis, L. crispatus, L. crustorum, L. curvatus, L. delbrueckii, L. dextrinicus, L. diolivorans, L. equi, L. equigenerosi, L. farraginis, L. farciminis, L. fermentum, L. fornicalis, L. fructivorans, L. frumenti, L. fuchuensis, L. gallinarum, L. gasseri, L. gastricus, L. ghanensis, L. graminis, L. hammesii, L. hamsteri, L. harbinensis, L. hayakitensis, L. helveticus, L. hilgardii, L. homohiochii, L. iners, L. ingluviei, L. intestinalis, L. jensenii, L. johnsonii, L. kalixensis, L. kefiranofaciens, L. kefiri, L. kimchil, L. kitasatonis, L. kunkeei, L. leichmannii, L. lindneri, L. malefermentans, L. mali, L. manihotivorans, L mindensis, L. mucosae, L. murinus, L. nagelii, L. namurensis, L. nantensis, L. oligofermentans, L. oris, L. panis, L. pantheris, L. parabrevis, L. parabuchneri, L. paracollinoides, L. parafarraginis, L. parakefiri, L. paralimentarius, L. paraplantarum, L. pentosus, L. perolens, L. plantarum, L. pontis, L. psittaci, L. rennini, L. reuteri, L. rhamnosus, L. rimae, L. rogosae, L. rossiae, L. ruminis, L. saerimneri, L. sakei, L. salivarius, L. satsumensis, L. secaliphilus, L. sharpeae, L. siliginis, L. spicheri, L. suebicus, L. thailandensis, L. ultunensis, L. vaccinostercus, L. vaginalis, L. versmoldensis, L. vini, L. vitulinus, L. zeae* and *L. zymae*, preferably the *lactobacillus* may be selected from the group consisting of *L. amylolyticus, L. delbrueckii* and *L. fermentum*.

Thus, in one embodiment the glucose fermenting microorganism may be a Pediococcus selected from the group consisting of *P. acidilactici, P. cellicola, P. claussenii, P. damnosus, P. dextrinicus, P. ethanolidurans, P. inopinatus, P. parvulus, P. pentosaceus* and *P. stilesii*, preferably the Pediococcus may be selected from the group consisting of *P. acidilactici, P. dextrinicus* and *P. pentosaceus*.

In one embodiment the glucose fermenting microorganism may be a Gluconobacter, such as Gluconobacter oxydans. Gluconobacter and in particular Gluconobacter oxydans is capable of fermenting a range of sugars to form an organic acid. Thus, for example Gluconobacter and in particular Gluconobacter oxydans may be capable of fermenting a range of sugars including maltose and glucose to obtain gluconic acid. Thus, in embodiments of the invention where the glucose fermenting microorgasnism is a gluconobacter, then step b) may be omitted from the methods of the invention. Accordingly, Gluconobacter is an example of a microorganism capable of fermenting sugar to form an organic acid.

The liquid may be incubated with the glucose fermenting microorganism in any suitable manner. In general the incubation is performed in a closed container or a closed vessel. In one preferred embodiment the incubation is performed within one or more chambers defined by two an-ion exchange membranes as described herein below in the section AX-REED.

The incubation may be performed for any suitable amount of time. In general the incubation may be for in the range from 12 h to 1 week, for example for in the range of 12 h to 48 h, such as for in the range of 12 h to 30 h, for example for in the range of 20 to 28 h. In one embodiment of the invention, wherein steps c) and d) are performed simultaneously, the incubation time is selected to obtain a desired retention time. Also the incubation time may be selected in order to obtain a preferred contact time as described herein below in the section "Contact time".

In particular, the incubation may be performed until a desired glucose level is achieved. For example, step c) may result in a reduction of the glucose level to at the most 100 g/L, preferably to at the most 80 g/L, more preferably to at the most 60 g/L, even more preferably to at the most 40 g/L.

The incubation may be performed at any suitable temperature. Preferably, the temperature is selected to be an appropriate temperature to allow growth of the particular glucose fermenting microorganism. In general the temperature will be in the range of 15 to 40° C., such as in the range of 20 to 35° C., for example in the range of 23 to 32° C. This may in particular be the case, when the glucose fermenting microorganism is a lactic acid bacterium, such as *Lactococcus lactis*.

Method of Producing beverage with Enzymatic Conversion of Sugar

It is one aspect of the invention to provide methods for producing beverages low in both sugar and alcohol. This is obtained by converting at least part of the sugar in the starting liquid to an organic acid and removal of at least part of the organic acid. The sugar may be converted to an organic acid by the aid of an enzyme. Thus, in one embodiment the invention relates to a method comprising the steps of a) providing a starting liquid comprising at least one micro-nutrient and at least one sugar; and c) incubating said liquid with an enzyme or a mixture of enzymes capable of catalysing conversion of sugar to form an organic acid; and d) removing at least 10% of said organic acid from said liquid while retaining at least 65% of said at least one micro-nutrient in said liquid, thereby obtaining an AX-REED liquid wherein said organic acid is removed through an Anion Exchange Reverse Electro-Enhanced Dialysis (AX-REED) membrane stack.

Frequently, the methods also comprise a step b) of converting any sugar, which is not glucose to glucose. In these embodiments step c) will relate to converting glucose to form an organic acid.

In the methods of the invention step c) is an optional step. However, in one embodiment of the invention the methods comprise performing step c). For example, the methods may comprise performing step c (ii). Thus, in one embodiment the invention relates to a method of preparing a beverage, wherein the method comprises the steps of a) providing a starting liquid comprising at least one micro-nutrient and at least one sugar; and
b) if said sugar is not glucose converting at least some of said sugar to glucose for example by contacting the starting liquid with an enzyme capable of catalysing conversion the particular sugar in question to glucose; and
c) incubating said liquid with an enzyme or a mixture of enzymes capable of catalysing conversion of glucose to form an organic acid; and
d) removing at least 10% of said organic acid from said liquid while retaining at least 65% of said at least one micro-nutrient in said liquid, thereby obtaining an AX-REED liquid
   wherein said organic acid is removed through an Anion Exchange Reverse Electro-Enhanced Dialysis (AX-REED) membrane stack.

Said enzyme or mixture of enzymes capable of catalysing conversion of glucose to an organic acid may be any of the enzymes or mixtures of enzymes described herein below in the section "Enzymatic conversion of glucose".

Said AX-REED liquid may be the final beverage or it may be further processed to obtain the final beverage as described below.

These methods may furthermore comprise step e) and thus in one aspect the invention relates to a method of preparing a beverage, wherein the method comprises the steps of
a) providing a starting liquid comprising at least one micro-nutrient and at least one sugar; and
b) if said sugar is not glucose converting at least some of said sugar to glucose for example by contacting the starting liquid with an enzyme capable of catalysing conversion the particular sugar in question to glucose; and
c) incubating said liquid with an enzyme or a mixture of enzymes capable of catalysing conversion of glucose to form an organic acid; and
d) removing at least 10% of said organic acid from said liquid while retaining at least 65% of said at least one micro-nutrient in said liquid, thereby obtaining an AX-REED liquid
   wherein said organic is removed through an Anion Exchange Reverse Electro-Enhanced Dialysis (AX-REED) membrane stack; and
e) removing at least part of one cation from the AX-REED liquid, while retaining at least 65% of said at least one micro-nutrient in said liquid, thereby obtaining a CX-REED liquid,
   wherein said cation is removed through an Cation Exchange Reverse Electro-Enhanced Dialysis (CX-REED) membrane stack.

As described herein elsewhere, then steps d) and e) may be performed as least partly simultaneous, and thus in one aspect the invention relates to a method of preparing a beverage, wherein the method comprises the steps of
a) providing a starting liquid comprising at least one micro-nutrient and at least one sugar; and
b) if said sugar is not glucose converting at least some of said sugar to glucose for example by contacting the starting liquid with an enzyme capable of catalysing conversion the particular sugar in question to glucose; and
c) incubating said liquid with an enzyme or a mixture of enzymes capable of catalysing conversion of glucose to form an organic acid; and
d) removing at least 10% of said organic acid from said liquid,
   wherein said organic is removed through an Anion Exchange Reverse Electro-Enhanced Dialysis (AX-REED) membrane stack; and
e) at least partly simultaneously
   removing at least part of one cation from the starting liquid or the partly AX-REED treated liquid, thereby obtaining a REED liquid, wherein said REED liquid retains at least 65% of said at least one micro-nutrient,
   wherein said cation is removed through an Cation Exchange Reverse Electro-Enhanced Dialysis (CX-REED) membrane stack.

The CX-REED liquid or the REED liquid may be the final beverage or it may be further processed to obtain the final beverage. It is preferred that the CX-REED liquid or the REED liquid is the final beverage or that the final beverage is obtained by adding one or more additional compounds to the CX-REED liquid or the REED liquid.

Thus, the method may furthermore comprise a step f) of adding one or more additional compounds to the starting liquid, the AX-REED liquid, the CX-REED liquid or the REED liquid. In embodiments of the invention not containing step e), then step f) preferably comprises adding one or more additional compounds to the AX-REED liquid. In one aspect the invention relates to a method of preparing a beverage, wherein the method comprises the steps of
a) providing a starting liquid comprising at least one micro-nutrient and at least one sugar; and
b) if said sugar is not glucose converting at least some of said sugar to glucose for example by contacting the starting liquid with an enzyme capable of catalysing conversion the particular sugar in question to glucose; and
c) incubating said liquid with an enzyme or a mixture of enzymes capable of catalysing conversion of glucose to form an organic acid; and
d) removing at least 10% of said organic acid from said liquid while retaining at least 65% of said at least one micro-nutrient in said liquid, thereby obtaining a AX-REED liquid
   wherein said organic acid is removed through an Anion Exchange Reverse Electro-Enhanced Dialysis (AX-REED) membrane stack; and
e) removing at least part of one cation from the AX-REED liquid, while retaining at least 65% of said at least one micro-nutrient in said liquid, thereby obtaining a CX-REED,
   wherein said cation is removed through an Cation Exchange Reverse Electro-Enhanced Dialysis (CX-REED) membrane stack; and
f) adding one or more additional compounds to the CX-REED liquid, preferably one or more additional compound selected from the group consisting of flavour compounds and preservatives, thereby obtaining the beverage.

The method may also comprise a step g) of adding one or more additional liquids to the AX-REED liquid or the CX-REED liquid or the REED liquid in order to obtain the final beverage. In particular said additional liquids may be beverages, so that the final beverage is a mixture between the CX-REED liquid and an additional beverage or a mixture between the REED liquid and an additional beverage. Thus, in one aspect the invention relates to a method of preparing a beverage, wherein the method comprises the steps of
a) providing a starting liquid comprising at least one micro-nutrient and at least one sugar; and
b) if said sugar is not glucose converting at least some of said sugar to glucose for example by contacting the starting liquid with an enzyme capable of catalysing conversion the particular sugar in question to glucose; and c) incubating said liquid with an enzyme or a mixture of enzymes capable of catalysing conversion of glucose to form an organic acid; and d) removing at least 10% of said organic acid from said liquid while retaining at least 65% of said at least one micro-nutrient in said liquid, thereby obtaining a AX-REED liquid
   wherein said organic acid is removed through an Anion Exchange Reverse Electro-Enhanced Dialysis (AX-REED) membrane stack; and e) removing at least part of one cation from the AX-REED liquid, while retaining at least 65% of said at least one micro-nutrient in said liquid, thereby obtaining a CX-REED,
   wherein said cation is removed through an Cation Exchange Reverse Electro-Enhanced Dialysis (CX-REED) membrane stack; and f) optionally adding one or more additional compounds to the CX-REED liquid, preferably one or more additional compound selected from the group consisting of flavour compounds and preservatives; and g) providing an additional liquid, for example a beverage and mixing said CX-REED liquid with said additional liquid, thereby obtaining the beverage.

Said additional liquid may be any of the additional liquids described herein above in the section "Method of producing fermented beverages". The methods may be useful for preparing low alcohol beer, low alcohol cider, low alcohol wine and low calorie cider as described above in the section "Method of producing fermented beverages".

It is also comprised within the present invention that the methods may comprise a step h) of further processing the AX-REED liquid or the CX-REED liquid or the REED liquid in order to obtain the final beverage. Said further processing may for example be a step of incubation of the AX-REED liquid or the CX-REED liquid or REED liquid with one or more microorganisms, such as yeast. Said methods may comprise above described step g), and thus the methods may comprise incubation of the liquid obtained in step g) with one or more microorganisms, such as yeast. The microorganisms to be employed in step h) may in particular be yeast, such as Brewer's yeast, for example yeast *Saccharomyces cerevisiae* or *Saccharomyces pastorianus*, formerly known as *S. carisbergensis*. Thus, in one aspect the invention relates to a method of preparing a beverage, wherein the method comprises the steps of a) providing a starting liquid comprising at least one micro-nutrient and at least one sugar; and b) if said sugar is not glucose converting at least some of said sugar to glucose; and c) incubating said liquid with an enzyme or a mixture of enzymes capable of catalysing conversion of glucose to form an organic acid; and d) removing at least 10% of said organic acid from said liquid while retaining at least 65% of said at least one micro-nutrient in said liquid, thereby obtaining a AX-REED liquid
   wherein said organic acid is removed through an Anion Exchange Reverse Electro-Enhanced Dialysis (AX-REED) membrane stack; and e) removing at least part of one cation from the AX-REED liquid, while retaining at least 65% of said at least one micro-nutrient in said liquid, thereby obtaining a CX-REED liquid,
   wherein said cation is removed through an Cation Exchange Reverse Electro-Enhanced Dialysis (CX-REED) membrane stack; and f) optionally adding one or more additional compounds to the CX-REED liquid, preferably one or more additional compound selected from the group consisting of flavour compounds and preservatives; and h) incubating said AX-REED liquid or said X-REED liquid with one or more microorganisms, such as yeast, optionally followed removal of said microorganism, thereby obtaining the beverage.

During step c) an organic acid is generated and during step d) at least some of said generated organic acid is removed. As described elsewhere steps c) and d) may be performed simultaneously, and thus the organic acid may be continuously generated with the aid of said enzyme(s) and at least some or the generated organic acid may continuously be removed through said AX-REED membrane stack. While at least 10% of the organic acid is removed it is contained within the invention that at least some of the generated organic acid is maintained in the beverage and thus it is comprised within the invention, that the beverage may contain more organic acid than the starting liquid. This is in particular the case, when the starting liquid has a high level of sugar and a low level of organic acids. In order to reach a palatable ratio between sugar and organic acid, such as any of the ratios described herein below in the section "Ratio of sugar to organic acid", then it may be preferable that the beverage contains more organic acid that the starting liquid. Thus, preferably the beverage has a ratio of sugar to organic acid as described herein below in the section "Ratio of sugar to organic acid".

Organic acids may in inhibit the activity of certain enzymes. Thus, in embodiments of the invention where step c) and step d) are performed simultaneously, it is preferred that the sufficient organic acid is removed in order for the enzyme(s) to maintain at least most of the activity.

It is preferred that at least 10% of the generated organic acid is removed during step d). Thus for example at least 15%, for example at least 20%, such as at least 25%, such as at least 30% of the organic acid generated in step c) is preferably removed in step d). Said organic acid may be any of the organic acids described herein below in the section "Organic acid".

In particular it is preferred that at least 10% of generated gluconic acid is removed during step d), Thus, step d) may in a preferred embodiment comprise removal of at least 10% of the gluconic acid, for example at least 15% of the gluconic acid, for example at least 20% of the gluconic acid, such as at least 25% of the gluconic acid, such as at least 30% of the gluconic acid generated in step c). This is in particular the case in embodiments of the invention, where said enzyme or mixture of enzymes catalyses conversion of glucose to form gluconic acid.

In particular it is preferred that at least 10% of generated lactic acid is removed during step d), Thus, step d) may in a preferred embodiment comprise removal of at least 10% of the lactic acid, for example at least 15% of the lactic acid, for example at least 20% of the lactic acid, such as at least 25% of the lactic acid, such as at least 30% of the lactic acid generated in step c). This is in particular the case in embodiments of the invention, where said enzyme or mixture of enzymes catalyses conversion of glucose to form lactic acid.

In these embodiments of the invention the micro-nutrient may for example be any of the micro-nutrients described herein below in the section "Micro-nutrient"; and the sugar may for example be any of the sugars described in the section "Sugar", and step d) may for example be performed in any of the ways described in the section "AX-REED and step e) may for example be performed in any of the ways described in the section "CX-REED". Said ratio of sugar to organic acid may be any of the ratios described herein below in the section "Ratio of sugar to organic acid".

In particular, in embodiments of the invention relating to methods of producing beverages with enzymatic conversion of sugar, then it is preferred that said micro-nutrient is selected from the group consisting of minerals and vitamins. Similarly, in embodiments of the invention relating to methods pf producing beverages with enzymatic conversion of glucose, then it is preferred that said micronutrient is selected from the group consisting of minerals and vitamins, and in particular from the group consisting of calcium, magnesium, iron, vitamin B1 and vitamin B2. In particular the micro-nutrient may be selected from the group of minerals and vitamins described herein below in the section "Micro-nutrient".

The starting liquid may be any liquid useful for preparing a beverage. It is generally preferred that the starting liquid is a natural product. The term "natural product" as used herein refers to a product obtain from natural sources by extraction in water or by squeezing, wherein no extra chemicals are added. Thus, in one embodiment the starting liquid is an extract, concentrate or a juice of a plant or a plant part, where no extra sugar has been added.

In embodiments of the invention relating to producing a beverage with enzymatic conversion of sugar, it is preferred that the starting liquid has a relatively high level of one or more sugars, for example a high level of one or more of the sugars described herein below in the section "Sugar". Thus, the starting liquid may for example comprise more than 10%, for example more than 9%, such as more than 8%, for example more than 7% sugar. Said percentages are given as w/w.

In one embodiment of the invention the starting liquid is a liquid with a high level of maltose. Thus the starting liquid may be a liquid containing more than 40 g/L, such as more than 50 g/L, for example more than 60 g/L maltose.

In particular, the starting liquid may be an extract of one or more cereals. Said cereals may for example be selected from the group consisting of barley, wheat, rye, oat, maize, rice, sorghum, millet, triticale, buckwheat, fonio and quinona. More preferably, the cereal is selected from the groups consisting of barley, wheat, rye, oat, maize and rice, more preferably the cereal is barley.

The extract may be an extract of the cereal per se, however the cereal may also be malted and the extract may be an extract of the malted cereal. As used herein the term "malted", refers to the cereal grains having been subjected to steeping, allowed to germinate and then dried. Said drying may for example be kiln drying.

Said extract of a cereal or a malted cereal is preferably an aqueous extract.

Thus, in a preferred embodiment of the invention, and in particular in embodiments of the invention relating to methods of producing a beverage with enzymatic conversion of sugar, then the starting liquid may be a malt extract, such as a barley malt extract. More preferably the starting liquid may be wort. The starting liquid may also be an extract of a mixture or barley malt and other cereals.

In a particularly preferred embodiment the starting liquid is wort. By the term "wort" as used herein is meant a liquid extract of malt. Wort may also be prepared by incubating an extract of un-malted barley with an enzyme mixture that hydrolyzes the barley components. In addition to said malt or barley-derived extracts, the wort may be prepared from malt and additional components, such as additional starch-containing material partly converted into fermentable sugars. The wort is in general obtained by mashing, optionally followed by sparging.

The term "Mashing" as used herein refers to the incubation of milled malt in water. Mashing is preferably performed at a specific temperature, and in a specific volume of water. Mashing can occur in the presence of adjuncts, which is understood to comprise any carbohydrate source other than malt, such as, but not limited to, unmalted barley, barley syrups, or maize, or rice—either as whole kernels or processed products like grits, syrups or starch.

The term "sparging" as used herein refers to a process of extracting residual sugars and other compounds from spent grains after mashing with hot water. Sparging is typically conducted in a lauter tun, a mash filter, or another apparatus to allow separation of the extracted water from spent grains.

The wort obtained after mashing is generally referred to as "first wort", while the wort obtained after sparging is generally referred to as the "second wort". If not specified, the term wort may be first wort, second wort, or a combination of both.

Thus, the starting liquid may be wort, such as first wort, second wort or a mixture thereof.

It is also comprised within the invention that the starting liquid may be an extract, a concentrate or a juice of a plant or a plant part, which has been treated with one of more enzymes. For example said extract, concentrate or juice of a plant or a plant part, may have been treated with one or more enzymes selected from the group consisting of glucosidases, proteases, pectinases and cellulases. In embodiments of the invention, where the starting liquid is wort, the said starting liquid may have been prepared employing a step of enzyme treatment with one or more enzymes selected from the group consisting of glucosidases, proteases, pectinases and cellulases, preferably from the group consisting of glucan 1,4-α-glucosidases, proteases, pullulanases, α-amylases, β-amylases, limit dextrinases and β-glucosidases. Treatment with glucan 1,4-α-glucosidases may be considered as step b) of the methods of the invention. Said enzymes may in particular be employed in order to degrade starch in order to obtain sugars, such as maltose.

However in one embodiment it is preferred that no proteases are added at any step during the procedure.

In certain embodiments of the invention the pH of the starting liquid may be adjusted by addition of base or acid, such as potassium hydroxide or lactic acid. This may for example be done in order to start the enzyme treatment at a pH where the enzyme has good activity.

The methods of the invention may thus comprise several enzyme treatments, e.g. one or more of the following:

i) Treatment with one or more enzymes to obtain a starting liquid comprising sugar. Said enzymes may in particular be enzymes capable of catalysing conversion of starch to obtain sugar. Useful examples of such enzymes are described herein above in this section.

ii) Treatment with one or more enzymes capable of catalysing conversion of other sugars to glucose, e.g. enzymes capable of catalysing conversion of maltose to glucose. This enzyme treatment may constitute step b) of the methods of the invention. Useful examples of such enzymes are described herein above in the section "Converting sugar to glucose".

iii) Treatment with an enzyme or a mixture of enzymes capable of catalysing conversion of glucose to form an organic acid. This enzyme treatment may constitute step c). Useful examples of such enzymes are described herein below in the section "Enzymatic conversion of glucose".

These enzyme treatments may be performed simultaneously of sequentially. In particular treatment ii) and iii), which may constitute steps b) and c) of the methods of the invention may be performed simultaneously.

In one embodiment of the invention the starting liquid is a fruit juice or extract containing a high level of sugar. In particular, the starting liquid may be a fruit juice or extract, which naturally contains a high level of sugar, such as more than 40 g/L, such as more than 50 g/L, for example more than 60 g/L sugar. Said fruit juice may for example be grape juice, pear juice or apple juice. The methods of the invention may be used to produce a palatable beverage with reduced sugar content compared to the fruit juice or extract, while retaining one or more valuable micronutrients.

In embodiments of the invention, wherein the starting liquid comprises a malt extract and/or wort, then the starting liquid in general will comprise high levels of maltose, and in these embodiments of the invention the methods preferably comprises a step of converting at least some of said maltose to glucose.

Accordingly, it is also one aspect of the invention to provide methods of preparing a beverage, wherein the methods comprise the steps of a) providing a starting liquid comprising at least one micro-nutrient and maltose, wherein said starting liquid for example may comprise or even consist of a malt extract and/or wort; and
b) converting at least some of said maltose to glucose for example by incubation with an enzyme capable of catalysing hydrolysis of maltose to glucose; and
c) incubating said liquid with an enzyme or a mixture of enzymes capable of catalysing conversion of glucose to form an organic acid; and
d) removing at least 10% of said organic acid from said liquid while retaining at least 65% of said at least one micro-nutrient in said liquid, thereby obtaining an AX-REED liquid,
  wherein said acidic ion is removed through an Anion Exchange Reverse Electro-Enhanced Dialysis (AX-REED) membrane stack as described herein below in the section "AX-REED"

and optionally the method further comprises one of both of the steps e) and f) as outlined above.

Step b) of converting maltose to glucose may be performed in any of the ways described above in the section "Converting sugar to glucose", and in particular step b) may comprise contacting the starting liquid with an enzyme capable of catalysing hydrolysis of maltose to glucose as described in the section "Converting sugar to glucose", Step c) of the methods for producing a beverage with enzymatic conversion of glucose may be performed in any of the ways described herein below in the section "Enzymatic conversion of glucose".

Step b) and step c) may be performed sequentially, by first performing step b) and then step c). It is however also comprised in the invention that step b) and step c) can be performed simultaneously or at least partly simultaneously. For example, when step b) is performed with the aid of an enzyme as described in the section "Converting sugar to glucose" herein below, then the enzyme may be added to the starting liquid together with said enzyme or mixture of enzymes capable of catalysing conversion of glucose to form an organic acid. When step b) is performed with the aid of a microorganism such as a maltose catabolising microorganism as described in the section "Converting sugar to glucose" herein below, then the starting liquid may be incubated with said microorganism and with said enzyme or mixture of enzymes capable of catalysing conversion of glucose to obtain an organic acid simultaneously. In embodiments of the invention where step b) is performed with the aid of a microorganism it is preferred that step b) and step c) are performed simultaneously.

Steps c) and d) may also be performed sequentially, by first performing step c) and then step d). It is however preferred that step c) and step d) are performed simultaneously or at least partly simultaneously. Thus, the liquid may be incubated with said enzyme or mixture of enzymes capable of catalysing conversion of glucose to form an organic acid and simultaneously at least some of said organic acid is removed from the liquid. Thus, as the organic acid is produced by the enzymatically catalysed reaction, then it is removed from the liquid, ensuring a constant low level of said organic acid in the liquid. This may avoid reduction or inhibition of enzyme activity due to high product levels and/or due to acidic conditions.

Accordingly, the steps b), c) and d) may all be performed simultaneously. Alternatively, step b) may be performed first, and then steps c) and d) may be performed simultaneously.

Step d) may be performed prior to step e), however it is also contained within the invention that steps d) and e) may be performed simultaneously.

In one preferred embodiment of the invention steps d) and e) are performed simultaneously. Thus, in this embodiment steps b), c), d) and e) may all be performed simultaneously. Alternatively, step b) may be performed first and then steps c), d) and e) may be performed simultaneously. Steps d) and e) may in particular be performed simultaneously by using a REED equipment containing at least one AX-REED and at least one CX-REED membrane stack, wherein said AX-REED and said CX-REED membrane stacks are connected in parallel.

In yet another very preferred embodiment of the invention steps d) and e) are performed partly simultaneously. In this embodiment step d) may for example be performed for a given time period, where after both steps d) and e) are performed simultaneously. Thus, one or more acidic ions may be removed from the liquid through AX-REED for a given time period, where after both acidic ions and at least one cation are removed respectively through AX-REED and CX-REED, wherein the AX-REED and the CX-REED are performed simultaneously. Thus, in this embodiment steps b), c), d) and e) may all be performed at least partly simultaneously. Alternatively, steps b) may be performed first and then steps c), d) and e) may be performed at least partly simultaneously. When steps d) and e) are performed at least partly simultaneously, this is preferably done by using a REED equipment containing at least one AX-REED and at least one CX-REED membrane stack, wherein said AX-REED and said CX-REED membrane stacks are connected in parallel.

In one embodiment of the invention it is preferred that no sugar is added to starting liquid and furthermore, it is preferred that no sugar is added at any step during the method. In addition it is preferred that no sugar is added to the final beverage.

In some embodiments of the invention, the methods do not comprise a step b), but rather comprises a step c) where any sugar is converted to form an organic acid with the aid of enzymes. Thus the methods may comprise a step c) of incubating the starting liquid with an enzyme or a mixture of enzymes capable of catalysing conversion of sugar to form an organic acid. Said enzyme or mixture of enzymes may for example be an enzyme or mixture of enzyme capable of catalyzing conversion of maltose to form an organic acid. In particular, the enzyme or mixture of enzymes may be capable of catalyzing conversion of maltose to form maltobionic acid. This is in particular the case in embodiments of the invention, where the starting liquid comprises a high level of maltose, e.g. when the starting liquid comprise or even consists of a cereal extract, e.g. when the starting liquid is wort.

It is comprised within the invention that any of the methods may comprise as a last step, the step i) of adding $CO_2$ in order to obtain a carbonated beverage.

Enzymatic Conversion of Glucose

In embodiments of the invention relating to methods of producing a beverage with enzymatic conversion of glucose, the methods of the invention comprises a step of incubating a liquid with an enzyme or a mixture of enzymes capable of catalyzing conversion of glucose to form an organic acid.

Said liquid may be the starting liquid. Said liquid may also be a liquid obtained after the starting liquid has been treated to convert at least some of the sugar, which is not glucose into glucose. Said liquid may also be the starting liquid, which simultaneous with incubation with an enzyme or a mixture of enzymes capable of catalyzing conversion of glucose to form an organic acid, also is treated to convert at least some of the sugar, which is not glucose into glucose.

Said enzyme or a mixture of enzymes capable of catalyzing conversion of glucose to form an organic acid may comprise any enzymes, which are capable of catalyzing conversion of glucose to form an organic acid.

In one preferred embodiment of the invention the enzyme or a mixture of enzymes capable of catalyzing conversion of glucose to form an organic acid comprises or even consists of a glucose oxidase.

The glucose oxidase to be used with the present invention is in general an enzyme classified under EC 1.1.3.4. Thus the glucose oxidase to be used with the present invention is an oxido-reductase that is capable of catalysing the oxidation of glucose to hydrogen peroxide and D-glucono-δ-lactone. This in particular, the glucose oxidase to be used with the present invention is an enzyme capable of catalyzing the following reaction β-D-glucose+$O_2$→D-glucono-1,5-lactone+$H_2O_2$ D-glucono-1,5-lactone hydrolyses in water to gluconic acid. Thus, in an aqueous environment the conversion of glucose catalysed by glucose oxidase lead to the formation of gluconic acid. In the methods of the invention the enzyme or mixture of enzymes capable of catalyzing conversion of glucose to form an organic acid are in general employed in an aqueous environment and thus the enzyme or mixture of enzymes capable of catalyzing conversion of glucose to form an organic acid may comprise or even consist of glucose oxidase.

The glucose oxidase may be any useful glucose oxidase. For example the glucose oxidase may be glucose oxidase of *Aspergillus niger* or *Penicillium amagasakiense*. In one embodiment the glucose oxidase is a glucose oxidase of SEQ ID NO: 10 or a functional homologue thereof sharing at least 70%, such as at least 80%, for example at least 85%, such as at least 90%, for example at least 95% sequence identity therewith. The glucose oxidase may also comprise or even consist of a 23-605 of SEQ ID NO:10 or a functional homologue of aa 23-605 of SEQ ID NO:10 sharing at least 70%, such as at least 80%, for example at least 85%, such as at least 90%, for example at least 95% sequence identity therewith. The glucose oxidase may also be a glucose oxidase of SEQ ID NO: 11 or a functional homologue thereof sharing at least 70%, such as at least 80%, for example at least 85%, such as at least 90%, for example at least 95% sequence identity therewith. A functional homologue of a given glucose oxidase is a polypeptide capable of catalyzing the reaction:

β-D-glucose+$O_2$→D-glucono-1,5-lactone+$H_2O_2$ and which have the aforementioned sequence identity with a reference glucan 1,4-α-glucosidase.

The glucose oxidase may also be one of commercially available glucose oxidases, such as Hyderase available from Amano Pharmaceutical Co. Ltd., Nagoya, Japan. An advantage of the Hyderase is that is also comprises catalase activity. Thus, Hyderase contains both glucose oxidase and catalase activity.

Furthermore, glucose oxidases described in GB1,373,562, U.S. Pat. No. 4,675,191 and US 20120114791 may be used with the present invention.

As noted above the reaction catalyzed by glucose oxidase also may lead to the formation of $H_2O_2$. In general, it is not desirable that beverages contain high levels of $H_2O_2$ and thus, in embodiments of the invention involving use of glucose oxidase, it is preferred that the methods also comprise a step of removing $H_2O_2$. For example the enzyme or mixture of enzymes capable of catalyzing conversion of glucose to form an organic acid may also contain a catalase activity.

The catalase to be used with the present invention may be any enzyme capable of catalyzing the decomposition of hydrogen peroxide to water and oxygen. Thus, the catalase may be an enzyme classified under EC 1.11.1.6. In particular the catalase may be an enzyme catalyzing the following reaction:

$2H_2O_2$→$O_2$+$2H_2O$

The catalase may be any useful catalase. For example the catalase may be catalase from *Aspergillus niger, Bacillus subtilis* or *Bos taurus* (in particular, from liver of *Bos taurus*). In one embodiment the catalase is a catalase of SEQ ID NO: 12 or a functional homologue thereof sharing at least 70%, such as at least 80%, for example at least 85%, such as at least 90%, for example at least 95% sequence identity therewith. A functional homologue of a catalase is a polypeptide capable of catalyzing the reaction:

$2H_2O_2$→$O_2$+$2H_2O$ and which have the aforementioned sequence identity with a reference glucan 1,4-α-glucosidase.

It is to be understood that any glucose oxidase can be used in the method according to the invention, provided that the glucose oxidase exhibits a reasonable activity and stability at the pH and temperature prevailing during conversion of the glucose. Thus, both soluble and immobilized glucose oxidase preparations may be used, even if soluble glucose oxidase preparations are usually preferred. The same considerations are valid for catalase, if used.

It is noted here that aerating the liquid, e.g. the starting liquid with oxygen is advantageous during conversion of glucose to gluconic acid. The aerating has not been found to be detrimental to the taste of the beverage.

The temperature during enzymatic conversion of the glucose may for example be between 10° C. and 40° C., preferably between 10° C. and 30° C.

As described herein above in the section "Method of producing a beverage with enzymatic conversion of sugar", then the gluconic acid formed may be continuously removed through AX-REED. Thus, the reaction is not inhibited by accumulation of gluconic acid.

In a preferred embodiment of the method according to the invention oxygen is supplied continuously to the liquid incubated with the enzyme or mixture of enzymes containing a glucose oxidase. The supply of oxygen has a remarkably beneficial influence on the reaction rate of the enzymatic reaction. Thus, continuous introduction of oxygen ensures a high reaction rate. The oxygen may be supplied by any suitable means, for example oxygen may be supplied by means of an air pump, a most efficient means for introducing oxygen into the liquid.

The enzyme or mixture of enzymes may in addition to the glucose oxidase and the catalase also contain additional enzymatic activities. However, it is generally preferred that no glucose isomerase is added to any of the liquids during the methods of the invention. Thus it is preferred that no enzyme classified under EC 5.3.1.5 is added to any of the liquid during the methods of the invention.

Also it is preferred that gluconic acid generated during the methods of the invention is removed by AX-REED rather than by precipitation. Thus, it is preferred that the methods of the invention do not comprise addition of a substance forming a sparingly soluble salt of gluconic acid, such as calcium carbonate.

In certain embodiments of the invention the AX-REED liquid or the CX-REED liquid or the REED liquid may be subjected to a fermentation. In some embodiments of the invention however; it is preferred that neither the AX-REED liquid nor the CX-REED liquid nor the REED liquid is subjected to an alcohol fermentation. Thus, in some embodiments, the methods of the invention do not comprise a step of fermentation generating alcohol.

The enzymatic conversion of glucose is preferably undertaken in manner so that sufficient glucose is removed from the liquid. This may be obtained for example by adjusting the amount of enzyme and/or the incubation time. The skilled person will be able to select a suitable amount of enzyme and a suitable incubation time. In particular, it is preferred that step c) of the methods of the invention result in a reduction of the glucose level of at least 20%, preferably of at least 30%, more preferably of at least 40%, even more preferably of at least 50%, yet more preferably of at least 60%, even more preferably of at least 70%.

Method of Producing a Beverage without Bacterial Fermentation

In one embodiment the present invention relates to methods for producing a beverage without bacterial fermentation. Said methods in general comprise only a step of removing organic acids from a starting liquid to obtain a beverage. Accordingly, the methods of this embodiment of the invention are mainly applicable for starting liquids, which contain organic acid, i.e. which contain a high level of one or more organic acids.

Thus, in one aspect the invention relates to a method of preparing a beverage, wherein the method comprises the steps of
a) providing a starting liquid comprising at least one micro-nutrient and at least one organic acid; and
d) removing at least 10% of at least one organic acid from said liquid while retaining at least 65% of said at least one micro-nutrient in said liquid, thereby obtaining an AX-REED liquid
wherein said organic acid is removed through an Anion Exchange Reverse Electro-Enhanced Dialysis (AX-REED) membrane stack.

In general the starting liquid has at least some sweetness and thus, the starting liquid frequently contains sugar. For example the starting liquid may contain glucose. Thus. The invention also provides methods of producing a beverages, wherein the methods comprises the steps of
a) providing a starting liquid comprising at least one micro-nutrient, at least one organic acid and glucose; and
d) removing at least 10% of at least one organic acid from said liquid while retaining at least 65% of said at least one micro-nutrient in said liquid, thereby obtaining an AX-REED liquid
wherein said organic acid is removed through an Anion Exchange Reverse Electro-Enhanced Dialysis (AX-REED) membrane stack.

Said AX-REED liquid may be final beverage or it may be further processed into the final beverage.

This method may furthermore comprise step e) and thus in one aspect the invention relates to a method of preparing a beverage, wherein the method comprises the steps of
a) providing a starting liquid comprising at least one micro-nutrient, at least one organic acid and glucose; and
d) removing at least 10% of at least one organic acid from said liquid while retaining at least 65% of said at least one micro-nutrient in said liquid, thereby obtaining a AX-REED liquid
wherein said organic acid is removed through an Anion Exchange Reverse Electro-Enhanced Dialysis (AX-REED) membrane stack; and
e) removing at least part of one cation from the AX-REED liquid, while retaining at least 65% of said at least one micro-nutrient in said liquid, thereby obtaining a CX-REED liquid, wherein said cation is removed through an Cation Exchange Reverse Electro-Enhanced Dialysis (CX-REED) membrane stack.

Said CX-REED liquid may be the final beverage or it may be further processed in order to obtain the final beverage.

As described herein elsewhere steps d) and e) may be performed at least partly simultaneously. Thus in one aspect the invention relates to a method of preparing a beverage, wherein the method comprises the steps of
a) providing a starting liquid comprising at least one micro-nutrient, at least one organic acid and glucose; and
d) removing at least 10% of said organic acid from said liquid, wherein said organic is removed through an Anion Exchange Reverse Electro-Enhanced Dialysis (AX-REED) membrane stack; and
e) at least partly simultaneously
removing at least part of one cation from the starting liquid or the partly AX-REED treated liquid, thereby obtaining a REED liquid, wherein said REED liquid retains at least 65% of said at least one micro-nutrient, wherein said cation is removed through an Cation Exchange Reverse Electro-Enhanced Dialysis (CX-REED) membrane stack.

Said REED liquid may be the final beverage or it may be further processed in order to obtain the final beverage.

Thus, this method may also contain an additional step f) of adding one or more additional compounds to the starting liquid, the AX-REED liquid or to the CX-REED liquid or to the REED liquid. In embodiments of the invention not containing step e), then it is preferred that the additional compound(s) are added to the AX-REED liquid. The method may in one embodiment comprise the steps of:

a) providing a starting liquid comprising at least one micro-nutrient, at least one organic acid and glucose; and
d) removing at least 10% of said organic acid from said liquid while retaining at least 65% of said at least one micro-nutrient in said liquid, thereby obtaining an AX-REED liquid
    wherein said organic acid is removed through an Anion Exchange Reverse Electro-Enhanced Dialysis (AX-REED) membrane stack
e) removing at least part of one cation from the AX-REED liquid, while retaining at least 65% of said at least one micro-nutrient in said liquid, thereby obtaining a CX-REED liquid
    wherein said cation is removed through an Cation Exchange Reverse Electro-Enhanced Dialysis (CX-REED) membrane stack; and
f) adding one or more additional compounds, preferably adding one or more flavour compounds and/or preservatives, thereby obtaining the beverage.

The method may also comprise a step g) of adding one or more additional liquids to the AX-REED liquid or the CX-REED liquid or the REED liquid in order to obtain the final beverage. In particular said additional liquids may be beverages, so that the final beverage is a mixture between the CX-REED liquid and an additional beverage or a mixture between the REED liquid and an additional beverage. Thus, in one aspect the invention relates to a method of preparing a beverage, wherein the method comprises the steps of:
a) providing a starting liquid comprising at least one micro-nutrient, at least one organic acid and glucose; and
d) removing at least 10% of said organic acid from said liquid while retaining at least 65% of said at least one micro-nutrient in said liquid, thereby obtaining an AX-REED liquid
    wherein said organic acid is removed through an Anion Exchange Reverse Electro-Enhanced Dialysis (AX-REED) membrane stack
e) removing at least part of one cation from the AX-REED liquid, while retaining at least 65% of said at least one micro-nutrient in said liquid, thereby obtaining a CX-REED liquid
    wherein said cation is removed through an Cation Exchange Reverse Electro-Enhanced Dialysis (CX-REED) membrane stack; and
f) optionally adding one or more additional compounds, preferably adding one or more flavour compounds and/or preservatives; and
g) providing an additional liquid, for example a beverage e.g. a fruit juice and mixing said CX-REED liquid with said additional liquid, thereby obtaining the beverage In these embodiments of the invention the starting liquid already contains organic acid and step d) relates to removing at least some of said organic acid, thereby reducing the acid content of the starting liquid to obtain a palatable beverage. Preferably the beverage has a ratio of sugar to organic acid as described herein below in the section "Ratio of sugar to organic acid", and accordingly it is preferred that sufficient organic acid is removed in order to reach said ratio.

Thus, preferably at least 10% of at least one organic acid, for example at least 15% of at least one organic acid, for example at least 20% of at least one organic acid, such as at least 25% of at least one organic acid, such as at least 30% of at least one organic acid is removed during step d). More preferably at least 10% of at least two organic acids, for example at least 15% of at least two organic acids, for example at least 20% of at least two organic acids, such as at least 25% of at least two organic acids, such as at least 30% of at least two organic acids are removed during step d). For example at least 10% of all organic acids, for example at least 15% of all organic acids, for example at least 20% of all organic acids, such as at least 25% of all organic acids, such as at least 30% of all organic acids are removed during step d).

In one embodiment it is preferred that at least 10% of citric acid, for example at least 15% of citric acid, for example at least 20% of citric acid, such as at least 25% of citric acid, such as at least 30% of citric acid is removed during step d). This is in particularly the case, when the starting liquid comprises citric acid.

In another embodiment it is preferred that at least 10% of malic acid, for example at least 15% of malic acid, for example at least 20% of malic acid, such as at least 25% of malic acid, such as at least 30% of malic acid is removed during step d). This is in particularly the case, when the starting liquid comprises malic acid.

Said micro-nutrient may be any of the micro-nutrients described herein below in the section "Micro-nutrients". In particular, in embodiments of the invention relating to methods of producing beverages without bacterial fermentation, then it is preferred that said micro-nutrient is selected from the group consisting of minerals, vitamins and antioxidants and in particular from the group of minerals, vitamins and antioxidants described herein below in the section "Micro-nutrient".

The starting liquid in this embodiment of the invention is any liquid useful for preparing a beverage. It is preferred that the starting liquid is a liquid, which is useful as a beverage apart from it having a too high content of organic acids. It is generally preferred that the starting liquid is a natural product. The term "natural product" as used herein refers to a product obtained from natural sources by extraction in water or by squeezing, wherein no extra chemicals are added. Thus, in one embodiment the starting liquid is an extract or a juice of a plant or a plant part, where no extra sugar has been added.

Thus in one embodiment the starting liquid is a fruit juice, such as a juice of a citrus fruit. The citrus fruit may for example be selected from the group consisting of orange, lime, pomelo, lemon, mandarin, satsuma, grape fruit, Australian lime and kumquats. In one preferred embodiment of the invention the starting liquid is lemon juice. The starting liquid may also be a berry juice, such as black currant juice. The starting liquid may also be a vegetable juice, such as tomato juice or carrot juice.

In another embodiment of the starting liquid is a fermented fruit juice. For example the starting liquid may be selected from the group consisting of fermented apple juice and fermented pear juice.

In yet another embodiment the starting liquid is an extract of a fruit, for example the starting liquid may be an extract of a fruit selected from the group consisting of rosehip, sloe, blackcurrant and crowberry.

It is also comprised within the invention that the starting liquid may an extract, a concentrate or a juice of a plant or a plant part, which has been treated with one of more enzymes. For example said extract, concentrate or juice of a plant or a plant part, may have been treated with one or more enzymes selected from the group consisting of glucosidases, proteases, pectinases and cellulases. In embodiments of the invention, where the starting liquid is a fruit juice, a fruit extract or a fruit concentrate then the starting liquid may have been prepared employing a step of enzyme treatment with one or more enzymes selected from the group consisting of pectinases and cellulases.

The starting liquid may also be a mixture of one or more of the aforementioned juices, extract and concentrates.

The organic acid may be any organic acid contained within the starting liquid. In particular the organic acid may be any of the organic acids described herein below in the section "Organic acid". Preferably, the organic acid may be selected from the group consisting of lactic acid, citric acid, malic acid, tartaric acid, acetic acid, succinic acid, isocitric acid, α-ketoglutaric acid, fumaric acid and oxaloacetic acid. In embodiments of the invention where the starting liquid is a citrus fruit juice, then the organic acid may in particular be citric acid. In embodiments of the invention where the starting liquid is fermented apple juice or fermented pear juice, then the organic acid may in particular be malic acid.

As described herein above it is one advantage of the methods of the invention that the beverages prepared according to the methods are low in calories, and in particular are low in sugar. Thus, in embodiments of the invention which does not comprise a fermentation step, then it is preferred that the starting liquid does not have a high level of sugar. Thus, it is preferred that the starting liquid contains at the most 10%, preferably at the most 9%, yet more preferably at the most 8%, for example at the most 7% sugar. More preferably, the combined concentration of glucose, fructose, maltose, lactose and sucrose in the starting liquid is at the most 10%, preferably at the most 9%, yet more preferably at the most 8%, for example at the most 7%. It is also preferred that the starting liquid contains at the most 10%, preferably at the most 9%, yet more preferably at the most 8%, for example at the most 7% glucose. Said percentages are all provided as w/w.

The ratio of sugar to organic acid may be any of the ratios described herein below in the section "Ratio of sugar to organic acid".

Step f) comprising adding one or more additional compounds. Said additional compounds may preferably be selected from the group consisting of sugars, flavour compounds, preservatives and water.

It is preferred that the beverages prepared by the methods of the invention are low in sugar, and thus in embodiments of the invention, where sugar is added it is preferred that the resulting beverages contain at the most 10%, preferably at the most 9%, yet more preferably at the most 8%, for example at the most 7% sugar, preferably at the most 10%, preferably at the most 9%, yet more preferably at the most 8%, for example at the most 7% glucose.

The flavour compound may be any of the flavour compounds described herein below in the section "flavour compounds".

Step d) of the methods described in this section may be performed in any of the ways described herein below in the section "AX-REED".

Step e) of the methods described in this section may be performed in any of the ways described herein below in the section "CX-REED".

Steps d) and e) may be performed simultaneously or sequentially, however preferably step d) is performed prior to step e).

In one preferred embodiment of the invention steps d) and e) are performed simultaneously. Steps d) and e) may in particular be performed simultaneously by using a REED equipment containing at least one AX-REED and at least one CX-REED membrane stack, wherein said AX-REED and said CX-REED membrane stacks are connected in parallel.

In yet another very preferred embodiment of the invention steps d) and e) are performed partly simultaneously. In this embodiment step d) may for example be performed for a given time period, where after both steps d) and e) are performed simultaneously. In particular step d) may be performed until a predetermined pH desirable for the final beverage is achieved, where after both steps d) and e) may be performed simultaneously. Thus, one or more acidic ions may be removed from the liquid through AX-REED for a given time period, where after both acidic ions and at least one cation are removed respectively through AX-REED and CX-REED, wherein the AX-REED and the CX-REED are performed simultaneously. When AX-REED is performed alone, acidic ions are continuously removed thereby increasing the pH. When AX-REED and CX-REED are performed in parallel, then preferably the pH may be maintained relatively stable. Thus, AX-REED may be performed until at desired pH is reached, whereafter AX-REED and CX-REED may be performed in parallel until a desired conductivity is reached. When steps d) and e) are performed at least partly simultaneously, this is preferably done by using a REED equipment containing at least one AX-REED and at least one CX-REED membrane stack, wherein said AX-REED and said CX-REED membrane stacks are connected in parallel. Accordingly, in one embodiment of the invention provides methods for preparing a beverage comprising the steps of a) providing a starting liquid (e.g. a fruit juice or a fruit extract) comprising at least one micro-nutrient, at least one organic acid and glucose; and d) removing at least 10% of said organic acid from said liquid while retaining at least 65% of said at least one micro-nutrient in said liquid, wherein said organic acid is removed through an Anion Exchange Reverse Electro-Enhanced Dialysis (AX-REED) membrane stack and wherein said process is continued until a predetermined pH is reached, e) simultaneously removing at least part of one organic acid and at least part of one cation from the liquid obtained in step d), while retaining at least 65% of said at least one micro-nutrient in said liquid, thereby obtaining a REED liquid wherein said organic acid is removed through an Anion Exchange Reverse Electro-Enhanced Dialysis (AX-REED) membrane stack; and said cation is removed through an Cation Exchange Reverse Electro-Enhanced Dialysis (CX-REED) membrane stack; and wherein said process is continued until a predetermined conductivity is reached, f) optionally adding one or more additional compounds, preferably adding one or more flavour compounds and/or preservatives; and g) optionally providing an additional liquid, for example a beverage e.g. a fruit juice and mixing said CX-REED liquid with said additional liquid.

Said predetermined pH is preferably selected in order to achieve a final beverage with a desirable ratio of sugar to organic acid. In particular, said ratio of sugar to organic acid may be any of the ratios of sugar to organic acid described herein below in the section "Ration of sugar to organic acid". In embodiments of the invention relating to relatively acidic beverages, such as lemon juice, then said predetermined pH may be in the range of 3 to 5, such as in the range of 3 to 4, for example approx. pH 3.5.

The predetermined conductivity may for example be a conductivity in the range of 3 to 5, preferably in the range of 3 to 4, such as approx. 3.5.

It is also preferred that the pH at no time during the method exceeds pH 4, more preferably that the pH at no time during the method exceed pH 4.5, yet more preferably that the pH at no time during the method exceed pH 5. In one embodiment of the invention, the pH does at no time during the method exceed pH 3.5. This may in particular be the case, when the starting liquid is a fruit or berry juice or extract.

It is also preferred that the pH at no time during the process is significantly higher than said predetermined pH. Thus, preferably the pH is not more than 20% higher, preferably not more than 15% higher than the predetermined pH at any time during the process. This may for example be ensured by running the CX-REED in parallel with the AX-REED.

The term "approx." is used herein to indicate +/−10%, preferably +/−5%.

Aroma Compound

It is an advantage of the methods of the invention that generally one or more aroma compounds present in the starting liquid are retained in the AX-REED liquid, in the CX-REED liquid, the REED liquid and the final beverages prepared by the methods. Thus, the REED liquid retain aroma compound(s) of the starting liquid, and thus also the final beverage retains aroma compound(s) of the starting liquid. Which aroma compound present in the final beverage of course depends on the aroma compounds present in the starting liquid. An advantage of the present invention is that the final beverage may retain has a taste similar to the starting liquid, but with a reduced acid and/or sugar content.

In embodiments of the invention not comprising a step c), then the final beverage will in general be similar to starting liquid except for being less acidic. As described above, the AX-REED liquid, the CX-REED liquid, the REED liquid and the final beverages prepared by the methods of the invention retains at least one micro-nutrient and preferable several micro-nutrient. In addition, the AX-REED liquid, in the CX-REED liquid, the REED liquid and/or the final beverages also retains aroma compounds.

Thus, in one embodiment the invention relates to a method of producing a beverage comprising the steps of:
a) providing a starting liquid comprising at least one micro-nutrient, at least one aroma compound, and at least one organic acid; and
d) removing at least 10% of at least one organic acid from said liquid while retaining at least 65% of said at least one micro-nutrient and at least 65% of said at least one aroma compound in said liquid, thereby obtaining an AX-REED liquid wherein said organic acid is removed through an Anion Exchange Reverse Electro-Enhanced Dialysis (AX-REED) membrane stack.

The invention also relates to a method of producing a beverage comprising the steps of
a) providing a starting liquid comprising at least one micro-nutrient, at least one aroma compound and at least one sugar; and
b) if said sugar is not glucose converting at least some of said sugar to glucose; and
c) incubating said liquid with one or more glucose fermenting microorganisms capable of fermenting glucose to an organic acid; and
d) removing at least 10% of said organic acid from said liquid while retaining at least 65% of said at least one micro-nutrient and at least 65% of said at least one aroma compound in said liquid, thereby obtaining an AX-REED liquid wherein said organic acid is removed through an Anion Exchange Reverse Electro-Enhanced Dialysis (AX-REED) membrane stack.

In addition the invention relates to a method for producing a beverage, wherein the method comprises the steps of
a) providing a starting liquid comprising at least one micro-nutrient, at least one aroma compound and at least one sugar; and
b) if said sugar is not glucose converting at least some of said sugar to glucose for example by contacting the starting liquid with an enzyme capable of catalysing conversion the particular sugar in question to glucose; and
c) incubating said liquid with an enzyme or a mixture of enzymes capable of catalysing conversion of glucose to form an organic acid; and
d) removing at least 10% of said organic acid from said liquid while retaining at least 65% of said at least one micro-nutrient and at least 65% of said at least one aroma compound in said liquid, thereby obtaining an AX-REED liquid wherein said organic acid is removed through an Anion Exchange Reverse Electro-Enhanced Dialysis (AX-REED) membrane stack.

All of the methods described herein above in this section "Aroma compounds" may furthermore contain a step e)
e) removing at least part of one cation from the AX-REED liquid, while retaining at least 65% of said at least one micro-nutrient and at least 65% of said at least one aroma compound in said liquid, thereby obtaining a CX-REED liquid,
wherein said cation is removed through an Cation Exchange Reverse Electro-Enhanced Dialysis (CX-REED) membrane stack.

All of the methods described herein above in this section "Aroma compounds" may correspond to any of the methods described herein above in the sections "Method of producing a beverage", "Methods of producing a fermented beverage", "Methods of producing a beverage with enzymatic conversion of sugar" and "Method of producing a beverage without bacterial fermentation" except that the starting liquid furthermore comprises at least one aroma compound and that at least 65% of said aroma compound is retained during both AX-REED and CX-REED treatment. Thus, in relation to f the methods described herein above in this section "Aroma compounds", then step a), b), c), d) and e) may be performed in any of the ways described herein above in the sections "Method of producing a beverage", "Methods of producing a fermented beverage", "Methods of producing a beverage with enzymatic conversion of sugar" and "Method of producing a beverage without bacterial fermentation" with the only difference being that the starting liquid must comprise at least one aroma compound and that at least 65% of said aroma compound is retained in the AX-REED liquid and/or in the CX-REED liquid and/or in the REED liquid.

Thus the methods described herein above in this section "Aroma compounds" may also contain one or more of the steps f), g), h) and i) as described herein in the sections "Method of producing a beverage", "Methods of producing a fermented beverage", "Methods of producing a beverage with enzymatic conversion of sugar" and "Method of producing a beverage without bacterial fermentation".

Step d) may comprise removing at least 10% of one or more acidic ions from said liquid while retaining at least 65% of at least one aroma compound in said liquid. In particular step d) may comprise removing at least 10% of one or more acidic ions from said liquid while retaining at least 80% of at least one aroma compound in said liquid.

Thus step d) may comprise removing at least 10% of one or more acidic ions from said liquid while retaining at least 90% of at least one aroma compound in said liquid. For example step d) may comprise removing at least 10% of one or more acidic ions from said liquid while retaining at least 65% of at least two, such as at least three different aroma compounds in said liquid. Thus step d) may comprise removing at least 10% of one or more acidic ions from said liquid while retaining at least 80% of at least two, such as of at least three different micro-nutrients in said liquid.

The methods of the invention may also comprise a step e) removing at least part of one cation from the AX-REED liquid or from the starting liquid or from the partly AX-REED treated liquid, while retaining at least 65% of at least one aroma compound in said liquid. In particular step e) may comprise removing at least part of one cation from the AX-REED liquid, the partly AX-REED treated liquid or the starting liquid, while retaining at least 80% of at least one aroma compound in said liquid. Thus step e) may comprise removing at least part of one cation from the AX-REED liquid, the partly treated AX-REED liquid or the starting liquid, while retaining at least 90% of at least one aroma compound in said liquid.

For example step e) may comprise removing at least part of one cation from the AX-REED liquid, the partly AX-REED treated liquid or the starting liquid, while retaining at least 65% of at least two, such as at least three different aroma compound in said liquid. Thus step e) may comprise removing at least part of one cation from the AX-REED liquid, the starting liquid or the partly AX-REED treated liquid while retaining at least 80% of at least two, such as of at least three different aroma compounds in said liquid.

In certain embodiments of the invention, steps d) and e) are performed at least partly simultaneously. The resulting liquid may in these embodiments be referred to as the "REED liquid". It is preferred that the REED liquid retains at least 65% of at least one aroma compound present in the starting liquid.

In particular steps d) and e) may together comprise removing at least 10% of one or more acidic ions and at least part of one cation from the starting liquid while retaining at least 80% of at least one aroma compound in the REED liquid.

Thus steps d) and e) may together comprise removing at least 10% of one or more acidic ions and at least part of one cation from the starting liquid while retaining at least 90% of at least one aroma compound in the REED liquid.

For example steps d) and e) may together comprise removing at least 10% of one or more acidic ions and at least part of one cation from the starting liquid, while retaining at least 65% of at least two, such as at least three different aroma compounds in the REED liquid.

Thus steps d) and e) may together comprise removing at least 10% of one or more acidic ions and at least part of one cation from the starting liquid while retaining at least 80% of at least two, such as of at least three different aroma compounds in the REED liquid.

The aroma compound may be any aroma compound, which is desirable to maintain in the final beverage. In general, the aroma compound is a compound with significantly contributes to the taste characteristics of the starting liquid. The skilled person will know, which aroma compounds contribute to the taste characteristics of a given starting liquid.

The aroma compound is a chemical compound that has a smell or odor. A chemical compound has a smell or odor when it is sufficiently volatile to be transported to the olfactory system in the upper part of the nose. Generally the aroma compound is an organic compound with a molecular weight of less than 300.

The aroma compound may for example be an ester. Non-limiting examples of aroma compounds, which are esters include geranyl acetate, methyl formate, methyl propionate, methyl propanoate, methyl butyrate, methyl butanoate, ethyl butyrate, ethyl butanoate, isoamyl acetate, pentyl butyrate, pentyl butanoate, pentyl pentanoate, octyl acetate, benzyl acetate, ethyl anthranilate, fructone, hexyl acetate, ethyl methylphenylglycidate, The aroma compound may also be a terpene or a terpenoid. Terpenes are molecules consisting of covalently linked units of isoprene, and thus terpenes have the molecular formula $(C_5H_8)_n$, where n is the number of linked isoprene units. Terpenoids are terpenes, which are modified chemically, such as by oxidation or rearrangement of the carbon skeleton.

Non-limiting examples of aroma compounds, which are linear terpenes or terpenoids include geraniol, nerol, citral, lemonal, geranial, neral, citronellal, citronellol or linalool. Non-limiting examples of aroma compounds, which are cyclic terpenes or terpenoids include limonene or thujone.

The aroma compound may also for example be an aromatic compound. In particular the aroma compound may be an aromatic compound consisting of a 6 membered aromatic ring substituted with one or more substituents. Non-limiting examples of aroma compounds, which are aromatic compounds include benzaldehyde, cinnamaldehyde, ethyl maltol, vanillin, anisole, anethole, estragole and thymol.

Other non-limiting examples of aroma compounds include furaneol, 1-hexanol, menthol, isovaleraldehyde, anisic aldehyde, dihydrojasmone, gamma-decalactone, gamma-nonalactone, delta-octalactone, jasmine lactone, massoia lactone, wine lactone, sotolon, grapefruit mercaptan, furan-2-yl methanethiol, phosphine or nerolin.

Organic Acid

As used herein the term "organic acid" refers to any carboxylic acid. Preferably, the organic acid according to the invention is $C_{1-3}$-alkyl or $C_{-1-3}$-alkenyl, wherein said $C_{1-3}$-alkyl and $C_{1-3}$-alkenyl is substituted with n —COOH groups, m —OH group and q =O groups, wherein n is an integer in the range of 1 to 3, m is an integer in the range of 0 to 2 and q is an integer in the range of 0 to 1.

Preferably the organic acid may be propyl substituted with
1) 1 to 3 —COOH groups, such as with 3 —COOH groups; and
2) 0 to 1 —OH groups, such as with 1 —OH group or the organic acid may be ethyl substituted with
1) 1 to 2 —COOH groups; and
2) 0 to 2 —OH groups.

Preferably the term "organic acid" as used herein refers to lactic acid, citric acid, malic acid, tartaric acid, acetic acid, succinic acid, isocitric acid, α-ketoglutaric acid, fumaric acid and oxaloacetic acid.

In one very preferred embodiment of the invention the term "organic acid" as used herein refers to lactic acid.

Sugar

As used herein the term "sugar" refers collectively to monosaccharides, disaccharides and tri-saccharides.

Monosaccharides in general have the chemical formula $C_x(H_2O)_y$, where x is 3 to 7. Thus the monosaccharide according to the invention may be selected from the group consisting of triose, tetrose, pentose, hexose and heptose. Preferably the monosaccharide is a hexose.

Disaccharides are di-mers of monosaccharides and tri-saccharides are tri-mers of monosaccharides.

Preferably, the term "sugar" as used herein refers to fructose, maltose, maltotriose, lactose, sucrose and glucose.

Ratio of Sugar to Organic Acid

Interestingly, the inventors have found that certain ratios of sugar to organic acids provide beverages, which are particularly palatable.

Accordingly it is preferred that the beverages prepared by the methods of the present invention have a ratio of sugar to organic acid in the range of 1:2 to 60:1. In particular, the ratio of sugar to organic acid may be in the range of 5.5:1 to 10:1, more preferably in the range of 6:1 to 10:1, such as in the range of 7:1 to 9:1, for example in the range of 8:1 to 9:1. The ratio is calculated as total concentration of sugar in g/L to total concentration of organic acids in g/L.

Frequently, a beverage may be palatable when it comprises a minimum amount of sugar, whereas adding more sugar does not improve the taste. Thus, in general it is preferred that the beverages of the invention comprises as little sugar as possible, but still being palatable. Thus, the ratios given herein in general refer to beverages containing as low a sugar content as possible, but still being perceived palatable.

For beverages prepared by methods including step c), then the ratio of sugar to organic acid in the beverages may be in the range of 20:1 to 60:1, for example in the range of 25:1 to 55:1. However, it is preferred that the ratio of sugar to organic acid are in the range of 5.5:1 to 10:1, more preferably in the range of 6:1 to 10:1, such as in the range of 7:1 to 9:1, for example in the range of 8:1 to 9:1. This is in particular the case when the beverages are prepared from a starting liquid comprising a malt extract and/or wort.

For beverage prepared by methods not including step c), then it is preferred that the ratio of sugar to organic acid is in the range of 1:2 to 10:1, such as in the range of 1:1.5 to 5:1, for example in the range of 1.2:1 to 1.1.2. This is in particular the case when the beverages are prepared from a starting liquid comprising fruit juice or a fruit extract, for example a citrus fruit juice.

In particular, the ratio of sugar to organic acids may be the ratio of
I. the total concentration in g/L of monosaccharides and disaccharides; to
II. the total concentration in g/L of organic acids, which are $C_{1-3}$-alkyl or $C_{1-3}$-alkenyl, wherein said $C_{1-3}$-alkyl and $C_{1-3}$-alkenyl is substituted with n —COOH groups, m —OH group and q =O groups, wherein n is an integer in the range of 1 to 3, m is an integer in the range of 0 to 2 and q is an integer in the range of 0 to 1.

For example the ratio of sugar to organic acid may be the ratio of
I. the total concentration in g/L of fructose, maltose, lactose, sucrose and glucose; to
II. the total concentration in g/L of lactic acid, citric acid, malic acid, tartaric acid, acetic acid, succinic acid, isocitric acid, α-ketoglutaric acid, fumaric acid and oxaloacetic acid.

In one embodiment of the invention the ratio of sugar to organic acid may be the ratio of
I. the total concentration in g/L of glucose; to
II. the total concentration in g/L of lactic acid.

In these embodiments of the invention it is preferred that the ratio of glucose to lactic acid is in the range of 5:1 to 10:1, more preferably in the range of 6:1 to 9:1, such as in the range of 7:1 to 8:1. This is in particular the case for methods of the invention comprising a step c) and/or for methods of the invention wherein the staring liquid comprises a malt extract and/or wort.

Micro-Nutrient

The term "micro-nutrient" as used herein refers to nutrients required by humans in small quantities, which the organism itself cannot produce. Thus the term micro-nutrient is not meant to include sugars, proteins and fats, or other calorie containing nutrient.

The micro-nutrient according to the invention may in particular be selected from the group consisting of minerals, vitamins, salts and anti-oxidants.

The methods of the invention comprises a step d) of removing at least 10% of one or more acidic ions from the liquid, while retaining at least some of a micro-nutrient. In relation to any of the methods of producing a beverage described herein, and in particular in relation to any of the methods described in the section "Method of producing fermented beverage", and in relation to any of the methods described in the section "Method of producing beverages with enzymatic conversion of sugar" and in relation to any of the methods described in the section "Method of producing a beverage without bacterial fermentation" step d) may be as follows:

Step d) may comprise removing at least 10% of one or more acidic ions from said liquid while retaining at least 65% of at least one micro-nutrient in said liquid, wherein said acidic ion is removed through an Anion Exchange Reverse Electro-Enhanced Dialysis (AX-REED) membrane stack.

In particular step d) may comprise removing at least 10% of one or more acidic ions from said liquid while retaining at least 80% of at least one micro-nutrient in said liquid, wherein said acidic ion is removed through an Anion Exchange Reverse Electro-Enhanced Dialysis (AX-REED) membrane stack.

Thus step d) may comprise removing at least 10% of one or more acidic ions from said liquid while retaining at least 90% of at least one micro-nutrient in said liquid, wherein said acidic ion is removed through an Anion Exchange Reverse Electro-Enhanced Dialysis (AX-REED) membrane stack.

For example step d) may comprise removing at least 10% of one or more acidic ions from said liquid while retaining at least 65% of at least two, such as at least three different micro-nutrients in said liquid,
wherein said acidic ion is removed through an Anion Exchange Reverse Electro-Enhanced Dialysis (AX-REED) membrane stack.

Thus step d) may comprise removing at least 10% of one or more acidic ions from said liquid while retaining at least 80% of at least two, such as of at least three different micro-nutrients in said liquid, wherein said acidic ion is removed through an Anion Exchange Reverse Electro-Enhanced Dialysis (AX-REED) membrane stack.

The methods of the invention may also comprise a step e) removing at least part of one cation from the AX-REED liquid, while retaining at least some of a micro-nutrient. In relation to any of the methods of producing a beverage described herein, and in particular in relation to any of the methods described in the section "Method of producing fermented beverage", and in relation to any of the methods described in the section "Method of producing beverages with enzymatic conversion of sugar" and in relation to any of the methods described in the section "Method of producing a beverage without bacterial fermentation" step e) may be as follows:

Step e) may comprise removing at least part of one cation from the AX-REED liquid, while retaining at least 65% of at least one micro-nutrient in said liquid, wherein said cation is removed through an Cation Exchange Reverse Electro-Enhanced Dialysis (CX-REED) membrane stack.

In particular step e) may comprise removing at least part of one cation from the AX REED liquid while retaining at least 80% of at least one micro-nutrient in said liquid, wherein said cation is removed through an Cation Exchange Reverse Electro Enhanced Dialysis (CX-REED) membrane stack.

Thus step e) may comprise removing at least part of one cation from the AX-REED liquid while retaining at least 90% of at least one micro-nutrient in said liquid, wherein said cation is removed through an Cation Exchange Reverse Electro-Enhanced Dialysis (CX-REED) membrane stack.

For example step e) may comprise removing at least part of one cation from the AX-REED liquid, while retaining at least 65% of at least two, such as at least three different micro-nutrients in said liquid,
wherein said cation is removed through an Cation Exchange Reverse Electro-Enhanced Dialysis (CX-REED) membrane stack.

Thus step e) may comprise removing at least part of one cation from the AX-REED liquid while retaining at least 80% of at least two, such as of at least three different micro-nutrients in said liquid,
wherein said cation is removed through an Cation Exchange Reverse Electro Enhanced Dialysis (CX-REED) membrane stack In certain embodiments of the invention, steps d) and e) are performed at least partly simultaneously. The resulting liquid may in these embodiments be referred to as the "REED liquid". It is preferred that the REED liquid retains at least 65% of at least one micro-nutrient present in the starting liquid.

In particular steps d) and e) may together comprise removing at least 10% of one or more acidic ions and at least part of one cation from the starting liquid while retaining at least 80% of at least one micro-nutrient in the REED liquid.

Thus steps d) and e) may together comprise removing at least 10% of one or more acidic ions and at least part of one cation from the starting liquid while retaining at least 90% of at least one micro-nutrient in the REED liquid.

For example steps d) and e) may together comprise removing at least 10% of one or more acidic ions and at least part of one cation from the starting liquid, while retaining at least 65% of at least two, such as at least three different micro-nutrients in REED liquid.

Thus steps d) and e) may together comprise removing at least 10% of one or more acidic ions and at least part of one cation from the starting liquid while retaining at least 80% of at least two, such as of at least three different micro-nutrients in the REED liquid.

When the micro-nutrient is a salt, it may for example be phosphate or iodide.

When the micro-nutrient is a mineral it may for example be selected from the group consisting of potassium, iron, calcium, cobalt, chromium, copper, manganese, magnesium, selenium, zinc, molybdenum and silicon. In embodiments of the invention when the micro-nutrient is a mineral, it is preferred that said mineral is a mineral, the intake of which is beneficial to human health. Accordingly, it is preferred that the micro-nutrient is a mineral selected from the group consisting of calcium, magnesium, iron and silica. In some embodiments it is preferred that the mineral is selected from the group consisting of calcium, magnesium and iron.

When the starting liquid comprises a malt extract and/or wort, then the micro-nutrient may in particular be calcium, magnesium, potassium, silicon, iron or zinc, more preferably the micro-nutrient may be calcium, magnesium or iron. Thus it is preferred that at least one of, more preferably at least 2 of, even more preferably at least 3 of, yet more preferably all of calcium, magnesium and iron are retained in the liquid during removal of acidic ions and in embodiments of the invention containing a step e) also during removal of a cation.

The micro-nutrients may also be vitamins. When the micro-nutrient is a vitamin said vitamin may preferably be selected from the group consisting of vitamin A, vitamin $B_1$, vitamin $B_2$, vitamin $B_3$, vitamin $B_6$, vitamin $B_9$, vitamin E and vitamin K. In particular, the micro-nutrient may be selected from the group consisting of vitamin $B_6$ and vitamin $B_{12}$.

When the starting liquid comprises a malt extract and/or wort then the micro-nutrient may in particular be vitamin A, vitamin $B_1$, vitamin $B_2$, vitamin $B_3$, vitamin $B_6$, vitamin $B_9$, vitamin E or vitamin K. Thus it is preferred that at least one of, more preferably at least 2 of, even more preferably at least 3 of, yet more preferably all of vitamin A, vitamin $B_1$, vitamin $B_2$, vitamin $B_3$, vitamin $B_6$, vitamin $B_9$, vitamin E or vitamin K are retained in the liquid during removal of acidic ions and in embodiments of the invention containing a step e) also during removal of a cation.

In embodiments of the invention involving a bacterial fermentation, then the micro-nutrient is preferably not a vitamin. In said embodiments it is preferred that the micro-nutrient is a mineral, such as any of the above-mentioned minerals.

In embodiments of the invention, wherein the starting liquid comprises a malt extract and/or wort and wherein the methods do not involve a bacterial fermentation, e.g. in any of the methods described herein above in the sections "Method of producing beverages with enzymatic conversion of sugar" and "Methods of producing a beverage without bacterial fermentation" then the micronutrient may for example be a selected from the group consisting of minerals and vitamins, Said minerals may for example be any of the minerals described herein above, The vitamins may also be any of the vitamins described herein above, but preferably said vitamins are selected from the group consisting of vitamin $B_1$ and vitamin $B_2$. Thus, in these embodiments it is preferred that at least 65% of the vitamin $B_1$ is retained in the liquid after step d). It is furthermore preferred that at least 65% the vitamin $B_1$ is retained in the liquid after step e). Thus, it is preferred that the final beverage comprises at least 65% of the vitamin $B_1$ present in the starting liquid. In addition, in these embodiments it is preferred that at least 65% of the vitamin $B_2$ is retained in the liquid after step d). It is furthermore preferred that at least 65% the vitamin $B_2$ is retained in the liquid after step e). Thus, it is preferred that the final beverage comprises at least 65% of the vitamin $B_2$ present in the starting liquid.

In embodiments of the invention, wherein the starting liquid comprises a malt extract and/or wort and wherein the methods do not involve a bacterial fermentation, e.g. in any of the methods described herein above in the sections "Method of producing beverages with enzymatic conversion of sugar" and "Methods of producing a beverage without bacterial fermentation" then it is preferred that at least 65% of at least 2, more preferably of at least 3, yet more preferably of all micro-nutrients selected from the group consisting of calcium, magnesium, iron, vitamin $B_1$ and vitamin $B_2$ are retained in the liquid during removal of acidic ions and in embodiments of the invention containing a step e) also during removal of a cation.

The micro-nutrient may also be antioxidants, such as polyphenols. Said polyphenol may for example be a flavonoid, such as quercetin or catechin or an anthocyanin.

In one embodiment one micro-nutrient is the total level of antioxidants determined using the oxygen radical absorbance capacity (ORAC) method. Thus, it is preferred that the final beverage comprises at least 65% of the total level of antioxidants contained in the starting liquid, wherein the total level of antioxidants is determined by the ORAC method. In particular, the total level of antioxidants may be determined using ORAC-FL, preferably as described in Dávalos et al., 2004, J. Agric. Food Chem., 52, p. 48-54.

When the starting liquid comprises or consists of a fruit juice and the methods do not involve a step of fermentation, then it is preferred that the micro-nutrient may in particular be a mineral, a vitamin and/or an antioxidant. The mineral may then in particular be calcium, magnesium, silica and/or iron. Thus it is preferred that at least one of, more preferably at least 2 of, even more preferably at least 3 of, yet more preferably all of calcium, magnesium, silica and iron are retained in the liquid during removal of acidic ions and in embodiments of the invention containing a step e) also during removal of a cation. In these embodiments it is also preferred that the final beverage comprises at least 65% of the total level of antioxidants contained in the starting liquid.

The methods according to the invention comprise removal of acidic ions and optionally cations, while at least one micro-nutrient is retained in the liquid and thus present in the final beverage. The term "retaining said at least one micro-nutrient" as used herein means that the concentration of said at least one micro-nutrient has not decreased by more than 10%, for example the concentration of said micro-nutrient has not decreased by more than 5% during performing step d) or in embodiments of the invention comprising step e) then during performing steps d) and e). Even more preferably "retaining said at least one micro-nutrient" means that the concentration of said micro-nutrient is the same or higher after performance of step d) compared to the level of said micro-nutrient in the starting liquid. In embodiments of the invention comprising step e) then it is preferred that the term "retaining said at least one micro-nutrient" means that the concentration of said micro-nutrient is the same or higher after performance of steps d) and e) compared to the level of said micro-nutrient in the starting liquid.

It is preferred that the level of at least one micro-nutrient, preferably of at least two micro-nutrients, even more preferably of at least 3 micro-nutrients, such as of at least 4 micro-nutrients, for example of at least 5 micro-nutrients, such as of at least 6 micro-nutrients is retained during the methods of the invention.

More preferably the level of at least one micro-nutrient, preferably of at least two micro-nutrients, even more preferably of at least 3 micro-nutrients is retained during the methods of the invention, wherein said micro-nutrients are selected from the group consisting of phosphate, iodine, potassium, iron, calcium, cobalt, chromium, copper, manganese, magnesium, selenium, zinc, molybdenum, silicon, vitamin A, vitamin $B_1$, vitamin $B_2$, vitamin $B_6$, vitamin E and vitamin K.

In one preferred embodiment of the invention the level of at least one micro-nutrient, preferably of at least two micro-nutrients, even more preferably of at least 3 micro-nutrients are retained during the methods of the invention, wherein said micro-nutrients are selected from the group consisting of calcium, magnesium, potassium, vitamin $B_6$ and vitamin $B_{12}$.

In one preferred embodiment of the invention, the starting liquid comprises a malt extract and/or wort and the level of at least one micro-nutrient, preferably of at least two micro-nutrients, even more preferably of at least 3 micro-nutrients are retained during the methods of the invention, wherein said micro-nutrients are selected from the group consisting of calcium, magnesium, potassium, vitamin $B_6$ and vitamin $B_{12}$.

In embodiments of the invention wherein the starting liquid comprises a high level of vitamin C, then one micro-nutrient may be vitamin C. It is preferred that at least 40%, such as at last 45% of the vitamin C of the starting liquid is retained in the final beverage. Thus, in embodiments of the invention where the starting liquid comprises at least 100 mg/L, such as at least 200 mg/L, for example at least 300 mg/L, then it is preferred that at least at least 40%, such as at last 45% of the vitamin C of the starting liquid is retained in the CX-REED liquid or in the REED liquid.

AX-REED

The methods of the invention contains a step of removing one or more acidic ions from the liquid while retaining at least some of said at least one micro-nutrient in said liquid (e.g. retaining at least 65% of said at least one micro-nutrient in said liquid), wherein said acidic ion is removed through an Anion Exchange Reverse Electro-Enhanced Dialysis (AX-REED) membrane stack. This step is designated step d) herein above. As used herein the term "removing an organic acid" refers to removing the acidic ion of said organic acid.

Step d) involves removing one or more acidic ions from said liquid while retaining at least 65% of said at least one micro-nutrient in said liquid, wherein said acidic ion is removed through an Anion Exchange Reverse Electro-Enhanced Dialysis (AX-REED) membrane stack, said membrane stack containing i) at least one cell consisting of:
  1. two an-ion exchange membranes defining a chamber for the starting liquid; and
  2. two further chambers for a dialysis liquid, wherein said two further chambers are positioned adjacent to the chamber for the starting liquid on opposing sides and wherein said two further chambers may be connected
ii) a set of end membranes
iii) means for applying an electric field over the membrane stack by means of at least two electrodes
iv) means for reversing the direction of the electric field within said membrane stack and wherein the removal involves the steps of
i) inserting the starting liquid into the chamber for the starting liquid; and
ii) inserting a dialysis liquid in the two further chambers for the dialysis liquid; and
iii) applying an electric field over the membrane stack;
iv) incubating said starting liquid in said chamber, whereby the direction of electric field is reversed at intervals In general step d) involves removing at least 10%, for example at least 15%, for example at least 20%, such as at least 25%, such as at least 30% of one or more acidic ions.

This step may also be referred to as AX-REED treatment. The liquid obtained after AX-REED treatment may be referred to as "AX-REED" liquid herein. In certain embodiments of the invention, then step d) is the last step of the method, and in these embodiments the liquid obtained after AX-REED treatment is the beverage. In other embodiments of the invention the method furthermore involves a step e)

of removing at least part of one cation from the liquid, while retaining at least 65% of said at least one micro-nutrient in said liquid, wherein said cation is removed through an Cation Exchange Reverse Electro-Enhanced Dialysis (CX-REED) membrane stack. This may also be referred to as CX-REED treatment. Steps d) and e) may collectively be referred to as "REED treatment" herein.

Frequently steps d) and e) may be performed using only one apparatus, which may be referred to as "REED equipment" herein. REED equipment to be used with the present invention may in general be set up to perform step d) and step e) in separate compartments. The term "REED equipment" as used herein is an apparatus comprises at least one AX-REED membrane stack. Preferably a REED equipment according to the present invention comprises at least one AX-REED membrane stack and at least one CX-REED membrane stack.

Figure 1:
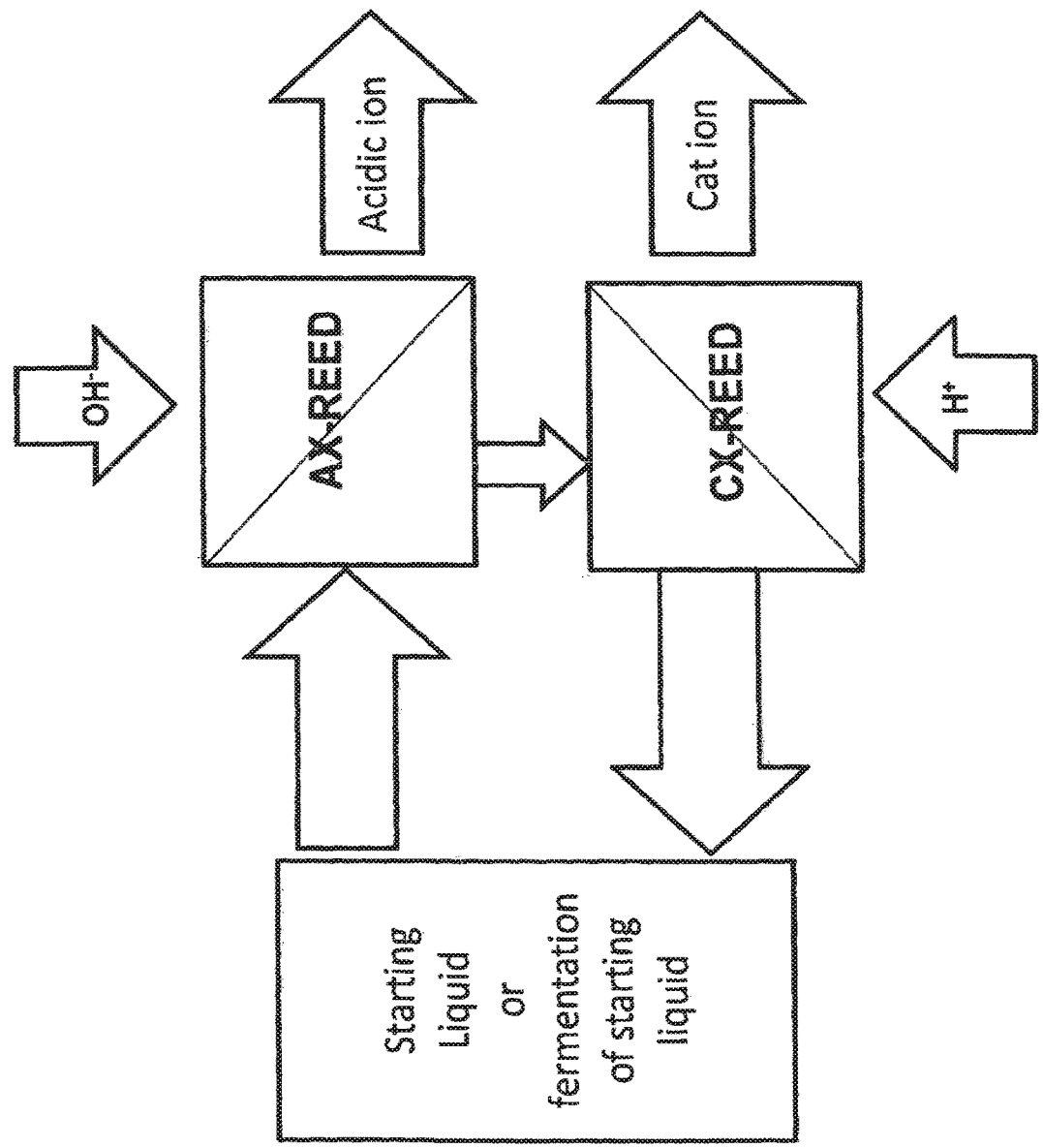
FIG. 1 shows an overview of a REED equipment.

Thus, steps d) and e) may be performed simultaneously or sequentially, and preferably both steps d) and e) are performed using REED equipment set up to perform both steps d) and e). An overview of suitable REED equipment is shown in FIG. 1 and in FIG. 4 which illustrates a REED setup which may be preferred in several embodiments of the present invention. It is however possible to perform steps d) and e) using separate REED equipment, which then may be referred to as AX-REED equipment and CX-REED equipment, respectively.

Thus, the REED equipment according to the invention preferably comprises at least one AX-REED membrane stack and at least one CX-REED membrane stack, which may be any of the AX-REED membrane stacks described herein below in this section and any of the CX-REED membrane stacks described herein below in the section CX-REED. Even more preferably, the REED equipment contains at least one AX-REED and at least one CX-REED membrane stack, wherein said AX-REED and said CX-REED membrane stacks are connected in parallel. Thus, the REED equipment may contain one AX-REED membrane stack and one CX-REED membrane stack connected in parallel.

When two or more REED stacks are arranged in parallel the treated fluid i.e. the starting liquid from one REED stack is not lead directly to the next REED stack as would be the case if the two stack were connected in series.

A parallel system can for example have an AX-REED and a CX-REED connected to a reservoir and/or tank with a starting liquid. The AX-REED receives starting liquid from the reservoir and/or tank and said starting liquid is returned to the reservoir and/or system after being treated in the AX-REED stack. Simultaneously or at another time the CX-REED receives starting liquid or partly AX-REED treated liquid or AX-REED liquid from the reservoir and/or tank and said liquid is returned to the reservoir and/or tank after being treated in the CX-REED stack. It is understood that the liquid may be recirculated to the AX-REED and/or CX-REED stack from the tank. Such re-circulated liquid will in principle be partly AX-REED and/or CX-REED treated liquid. For the sake of simplicity, the chambers of the AX-REED and CX-REED membrane stack may be referred to as "chamber for starting liquid" even if also partly AX-REED and/or CX-REED treated liquid may be introduced into these chambers.

The REED equipment may alternatively comprise more AX-REED membrane stacks than CX-REED Stacks or the REED equipment may comprise more CX-REED membrane stacks than AX-REED Stacks. The relative number of AX-REED membrane stacks/CX-REED membrane stacks than can be varied in order to regulate how much of a first component is removed from the liquid relatively to how much of a second component is removed from the liquid. The ratio between removed first component and removed second component may also me adjusted by providing AX-REED membrane stacks and CX-REED membrane stacks of different sizes.

A REED stack comprises at least one chamber for starting liquid and at least two chambers for dialysis liquid. The chamber(s) containing starting liquid and the chambers containing dialysis liquid are arranged alternatingly side by side i.e. a REED stack comprises at least three active adjacent chambers: a chamber for dialysis liquid—a chamber for starting liquid—a chamber for dialysis liquid. Each interface between a chamber for starting liquid and chamber for dialysis liquid is formed by anion exchange membrane, which exchange membranes in the AX-REED stacks are anion exchange membranes and in the CX-REED stacks are cation exchange membranes.

Each REED stack also comprises two end membranes defining an electrode chamber at each end of the REED stack i.e. a REED stack with two end membranes comprises at least five adjacent chambers: an electrode chamber—a chamber for dialysis liquid—a chamber for starting liquid—a chamber for dialysis liquid—an electrode chamber.

It is to be understood that in embodiments where step e) is performed after step d), then in so far as the CX-REED membrane stack is concerned then the "chamber for starting liquid" in fact filled with AX-REED liquid. Furthermore, it is to be understood that after running AX-REED or CX-REED for a while, then the liquid in the chamber for starting liquid may be partly REED treated starting liquid. In embodiments where the AX-REED treatment is performed alone for a while followed by simultaneous AX-REED and CX-REED in parallel, the liquid inserted into the "chamber for the starting liquid" of the CX-REED membrane stack, is in fact partly AX-REED treated starting liquid. For the sake of simplicity the chamber is never-the-less referred to as "chamber for starting liquid".

Each electrode chamber can be formed by an end membrane and an end wall of the REED stack.

A REED stack with seven adjacent chambers, two electrode chambers and five active chambers are arranged as: an electrode chamber—a chamber for dialysis liquid—a chamber for starting liquid—a chamber for dialysis liquid—a chamber for starting liquid—a chamber for dialysis liquid—an electrode chamber.

Figure 4:
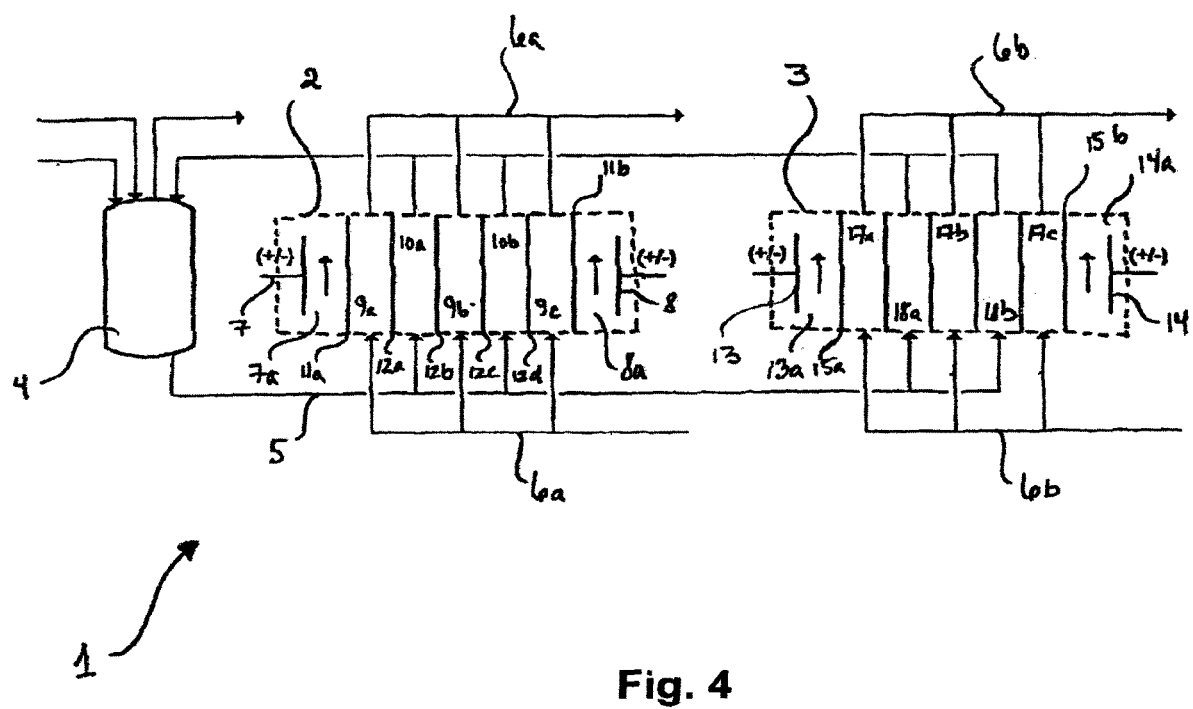
FIG. 4 shows an exemplary REED equipment.

FIG. 4 shows an exemplary REED equipment 1 according to the present invention said REED equipment comprises an AX-REED stack 2 arranged in parallel with a CX-REED stack 3. Both AX-REED and CX-REED stack is connected to a tank 4 containing the liquid by piping 5 and to a fluid system 6a and 6b providing and leading dialysis liquids to and away from the REED stacks. The fluid system 6a is for providing the dialysis liquid to be used with AX-REED, whereas the fluid system 6b is for providing the second dialysis liquid. At the beginning of the process the tank 4 contains the starting liquid, later the tank contains the partly AX-REED and/or CX-REED treated liquid. At the end of the process the tank 4 contains either the AX-REED liquid, the CX-REED liquid or the REED liquid.

The AX-REED stack comprises a first 7 and second 8 electrode arranged to provide an electrical field across five active chambers in between the electrodes i.e. across the alternating chambers with dialysis liquid 9 and starting liquid 10 formed by the membranes. In the present exemplary stack the alternating chambers are formed by:

an end membrane 11a defining at one side a first electrode chamber 7a and on the opposing side a first chamber 9 for dialysis liquid a first anion exchange membrane 12a which together with the first end membrane defines the first chamber, Second anion exchange membrane 12b which together with the first anion exchange membrane forms a second chamber 10a for starting liquid third anion exchange membrane 12c which together with the second anion exchange membrane forms a third chamber 9b for dialysis liquid fourth anion exchange membrane 12d which together with the third anion exchange membrane forms a fourth chamber 10b for dialysis liquid a second end membrane 11b which together with the fourth anion exchange membrane forms a fifth chamber 9c for dialysis liquid The first and second electrode are arranged in a first 7a and second 8a electrode chamber respectively. Said first electrode chamber defined by a first end wall (indicated by dotted line) and the first end membrane and said second electrode chamber defined by second end wall (also indicated by dotted line) and the second end membrane.

The exchange membranes 12a-12d can preferably be of the same type as well as the two end membranes also can be identical.

Similarly the CX-REED stack comprises two electrodes 13 and 14 one on each side of a stack of membranes said stack of membranes being a first end membrane 15a, four cation exchange membranes 16a-16d and a second end membrane 15b. Said membranes together with end walls forming a first electrode chamber 13a, a first chamber for dialysis liquid 17a, a first chamber for starting liquid 18a, a second chamber for dialysis liquid 17b, a second chamber for starting liquid 18b, a third chamber for dialysis liquid 17c and a second electrode chamber 14a.

In the present example dialysis liquid may be any of the dialysis liquid to be used with AX-REED described in this section, and the second dialysis liquid may be any of the second dialysis liquids described in the section "CX-REED".

It is also comprised within the present invention that steps b), c), d) and e) may be performed simultaneously. This may for example be done within the REED equipment. It is also comprised within the invention that steps c), d) and e) are performed simultaneously. This may for example be done within the REED equipment. In particular this may be done using a REED equipment containing one AX-REED membrane stack and one CX-REED membrane stack connected in parallel.

The REED equipment may also contain more than one AX-REED membrane stacks connected in series, wherein said AX-REED membrane stacks are connected in parallel to at least one CX-REED membrane stack. The REED equipment may also contain more than one AX-REED membrane stacks connected in series, and more than one CX-REED membrane stacks connected in series, wherein said AX-membrane stacks and CX-REED membrane stacks are connected to each other in parallel.

In some embodiments of the invention the methods do not comprise steps b) and c), in which case, step d) is generally performed after step a). In other embodiments of the invention the methods do not comprise steps b) and c), but comprise a step e), in which case, step d) is generally performed after step a) and prior to step e), wherein steps d) and e) may be repeated p number of times, where p is an integer in the range of 1 to 5.

Step d) of the methods of the invention involves use of one or more AX-REED membrane stacks, wherein each of said membrane stacks contains v) at least one cell consisting of:
1. two an-ion exchange membranes defining a chamber for the starting liquid; and
2. two further chambers for a dialysis liquid, wherein said two further chambers are positioned adjacent to the chamber for the starting liquid on opposing sides and wherein said two further chambers may be connected v) a set of end membranes vi) means for applying an electric field over the membrane stack by means of at least two electrodes vii) means for reversing the direction of the electric field within said membrane stack.

Thus regardless of whether the electric field ions will be able to move from the chamber defining the starting liquid into either of the chambers for the dialysis liquid.

Each AX-REED membrane stack may comprise more than one cell as identified above. For example each AX-REED membrane stack may comprise in the range of 2 to 100 cells, such as in the range of 2 to 50 cells, such as in the range of 2 to 25 cells.

The removal of the acidic ion typically involves the steps of i) inserting the starting liquid into the chamber for the starting liquid; and ii) inserting a dialysis liquid in the two further chambers for the dialysis liquid; and iii) applying an electric field over the membrane stack;

iv) incubating said starting liquid in said chamber, whereby the direction of electric field is reversed at intervals AX-REED may be performed under circulation meaning that after incubation of the starting liquid in said chamber the resulting liquid may be removed from the chamber and later inserted into another chamber for the starting liquid or even into the same chamber for the starting liquid. When inserted into the same chamber, then frequently the dialysis liquid in said two further chambers has been exchanged for a fresh dialysis liquid.

When more than one membrane stack is employed the starting liquid may be inserted into each of the chambers for the starting liquid separately. Alternatively, some or all of said chambers may be connected, so that some or all of the chambers may be fed simultaneously. Similarly, the dialysis liquid may be inserted into each of the chambers for the dialysis liquid separately. Alternatively, some or all of said chambers may be connected, so that some or all chambers are fed simultaneously.

The acidic ion to be removed may for example be the anion of any organic acid, for example the anion of any of the organic acids, described herein above in the section "Organic acid".

During removal of said acidic ion, the two membranes surrounding the chamber for the starting liquid either facilitates the transport of ions out of the starting liquid or into the starting liquid from the dialysis liquid.

The direction of the electric field is changed at intervals. Each reversal of the direction of the electric field results in a short-term reestablishment of the affected ions' polarization profiles at the surface and inside the membranes, as the two membranes surrounding each feed compartment exchanges functions. This causes a short-term reversal of the separation process as the ions previously being removed are pushed back into the feed solution until the membrane profiles are re-established. It is advantageous to keep the intervals between current reversals within any one REED stack as long as allowed by the build-up of fouling, as each reversal introduces a short separation pause and introduces minor process instability.

The methods of the invention may involve use of more than one AX-REED membrane stack. The membrane stacks may be stacked (commonly separated by membrane spacers) on top of each other or side by side until sufficient membrane separation area is achieved. For feasible handling, operational, and maintenance purposes, the membrane stacks may be operated in several separate, practically sized membrane stacks, each with its own set of flow connections and electrodes, but with the same separation function. These stacks are operated together in parallel or serial or some combination thereof as part of the same separation system. It is advantageous to operate with multiple AX-REED membrane stacks, when more than one set of electrodes are used. The number of AX-REED membrane stacks may thus vary from 2 to several hundred depending on the process in question, but are typically in the range 2-50 AX-REED membrane stacks, more typically in the range of 4-20 membrane stacks.

The dialysis liquid to be used with AX-REED according to the invention may be any alkaline solution. Typically it is an aqueous solution of a cation-OH, wherein said cation typically may be the cation of a metal. For example the dialysis liquid may comprise one or more bases selected from the group consisting of $Ca(OH)_2$, $Mg(OH)_2$, KOH, and NaOH, preferably from the group consisting of $Ca(OH)_2$, $Mg(OH)_2$ and KOH, The dialysis liquid will typically contain said base in a concentration of in the range of 5 to 80%, preferably in the range of 10 to 70%, more preferably in the range of 20 to 60%, for example in the range of 30 to 50%. In certain embodiments said base is used in a concentration of in the range of 5 to 20%. This may in particular be the case, when the dialysis liquid is used only once. All percentages are provided as w/w.

In the case of AX-REED, acidic ions are extracted through one anion-exchange membrane in each cell of the AX-REED membrane stack, while typically hydroxide ions enter through the opposite anion-exchange membrane. When the direction of the electrical field is reversed, the extracted acidic ions inside the first mentioned membrane is pushed back into the starting liquid, before hydroxide ions starts entering the starting liquid. Thus, in the short time period until the hydroxide profile is re-established through the membrane, which was previously used to extract acidic ions, no pH control is observed. The length of the time phase after each current reversal until pH control is regenerated depends on various process conditions and membrane properties; typically, it takes between 10-90 seconds before the process is again operating at optimal process parameter control. This is registered as a sudden change in the process parameter e.g. pH, which must then be regulated back to the desired set-point. In order to spread out the instability effects and reduce the overall impact of current reversals with more than one membrane stack, the reversals of the electric field on each separate stack are preferably performed asynchronically. Thus, it is preferred with the invention that more than one AX-REED membrane stack is employed and that the electric field on each separate stack is reversed asynchronically. Even though the intervals for reserving the electrical field of each stack are typically of similar length, the timing of the reversals are dispersed for best process stability effect.

In an embodiment of the invention the direction of the electric field within any first membrane stack is reversed at substantially regular dispersal intervals relative to the reversals for any second or further membrane stack.

The interval length between current reversals for a stack is typically chosen with regard to the build-up of membrane fouling. Typically, said intervals within any one REED stack may be in the range 5-6000 seconds, preferably 8-3000 seconds, more preferably 10-2000 seconds and even more preferably 100-1500 seconds. In another embodiment of the invention the direction of the electric field within any first membrane stack is reversed at dispersal intervals of substantially even length relative to the reversals for any second or further membrane stack in order to maximise the time between a current reversal of any first REED stack and any second or further REED stack in the same process. With the same dispersal interval length between current reversals, i.e. where these reversals are dispersed evenly the connected bioreactor will experience a reduced impact, but much more often.

In an embodiment of the invention the intensity of the applied electric field is adjusted in response to the pH, target ion concentration or conductivity of said liquid composition. By increasing the intensity of the electric field, the ion exchange increases in the REED system, and vice versa. Online, semi-online (e.g. time-delayed) or secondary (e.g. using online conductivity or turbidity measurements for estimating target ion concentration) measurements of the process parameters being regulated are input in a control regulation mechanism e.g. PID-control software, which in turn regulates the output of the power supplies to the REED electrodes.

The current reversal is not the only effect, which can introduce deviations in process control. For optimal control of process parameters, it may be advantageous to control the concentration of various ions in the dialysis liquid as well as the flow and temperature and mode of operation. With regard to temperature, in embodiments of the invention where steps c) and d) are performed simultaneously, then the temperature is typically selected in order to allow growth of said glucose fermenting microorganism.

If multiple stacks are used it is possible to set up the flow of the dialysis liquid either in parallel, or in serial mode with or without booster pumps between stacks, in a similar fashion as with the starting liquid.

In embodiments of the invention where the methods comprise step c), then Anion-Exchange REED (AX-REED) in general serves to replace produced organic acids with hydroxide ions, and thus, countering the reduction of pH from the acid-formation. By regulation of the AX-REED, the hydroxide exchange can maintain pH during fermentation without the need for neutraliser addition.

In embodiments of the invention wherein the methods do not comprise step c), then the AX-REED in general serves to replace organic acids already present in the starting liquid with hydroxide ions and thus increasing the pH of the starting solution.

In the context of this invention the term "reversal of the electric field" or "current reversal" means the changing of polarity of the REED electrodes, resulting in a reversal of the direction of the electrical DC current, which facilitates the migration of ions through the ion-exchange membranes.

The anion exchange membranes may be any useful anion exchange membranes. The size of the membranes may be selected in order to achieve a suitable retention time. For calculating the retention time, the total area of the anion membranes used is of interest. Accordingly, if the method employs use of many membrane stacks and/or if each membrane stack contains many cells, then the area of each membrane may be reduced.

Non-limiting examples of useful anion exchange membranes include Ionic AR103 (GE, USA), Neosepta ASM (Astom Corp., Japan), Fumatech FAB (anion)(Fumatech, Germany) or Nafion N117 (anion)(Dupont).

Non-limiting examples of useful methods and equipment for performing AX-REED are also described in European patent applications EP 1 347 823, EP2349541 and EP2349540, all of which are incorporated by reference herein.

CX-REED

In some embodiments, the methods of invention furthermore comprises step e), wherein step e) comprises removing at least part of one cation from the AX-REED liquid, while retaining at least 65% of said at least one micro-nutrient in said liquid, wherein said cation is removed through an Cation Exchange Reverse Electro-Enhanced Dialysis (CX-REED) membrane stack, said membrane stack containing
i) at least one cell consisting of:
a. two cat-ion exchange membranes defining a chamber for the AX-REED liquid; and
b. two further chambers for a second dialysis liquid, wherein said two further chambers are positioned adjacent to the chamber for the AX-REED liquid on opposing sides and wherein said two further chamber may be connected
ii. a set of end membranes
iii. means for applying an electric field over the membrane stack by means of at least two electrodes
iv. means for reversing the direction of the electric field within said membrane stack
and wherein the removal involves the steps of
i) inserting the AX-REED liquid (i.e. the liquid obtained after AX-REED treatment) into the chamber for the AX-REED liquid; and
ii) inserting a second dialysis liquid in the two further chambers for the second dialysis liquid; and
iii) applying an electric field over the membrane stack;
iv) incubating said AX-REED liquid in said chamber, whereby the direction of electric field is reversed at intervals In embodiments of the invention, where the AX-REED and the CX-REED is performed simultaneously in parallel, then at the onset of the procedure the liquid to be treated by CX-REED is in fact the starting liquid. Thus, the CX-REED membrane stack may then contain
v) at least one cell consisting of:
a. two cat-ion exchange membranes defining a chamber for the starting liquid; and
b. two further chambers for a second dialysis liquid, wherein said two further chambers are positioned adjacent to the chamber for the starting liquid on opposing sides and wherein said two further chamber may be connected
v. a set of end membranes
vi. means for applying an electric field over the membrane stack by means of at least two electrodes
vii. means for reversing the direction of the electric field within said membrane stack
and wherein the removal involves the steps of
i) inserting the starting liquid into the chamber for the AX-REED liquid; and
ii) inserting a second dialysis liquid in the two further chambers for the second dialysis liquid; and
iii) applying an electric field over the membrane stack;
iv) incubating said starting liquid in said chamber, whereby the direction of electric field is reversed at intervals In some embodiments AX-REED is performed first and then AX-REED and CX-REED are performed simultaneously in parallel. In these embodiments, then at the onset of the CX-REED treatment, then partly AX-REED treated liquid is inserted into the chamber for starting liquid or the chamber for AX-REED liquid. For the sake of simplicity, then the chamber may never-the-less be referred to as chamber for starting liquid or chamber for AX-REED liquid.

As described above the methods of the invention contains a step of removing one or more acid acidic ions from the liquid through an AX-REED membrane stack into a dialysis liquid, which typically contains a base. This may result in the basic cation being transferred from the dialysis liquid into the starting liquid and therefore the method may contain the step e), wherein at least some of said cation is removed from the liquid.

This step may also be referred to as CX-REED treatment. As described above step e) may be performed using a REED equipment. The liquid resulting from step d) of the method of the invention is herein referred to as "AX-REED liquid". The AX-REED liquid may be used as starting liquid for step e). Alternatively, a partly AX-REED treated liquid may be used as starting liquid for step e). It is also possible that the starting liquid for step d) is also the starting liquid for step e), when steps d) and e) are performed simultaneously.

Step e) of the methods of the invention involves use of one or more CX-REED membrane stacks, wherein each of said membrane stacks contains
v) at least one cell consisting of:
1. two an-ion exchange membranes defining a chamber for the AX-REED liquid, the partly AX-REED treated liquid or the starting liquid; and
2. two further chambers for a second dialysis liquid, wherein said two further chambers are positioned adjacent to the chamber for the starting liquid on opposing sides and wherein said two further chambers may be connected
viii) a set of end membranes
ix) means for applying an electric field over the membrane stack by means of at least two electrodes
x) means for reversing the direction of the electric field within said membrane stack.

Thus regardless of whether the electric field ions will be able to move from the chamber defining the AX-REED liquid, the partly AX-REED treated liquid or the starting liquid into either of the chambers for the second dialysis liquid.

Each CX-REED membrane stack may comprise more than one cell as identified above. For example each CX-REED membrane stack may comprise in the range of 2 to 100 cells, such as in the range of 2 to 50 cells, such as in the range of 2 to 25 cells.

The removal of the cation typically involves the steps of
i) inserting the AX-REED liquid, the partly AX-REED treated liquid or the starting liquid into the chamber for the starting liquid, wherein said AX-REED liquid is obtained by AX-REED treatment of the starting liquid as described above in the section "AX-REED"; and
ii) inserting a second dialysis liquid in the two further chambers for the second dialysis liquid, wherein the second dialysis may be any of the second dialysis liquids described herein below; and
iii) applying an electric field over the membrane stack;
iv) incubating said starting liquid in said chamber, whereby the direction of electric field is reversed at intervals.

CX-REED may be performed under circulation meaning that after incubation of the AX-REED liquid, the partly AX-REED treated liquid or the starting liquid in said chamber the resulting liquid may be removed from the chamber and later inserted into another chamber for the AX-REED liquid, the partly AX-REED treated liquid or the starting liquid or even into the same chamber for the AX-REED liquid or starting liquid. When inserted into the same chamber, then frequently the second dialysis liquid in said two further chambers has been exchanged for a fresh second dialysis liquid.

The cation to be removed may for example be any cation, but typically it will be one or more cations introduced into the AX-REED liquid from the dialysis liquid during AX-REED treatment. Thus, the cation may for example be any of the cations of a base, which may be included in the dialysis liquid as described herein above in the section "AX-REED".

During removal of said cation, the two membranes surrounding the chamber for the AX-REED liquid or starting liquid either facilitates the transport of ions out of the AX-REED liquid or into the AX-REED liquid from the second dialysis liquid.

The direction of the electric field is changed at intervals in a manner similar to what is described herein above for AX-REED.

The methods of the invention may involve use of more than one CX-REED membrane stack. The membrane stacks may be stacked (commonly separated by membrane spacers) on top of each other or side by side until sufficient membrane separation area is achieved to obtained a desired retention time. For feasible handling, operational, and maintenance purposes, the membrane stacks may be operated in several separate, practically sized membrane stacks, each with its own set of flow connections and electrodes, but with the same separation function. These stacks are operated together in parallel or serial or some combination thereof as part of the same separation system. It is advantageous to operate with multiple CX-REED membrane stacks, when more than one set of electrodes are used. The number of CX-REED membrane stacks may thus vary from 2 to several hundred depending on the process in question, but are typically in the range 2-50 CX-REED membrane stacks, more typically in the range of 4-20 membrane stacks.

The second dialysis liquid to be used with CX-REED according to the invention may be any acidic solution. Typically it is an aqueous solution of a H-anion, wherein the anion typically is an inorganic anion. Thus, for example the second dialysis liquid may comprise one or more acids selected from the group consisting of $H_3PO_4$, $HNO_3$ and $H_2SO_4$. Preferably, the second dialysis liquid comprises $H_3PO_4$. The second dialysis liquid will typically contain said acid in a concentration in the range of 5 to 90%, preferably in the range of 10 to 90%, more preferably in the range of 20 to 80%, yet more preferably in the range of 30 to 80%, for example in the range of 40 to 80%, such as in the range of 50 to 80%, for example in the range of 60 to 80%. The percentages are provided as w/w.

In the case of CX-REED, cations are extracted through one cation-exchange membrane of each cell of the CX-REED membrane stack(s), while typically $H^+$ ions enter through the opposite cation-exchange membrane. When the direction of the electrical field is reversed, the extracted cations inside the first mentioned membrane is pushed back into the AX-REED liquid, before $H^+$ ions starts entering the AX-REED liquid. In order to spread out the instability effects and reduce the overall impact of current reversals with more than one membrane stack, the reversals of the electric field on each separate stack are preferably performed asynchronically. Thus, it is preferred with the invention that more than one CX-REED membrane stack is employed and that the electric field on each separate stack is reversed asynchronically. Even though the intervals for reserving the electrical field of each stack are typically of similar length, the timing of the reversals are dispersed for best process stability effect.

In an embodiment of the invention the direction of the electric field within any first membrane stack is reversed at substantially regular dispersal intervals relative to the reversals for any second or further membrane stack.

The interval length between current reversals for a stack is typically chosen with regard to the build-up of membrane fouling. Typically, said intervals within any one CX-REED stack may be in the range 5-6000 seconds, preferably 8-3000 seconds, more preferably 10-2000 seconds and even more preferably 100-1500 seconds. In another embodiment of the invention the direction of the electric field within any first membrane stack is reversed at dispersal intervals of substantially even length relative to the reversals for any second or further membrane stack in order to maximise the time between a current reversal of any first CX-REED stack and any second or further CX-REED stack in the same process. With the same dispersal interval length between current reversals, i.e. where these reversals are dispersed evenly the connected bioreactor will experience a reduced impact, but much more often.

In an embodiment of the invention the intensity of the applied electric field is adjusted in response to the pH, target ion concentration or conductivity of said liquid composition. By increasing the intensity of the electric field, the ion exchange increases in the CX-REED system, and vice versa. Online, semi-online (e.g. time-delayed) or secondary (e.g. using online conductivity or turbidity measurements for estimating target ion concentration) measurements of the process parameters being regulated are input in a control regulation mechanism e.g. PID-control software, which in turn regulates the output of the power supplies to the CX-REED electrodes.

The reversal of electrical field is not the only effect, which can introduce deviations in process control. For optimal control of process parameters, it may be advantageous to control the concentration of various ions in the second dialysis liquid as well as the flow and temperature and mode of operation.

If multiple stacks are used it is possible to set up the flow of the second dialysis liquid either in parallel, or in serial mode with or without booster pumps between stacks, in a similar fashion as with the AX-REED liquid.

In general the Cation-Exchange REED (CX-REED) serves to replace cations with hydrogen ions.

The cation exchange membranes may be any useful cation exchange membranes. The size of the membranes may be selected in order to achieve a suitable retention time. For calculating the retention time, the total area of the anion membranes used is of interest. Accordingly, if the method employs use of many membrane stacks and/or if each membrane stack contains many cells, then the area of each membrane may be reduced.

Non-limiting examples of useful CX-membranes includes Nafion N117 (cation)(Dupont) and Fumatech FAB (cation) (Fumatech, Germany).

Non-limiting examples of useful methods and equipment for performing AX-REED are also described in European patent applications EP 1 347 823, EP2349541 and EP2349540, all of which are incorporated by reference herein.

In general, the CX-REED is performed in order to remove at least part of one cation from a liquid, and in particular from the AX-REED liquid. The CX-REED is performed for at time sufficient to remove a desired amount of said at least one cation. In one preferred embodiment of the invention step e) is performed in a manner so that the CX-REED liquid produced has a conductivity of at the most 7 mS/cm, preferably of at the most 6 mS/cm, even more preferably of at the most 5 mS/cm, for example in the range of 3 to 5 mS/cm. If the liquid has a higher conductivity, then CX-REED may be continued until the CX-REED liquid has the desired conductivity. In general, a higher conductivity than 5 mS/cm is less desirable in the CX-REED liquid, because this may cause a salty taste. When steps d) and e) are performed simultaneously it is preferred that step e) is performed in a manner so that the REED liquid produced has a conductivity of at the most 7 mS/cm, preferably of at the most 6 mS/cm, even more preferably of at the most 5 mS/cm, for example in the range of 3 to 5 mS/cm. If the liquid has a higher conductivity, then CX-REED may be continued until the REED liquid has the desired conductivity. In general, a higher conductivity than 5 mS/cm is less desirable in the REED liquid, because this may cause a salty taste.

In embodiments of the invention wherein the starting liquid comprises a cereal extract, then it is preferred that step e) is performed in a manner so that the CX-REED liquid or the REED liquid produced has a conductivity of at the most 7 mS/cm, preferably of at the most 6 mS/cm, even more preferably of at the most 5 mS/cm, yet more preferably in the range of 3 to 5 mS/cm, such as in the range of 4 to 5 mS/cm, for example approx. 4.5.

In embodiments of the invention wherein the starting liquid comprises a fruit juice or a fruit extract, then in general it is preferred that the conductivity is low. Thus, in these embodiments it is preferred that step e) is performed in a manner so that the CX-REED liquid or the REED liquid produced has a conductivity of at the most 6 mS/cm, preferably of at the most 5 mS/cm, even more preferably of at the most 4 mS/cm, yet more preferably in the range of 2 to 4 mS/cm, such as in the range of 3 to 4 mS/cm, for example approx. 3.5.

Contact Time

The contact time is a figure, which is useful for managing the REED process, According to the invention the contact time in relation to AX-REED is calculated as $$(\text{Total area of an-ion exchange membranes (cm}^2)/\text{volume of starting liquid (cm}^3))\times\text{time (h)}.$$

The total area of an-ion exchange membranes is the total area of all an-ion exchange membranes of all cells in all membrane stacks used for the AX-REED. The contact time should be selected in order to arrive at a beverage with a palatable ration of sugar to organic acid. Preferably, the ratio of sugar to organic acid of the beverages of the invention is the ration described in the section "Ratio of sugar to organic acid" herein.

In embodiments of the invention, where the methods comprises step c), then it is generally preferred that the contact time is relatively long, whereas the contact time may be much shorter in embodiments of the invention lacking step c).

Furthermore, a long contact time may unfortunately lead to accumulation of off-flavours and accordingly the contact time should preferably also not be too long.

In one embodiment of the invention the contact time in relation to AX-REED is in the range of 0.5 to 100 h, such as 1 to 50 h, for example 1 to 10 h. In embodiments of the invention relating to any of the methods described in the sections "Method of producing a fermented beverage" and "Methods of producing a beverage with enzymatic conversion of sugar" then the contact time in general may be in the range of 5 to 10 h.

According to the invention the contact time in relation to CX-REED is calculated as $$(\text{Total area of cat-ion exchange membranes (cm}^2)/\text{volume of AX-REED liquid (cm}^3))\times\text{time (h)}.$$

The total area of cat-ion exchange membranes is the total area of all cat-ion exchange membranes of all cells in all membrane stacks used for the CX-REED. The contact time of CX-REED is in general much lower than the contact time for AX-REED.

In one embodiment of the invention the contact time in relation to CX-REED is in the range of 0.01 to 10, such as 0.05 to 5, for example 0.1 to 1.

Additional Compound

The methods of the invention may comprise a step f) of adding one or more additional compound(s). The additional compound may for example be a flavor compound, a preservative or a functional ingredient.

The flavor compound may be any of the flavor compounds described herein below in the section "Flavor compound".

Functional ingredients may be any ingredient added to obtain a given function. Preferably a functional ingredient renders the beverage more healthy. Non-limiting examples of functional ingredients includes soluble fibres, proteins, added vitamins or minerals.

The preservative may be any food grade preservative, for example it may be benzoic acid, sorbic acid, or salts thereof.

The additional compound may also be $CO_2$. In particular, $CO_2$ may be added to obtain a carbonated beverage.

Flavour Compound

The flavour compound to be used with the present invention may be any useful flavour compound. The flavour compound may for example be selected from the group consisting of aromas, plant extracts, plant concentrates, plant parts and herbal infusions.

Thus, the flavour compound may for example be an aroma. Aromas are typically organic compounds, for example they may be plant secondary metabolites. The aroma may be any aroma, for example a fruit aroma or vanilla aroma.

The plant extract may for example be a herbal extract. Non-limiting examples of herbal extracts includes an extract of green tea, black tea, rooibos, peppermint or hops. The plant extract may also be a flower extract. Non limiting examples of flower extracts includes hibiscus chamomile, elderflower, lavender or linden flower.

The plant extract may also be a fruit extract. Plant parts may for example be dried or fresh herbs, such as hops pellets, dried of fresh flowers or fruits.

The plant concentrate may be a fruit concentrate, for example a fruit juice, which has been concentrated by removal of water.

Non-limiting examples of fruits useful for fruit aroma, fruit extract or fruit concentrates include orange, apple, banana, lemon, passion fruit, mango, pineapple, pears, kumquats or pomelo, The flavor compound may also be tonic.

Sequence Listing

| | |
|---|---|
| SEQ ID NO: 1 | Amino acid sequence of glucan 1,4-alpha-glucosidase of *Aspergillus niger* |
| SEQ ID NO: 2 | Amino acid sequence of glucan 1,4-alpha-glucosidase of *Aspergillus oryzae* (strain ATCC 42149/RIB 40) |

-continued

| | |
|---|---|
| SEQ ID NO: 3 | Amino acid sequence of glucan 1,4-alpha-glucosidase of *Rhizopus oryzae* |
| SEQ ID NO: 4 | Amino acid sequence of alpha-amylase of *Aspergillus niger* |
| SEQ ID NO: 5 | Amino acid sequence of alpha-amylase of *Aspergillus oryzae* |
| SEQ ID NO: 6 | Amino acid sequence of alpha-amylase of *Rhizopus oryzae* |
| SEQ ID NO: 7 | Amino acid sequence of pullulanase of *Bacillus subtilis* |
| SEQ ID NO: 8 | Amino acid sequence of pullulanase of *Bacillus cereus* (strain ZK/E33L) |
| SEQ ID NO: 9 | Amino acid sequence of pullulanase of *Lactobacillus acidophilus* (strain ATCC 700396/NCK56/N2/NCFM) |
| SEQ ID NO: 10 | Amino acid sequence of glucose oxidase of *Aspergillus niger* |
| SEQ ID NO: 11 | Amino acid sequence of glucose oxidase of *Penicillium amagasakiense* |
| SEQ ID NO: 12 | Amino acid sequence of catalase of *Aspergillus niger* |

EXAMPLES

The invention is further illustrated by the following examples, which however should not be construed as limiting for the invention.

Example 1

Figure 2:
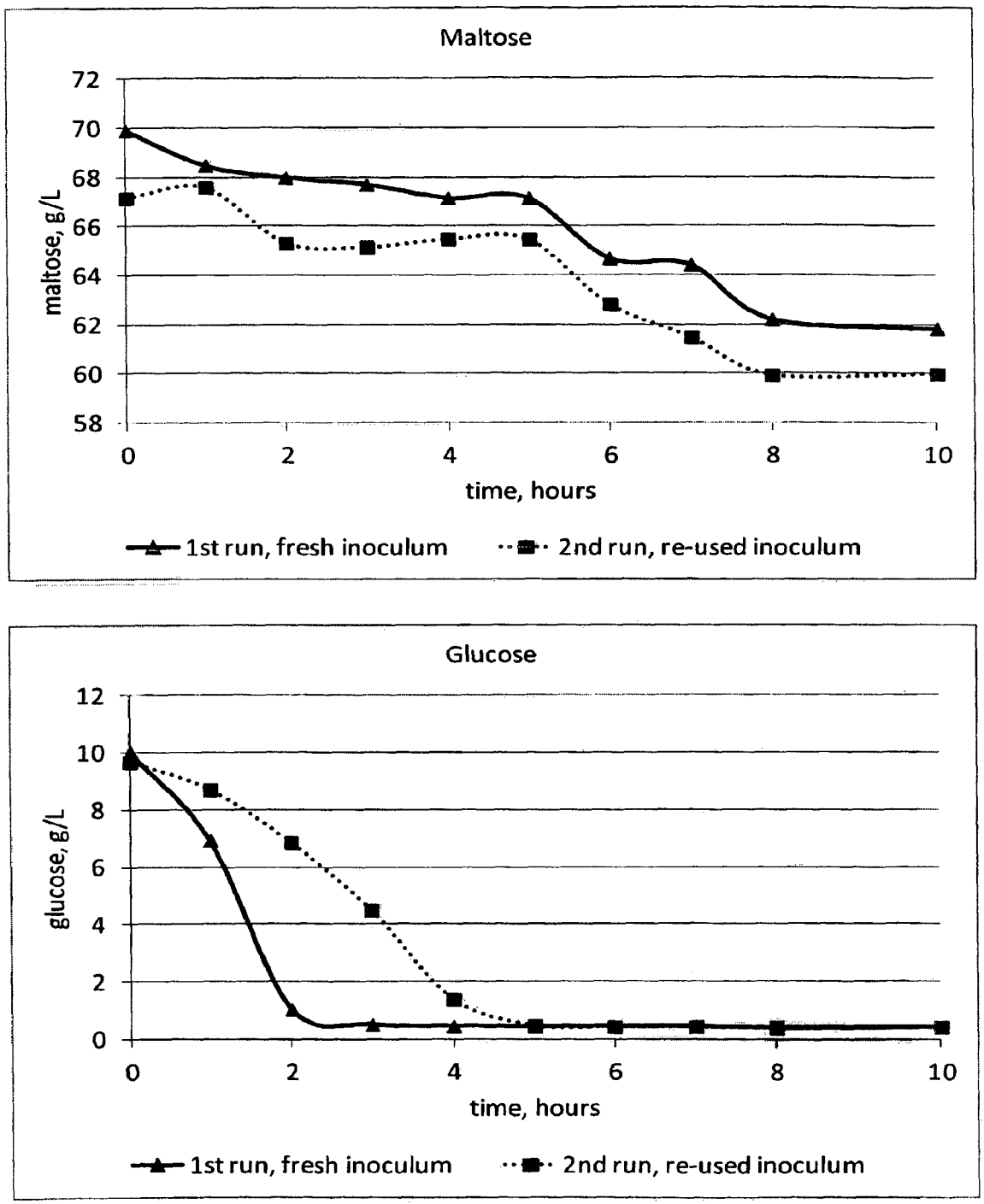
FIG. 2 shows consumption of maltose and glucose during two consecutive REED controlled fermentations.

Standard wort of 14.85% P was produced as described herein below in Example 3. 7.5 L standard wort was fermented, at 30° C., by a mixture of *Lactobacillus sanfranciscensis* and *Lactococcus lactis* in a REED rig (Jurag Separation, Denmark). The REED rig was equipped with both an AX-REED and a CX-REED membrane stack. After fermentation to an end-point of pH 3.9, the ferment was allowed to stand at 4° C. for 36 hours, after which the bulk of the liquid was decanted from the sedimented bacteria. Similar tests with each of the bacteria alone were conducted. The supernatants were filtered through a Seitz EK filter, carbonated, pasteurised, and their flavour evaluated. Lactic acid bacteria were harvested by centrifuging the sediment at 8000 rpm for 10 minutes, and then left for a further 36 hours before repeating the REED controlled fermentation. The consumption of maltose and glucose by the bacteria in the first and second fermentations is depicted in FIG. 2.

Although the maltose content of the wort differed in the two fermentations, so the start and end points were off-set, the performance of the bacteria was very similar in both cases, despite the inoculum for the second one having been cropped and stored at low pH for 72 hours. This ability to metabolise maltose shows that the *Lactobacillus sanfranciscensis* is considerably resistant to the treatment it received. The decline in the speed with which glucose was removed from the second fermentation suggests that *Lactococcus lactis* is more sensitive to these conditions.

The genome sequence of *Lactobacillus sanfranciscensis* has been published, and reveals that this organism is completely devoid of extracellular proteases. Interestingly, the flavour obtained from wort fermented by *Lactobacillus sanfranciscensis* lacks the unwanted peptone notes, characteristic of other lactic acid fermentations.

Example 2

This example describes production of a fermentation process for wort, which does not produce alcohol, but adjusts the sweetness to acidity imbalance in this raw material, to produce a refreshing drinks base, which is rich in natural vitamins and minerals, and low in calories.

The resulting drinks base can be used as a beverage per se or various flavor compounds can be added before consumption.

*Lactobacillus sanfranciscensis* was cultivated in medium containing maltose as the only carbon source. The maltose was labeled with $^{13}C$ NMR. It was shown that *Lactobacillus sanfranciscensis* was unable to form glycolytic metabolites from glucose when immediately transferred to this carbon source. *Lactococcus lactis*, which cannot grow on maltose, when fed $^{13}C$-labelled glucose, rapidly produces NMR signals which are attributable to glycolytic metabolites.

The provision of maltose, $^{13}C$-labelled on the reducing end, to a mixture of *Lactobacillus sanfranciscensis* and *Lactococcus lactis* would therefore only produce an NMR spectrum attributable to glycolytic metabolites, if the glucose released from maltose by phosphorolysis in *Lactobacillus sanfranciscensis* is metabolised by *Lactococcus lactis*. This was confirmed by the experiment, which yielded an NMR spectrum attributable to glycolytic metabolites.

Example 3

Production of Wort

A standard wort of 14.5% P was produced from 39.8 kg of a standard Pilsner malt, which was mashed-in with 108.4 L standard brewing water at 65° C. Just after mixing milled malt with water, a commercial enzyme preparation containing an arabinoxylanase activity was added in order to facilitate filtration of the finished wort. Calcium chloride was also added at this stage, and pH was adjusted to ca. 5.4 by addition of phosphoric acid. After 60 minutes at 65° C., the temperature was gradually increased to 78° C. during a 15-minutes period, and finally kept at 78° C. for 5 minutes. The mash was then filtrated and sparged, resulting in a total volume of 212 L prior to boiling. The wort was adjusted to pH ca. 5.2 by addition of phosphoric acid, and calcium chloride was added. The wort was then boiled 70 minutes. During this period, ca. 5% water evaporated, leaving 200 L boiled wort. After a whirlpool process to remove sediments, the boiled wort was filled into kegs and kept at 5° C. until REED processing. This wort, and worts produced in essentially the same way, is herein also referred to as "standard wort". The contents of fermentable sugars and organic acids in the standard wort are shown in table 2.

Detection and quantification of 5 fermentable carbohydrates (glucose, fructose, sucrose, maltose, maltotriose) was performed by high performance anion-exchange chromatography (HPAEC) using DIONEX ICS-3000 (ThermoScientific) connected to a PC equipped with the software Chromeleon. The hydroxyl-groups of carbohydrates are ionized to oxonium ions at pH 12-14 which allow separation of carbohydrates by anion exchange chromatography. Detection is then performed by Pulsed Electrochemical Detection (PED) (Pulsed Amperometric Detection (PAD)) using integrated amperometry. Quantification was allowed by use of HPLC-grade calibration standards: glucose (Sigma G-8270), fructose (Sigma F-0127), sucrose (Sigma S-9378), maltose (Sigma M-5885), maltotriose (Sigma M-8378).

Organic acids were determined using HPLC equipped with a "Prevail organic acid column" 150×4.6 mm. UV Detection was performed at 210 nm. As mobile phase 25 mM $KH_2PO_4$ pH 2.5 was used. As organic phase acetonitrile was used. The separation was done linearly with 100% Mobile phase (total separation time 7.5 min.).

REED Fermentation 250 g 80% lactic acid and 237 g 46% potassium hydroxide was added to 37.5 L standard wort to increase pH and conductivity in the starting liquid. This starting liquid was inoculated with commercial, frozen pure cultures of *Lactococcus lactis* and *Lactobacillus sanfranciscensis* (200 g and 400 g, respectively), and left to ferment, at 30° C. Acids produced during the fermentation were removed by the REED equipment, set up with Ionics AR103/Nafion N117 AX-membranes (12 cells pairs, 2 mm thickness, 915 cm$^2$ active areas per cell pair) and Nafion N117/Fumatech FAB CX-membranes (10 cell pairs, 2 mm thickness, 915 cm$^2$ active area per cell pair). AX-REED dialysis liquid was KOH (46%). CX-REED second dialysis liquid was H$_3$PO$_4$ (75%). Both dialysis liquids were only passed through the system once (single passage). The AX-REED and CX-REED membrane stacks were connected in parallel, however the CX-REED membrane stack was only operated in the last part of the process. An overview of the REED equipment is shown in FIG. 1. The fermentation was terminated after 25 hours, when the liquid had a pleasant balance between sweetness and acidity. The analytical results are shown in table 2.

TABLE 2

|  | Standard wort | REED product |
|---|---|---|
| Sugars, g/L: |  |  |
| Glucose | 9.4 | Trace |
| Fructose | Trace | 0 |
| Sucrose | 5.0 | 0 |
| Maltose | 65.3 | 21.7 |
| Maltotriose | 15.1 | 7.2 |
| Organic acids, mg/L: |  |  |
| Tartaric | 74 | 0 |
| Malic | 43 | 7 |
| Lactic | 0 | 484 |
| Acetic | 126 | 15 |
| Citric | 539 | 0 |
| Succinic | 475 | 113 |
| Propionic | 0 | 0 |
| pH: | 5.20 | 4.37 |

Example 4

A wort of 14.5% P, with a high content of glucose, was produced by mashing a standard Pilsner malt together with commercial brewing enzymes. 43.8 kg Pilsner malt was mashed-in with 131 L standard brewing water at 63° C. Just after mixing milled malt with water, commercial enzyme preparations containing alpha-glucosidase, α-amylase, and limit-dextrinase activities were added, which are capable of converting carbohydrates and oligosaccharides to glucose. Calcium chloride was also added, and pH was adjusted to approx. 5.2 by addition of phosphoric acid. After 30 minutes at 63° C., the temperature was increased to 70° C. at a rate of 1° C./minute, kept at 70° C. for 60 minutes, increased to 78° C. at a rate of 1° C./minute, and finally kept at 78° C. for 5 minutes. The mash was then filtrated and sparged, resulting in a total volume of 233 L prior to boiling. The sweet wort was adjusted to pH ca. 5.2 by addition of phosphoric acid, and calcium chloride was added. The wort was then boiled 70 minutes. During this period, ca. 5% water evaporated, leaving 220 L boiled wort. After a whirlpool process to remove sediments, the boiled wort was filled into kegs and kept at 5° C. until REED processing. This wort, and worts produced in essentially the same way, may herein also be referred to as "glucose wort". The contents of sugars and organic acids in the glucose wort were determined as described in Example 3 and the results are shown in table 3.

REED Fermentation 39.4 L glucose wort prepared as described above and 250 g 80% lactic acid and 227 g 46% potassium hydroxide was added to increase pH and conductivity in the starting liquid. This starting liquid was inoculated with 260 g of a commercial, frozen pure culture of *Lactococcus lactis* and left to ferment, at 25° C. Acids produced during the fermentation were removed by the REED equipment, set up with an AX-REED membrane stack and a CX-REED membrane stack as follows:

AX-REED membrane stack:
12 cell pairs
Membranes: Ionics AR103, Nafion N117
Total membrane area: 10980 cm$^2$
CX-REED membrane stack:
10 cell pairs
Membranes: Nafion N117, Fumatech FAB
Total membrane area 9150 cm$^2$ The AX-REED dialysis liquid was KOH (46%). The CX-REED second dialysis liquid was H$_3$PO$_4$ (75%). Both dialysis liquids were only passed through the system once (single passage). The AX-REED and CX-REED membrane stacks were connected in parallel, however the CX-REED membrane stack was only operated in the last part of the process. The fermentation was terminated after 23 hours, when the resulting liquid (REED liquid) had a pleasant balance between sweetness and acidity. The analytical results for the REED product are shown in table 3.

After REED fermentation, part of the REED liquid was flavoured by addition of pellets of an aroma hop variety. The pellets were left in the liquid at 14° C. for 20 hours and then removed. The flavoured liquid had a pleasant and characteristic hop aroma.

TABLE 3

|  | Glucose wort | REED liquid |
|---|---|---|
| Sugars, g/L: |  |  |
| Glucose | 141.4 | 22.2 |
| Fructose | Trace | Trace |
| Sucrose | 5.7 | 3.5 |
| Maltose | Trace | Trace |
| Maltotriose | 0 | 0 |
| Organic acids, mg/L: |  |  |
| Tartaric | 29 | 0 |
| Malic | 6 | 0 |
| Lactic | 0 | 773 |
| Acetic | 116 | 0 |
| Citric | 485 | 0 |
| Succinic | 348 | 11 |
| Propionic | 0 | 0 |
| pH: | 5.20 | 4.35 |

Example 5

Compared to orange juice, which has a pleasant balance between sweetness and acidity, lemon juice has a much higher content of organic acids, and a lower content of sugars. The dominating organic acid in lemon juice is citric acid, but relatively high levels of malic acid and ascorbic acid (vitamin C) are also found. Addition of high amounts of extra sugar and dilution with water is therefore the traditional way to produce palatable beverages based on lemon juice. However, the present invention provides a method of reduction of acidity, which result in production of pleasant lemon based juices with same low acidity as orange juices, but lower calorie content due to lower content of natural sugars.

Figure 3:
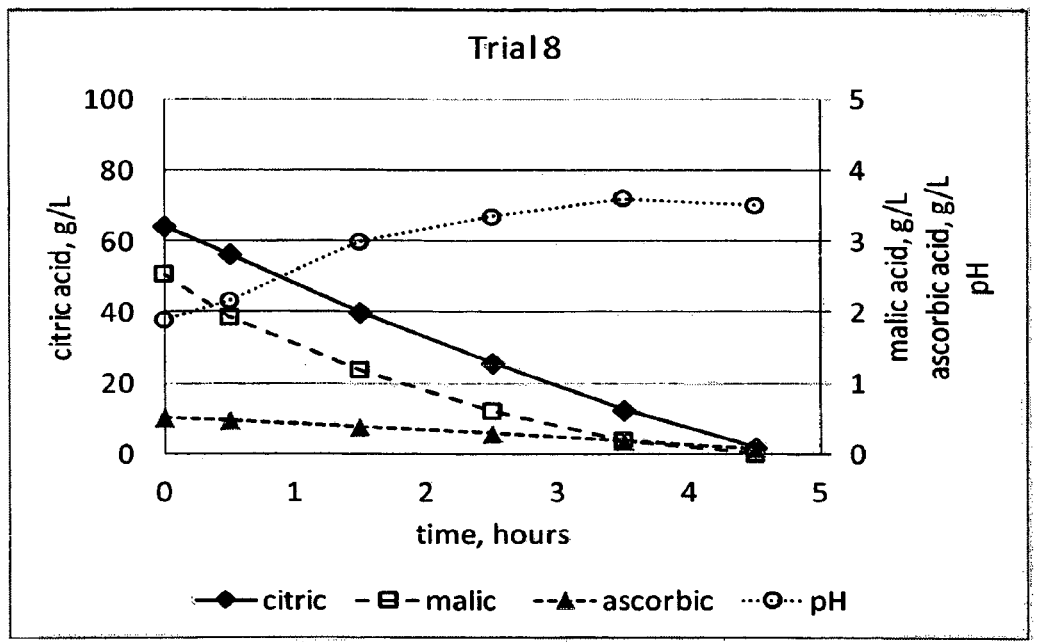
FIG. 3 shows the concentration of citric acid, malic acid and ascorbic acid in lemon juice during REED treatment over time. Panel A) shows treatment for 4.5 h, whereas panel B) shows treatment for 3.5 h.
Figure 3:
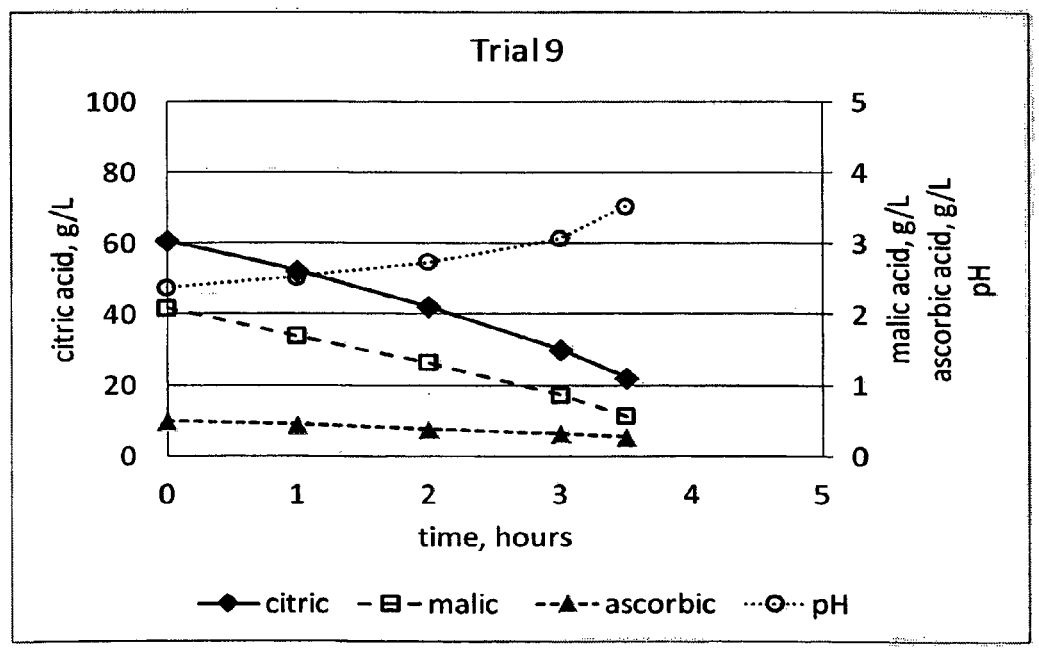

Lemon juice was obtained by squeezing fresh lemons. In two separate experiments, 25 L juice was recirculated, at 25° C., through the REED equipment, set up with Fumatech FAB/Nafion N117 AX-membranes and Nafion N117/Fumatech FAB CX-membranes. The AX-REED and the CX-REED membrane stack were connected in parallel and operated in a manner, so that pH never exceeded approx. 3.5. An overview of the REED equipment is shown in FIG. 1. In both trials, a gradual decrease of organic acids was observed. In Trial 8, the treatment was allowed to proceed for 4.5 hours. This reduced the contents of organic acids to very low levels (FIG. 3A) and demonstrated the efficiency of the process, but the lack of acidity made the resulting liquid rather bland. In Trial 9, the treatment was terminated after 3.5 hours (FIG. 3B). The resulting liquid from this trial had an acidity comparable to fresh orange juice and a mild sweetness. The REED treatment reduced the contents of both citric, malic, and ascorbic acid. However, while only about a third of the citric acid and malic acid remained after treatment for 3.5 hours, more than half of the original content of ascorbic acid, important for its vitamin function, was left in the REED liquid from Trial 9 (table 4).

TABLE 4

|  | Citric acid g/L | Malic acid g/L | Ascorbic acid g/L | pH |
|---|---|---|---|---|
| Orange, fresh | 24 | 0.93 | 0.42 | 3.54 |
| Lemon, fresh | 61 | 2.08 | 0.49 | 2.37 |
| Lemon, after REED | 22 | 0.57 | 0.27 | 3.52 |

Example 6

Rosehips are well-known in the Scandinavian countries and Russia for their content of ascorbic acid (vitamin C) and other antioxidants. However, rosehips also contain citric acid, and extracts are therefore rather acidic and unpalatable. The present invention provides methods for reducing the acidity of rosehip extracts, to produce palatable liquids which retain a high content of vitamins and antioxidants.

An extract of rosehips was prepared by heating 20 L water to 50° C. and adding 4 kg of dried, milled rosehips. After dispersing the rosehip chips by shaking, the mixture was left at 50° C., with occasional stirring. One hour after mixing, a commercial pectinase preparation, high in arabanase activity, was added, and the mixture was left for further 16 hours at 50° C. The rosehip chips were then removed by filtration and sparged with additional water. After combining the first filtrate with sparged liquid, a total of 22 L liquid was obtained. The extract was dark reddish-brown, acidic, and very astringent.

The 22-L batch of rosehip extract was recirculated, at 25° C., through the REED equipment, set up with Fumatech FAB/Nafion N117 AX-membranes and Nafion N117/Fumatech FAB CX-membranes. The AX-REED and the CX-REED membrane stacks were connected in parallel. An overview of the REED equipment is shown in FIG. 1. After approx. 2 hours, the treatment was terminated. When tasted, the acidity of the resulting liquid was found to be significantly reduced, but some astringency remained. Chemical analysis, by HPLC, showed that the content of citric acid had been reduced by 50% by the short REED treatment, from 1.34 g/L in the crude rosehip extract to 0.65 g/L after REED treatment. Other organic acids were generally reduced to the same extent (table 5).

In order to reduce astringency, a commercial preparation of PVPP (polyvinyl-polypyrrolidone, routinely used in beer manufacturing to reduce the content of polyphenols in beer) was added and left in contact with the REED product at 5° C. for 16 hours. PVPP was then removed by filtration. The resulting liquid was still dark reddish-brown, but with moderate acidity and astringency. The antioxidant activity, measured by the ORAC-method essentially as described in Dávalos et al., 2004, (vide supra), was still very high (table 5).

TABLE 5

| Organic acids (mg/L): | Crude rosehip extract | After REED treatment | After REED + PVPP |
|---|---|---|---|
| Tartaric | 0 | 0 | n.d. |
| Malic | 211 | 101 | n.d. |
| Ascorbic | 32 | 30 | n.d. |
| Lactic | 129 | 89 | n.d. |
| Acetic | 95 | 0 | n.d. |
| Citric | 1335 | 652 | n.d. |
| Succinic | 59 | 37 | n.d. |
| Propionic | 0 | 0 | n.d. |
| Antioxidant activity (troiox-eq./mL) | n.d. | n.d. | 120 |

Example 7

An extract of blackcurrants was prepared by blending frozen berries with an equal weight of water, followed by removal of pulp by centrifugation. The resulting liquid was rather acidic in taste.

An extract of sea buckthorne was also prepared by blending frozen berries with an equal weight of water, followed by removal of pulp by centrifugation.

The berry extracts were each treated in a REED equipment for 2.5-3 hours using a "feed-and-bleed" set-up, where only a part of the total volume of juice (generally 7-8 L) was initially fed into the REED equipment and deacidified. Then a small volume was then taken out via a pump and replaced with fresh untreated juice, and this was continued until all the juice had been treated. The REED equipment was set up with Ionics/Nafion AX membranes. The pH was initially raised from the starting pH and up to pH 4 or slightly less, and then pH was maintained almost constant during the remainder of the process by continuously adding fresh berry extract of low pH and removal of acidic ions by AX-REED.

The mineral content in the juices before and after REED treatment is shown in Tables 6 and 7. Before analysis all samples were filtered.

TABLE 6

Starting liquid: frozen sea buckthorne berries blended with water, centrifuged.

| Mineral | SBB: conc. before REED mg/L | SBB: conc. after REED mg/L | SBB: Recovery % |
|---|---|---|---|
| Calcium | 63 | 65 | 104 |
| Magnesium | 43 | 43 | 101 |

TABLE 6-continued

Starting liquid: frozen sea buckthorne berries
blended with water, centrifuged.

| Mineral | SBB: conc. before REED mg/L | SBB: conc. after REED mg/L | SBB: Recovery % |
|---|---|---|---|
| Iron | 1.0 | 0.90 | 88 |
| Silica | 5.6 | 5.4 | 97 |

TABLE 7

Starting liquid: frozen blackcurrants
blended with water, centrifuged.

| Mineral | BC-2: conc. before REED mg/L | BC-2: conc. after REED mg/L | BC-2: recovery % |
|---|---|---|---|
| Calcium | 167 | 152 | 91 |
| Magnesium | 91 | 78 | 86 |
| Iron | 1.1 | 0.92 | 83 |
| Silica | 6.8 | 7.8 | 115 |

Sugar content was determined as described in Example 3, and antioxidant levels were determined essentially as described in Dávalos et al., 2004, (vide supra). The results are shown in table 8.

The REED-treated blackcurrant juice was evaluated by a trained taste panel together with two commercially available blackcurrant beverages, Ribena "classic" (sweetened with sugar) and Ribena "light" (sweetened with artificial sweeteners). The taste panel accorded a total flavor score to the three beverages using a scale from 0 to 9, where 0 designates an undrinkable product and 9 an extremely pleasant product. Furthermore sugar content, and antioxidant content was determined. The results are shown in Table 8.

The REED-treated black currant juice was less sweet and somewhat more acidic than the two commercial products. However, the REED product scored higher in fruity/estery aroma and in fruit/berry taste, and scored less in artificial taste. Total flavour score for the REED product was almost the same as for Ribena "classic" and Ribena "light".

TABLE 8

Comparison of REED-treated blackcurrant juice
with commercial blackcurrant beverages.

|  | Blackcurrant juice after REED | Ribena "classic" | Ribena "light" |
|---|---|---|---|
| Blackcurrant juice in RTD | 50% | 5% | 7% |
| Sugars, g/100 mL | 4.8 | 10.5 | 0.5 |
| Other Sweeteners | none | None | aspartame, acesulfame K |
| kcal/100 mL | 20 | 44 | 3 |
| Added vitamin C | no | Yes | Yes |
| Antioxidants, oracs/100 mL | 2000 | 400 | 350 |
| Total flavor score | 5.9 | 6.0 | 6.2 |

Example 7

Glucose worts were prepared essentially as described in Example 4 and subjected to REED fermentation also essentially as described in Example 4 with the following amendments. No lactic acid was added to the glucose wort and only 200 g KOH. In trial 40 the fermentation was terminated after 22.5 hours. In trial 54 the fermentation was terminated after 24.5 hours, when the glucose level was approx. 40 g/L. In trial 55 the fermentation was terminated after 50 hours, when the glucose level was 5 g/L. In the individual trials the mineral content of the glucose wort and of the products of the REED fermentations (REED liquids) were determined and the percent recovery calculated. The results are shown in Table 9. As can be seen, the level of both calcium, magnesium and iron is maintained after REED fermentation for up to 50 hours.

TABLE 9

Percent mineral recovery after REED fermentation

| | recovery, % | | |
|---|---|---|---|
| trial no. | Ca | Mg | Fe |
| 40 | 96 | 69 | 95 |
| 54 | 92 | 68 | 91 |
| 55 | 116 | 82 | 109 |

Example 8

In order to establish a pleasant balance between sweetness and acidity in a beverage, a REED-assisted fermentation was made, where glucose wort, prepared essentially as described in Example 4 was fermented with *Lactococcus lactis* in the REED equipment essentially as described in Example 4 except for the following amendments. No lactic acid was added to the glucose wort and only 200 g KOH. The fermentation was carried out until the glucose content in the resulting liquid (the REED liquid) was very low, ca. 2 g/L, and the lactic acid content was ca. 5 g/L. The liquid also contained minor amounts of fructose (<1 g/L), sucrose (ca. 3 g/L), maltose (ca. 2 g/L), and maltotriose (<1 g/L). Thus, the total sugar content of the resulting base was approx. 7 g/L. This base had a neutral flavor.

Three beverages, differing in sweetness but otherwise practically identical, were prepared from the base by adding glucose to obtain final concentrations of 22, 37, and 52 g/L. In order to flavor the beverages, hop-pellets were added at a dose of 2 g/L and left in the liquids for 24 hours at 5-8° C. The hop pellets were then removed, and the beverages were carbonized.

Figure 5:
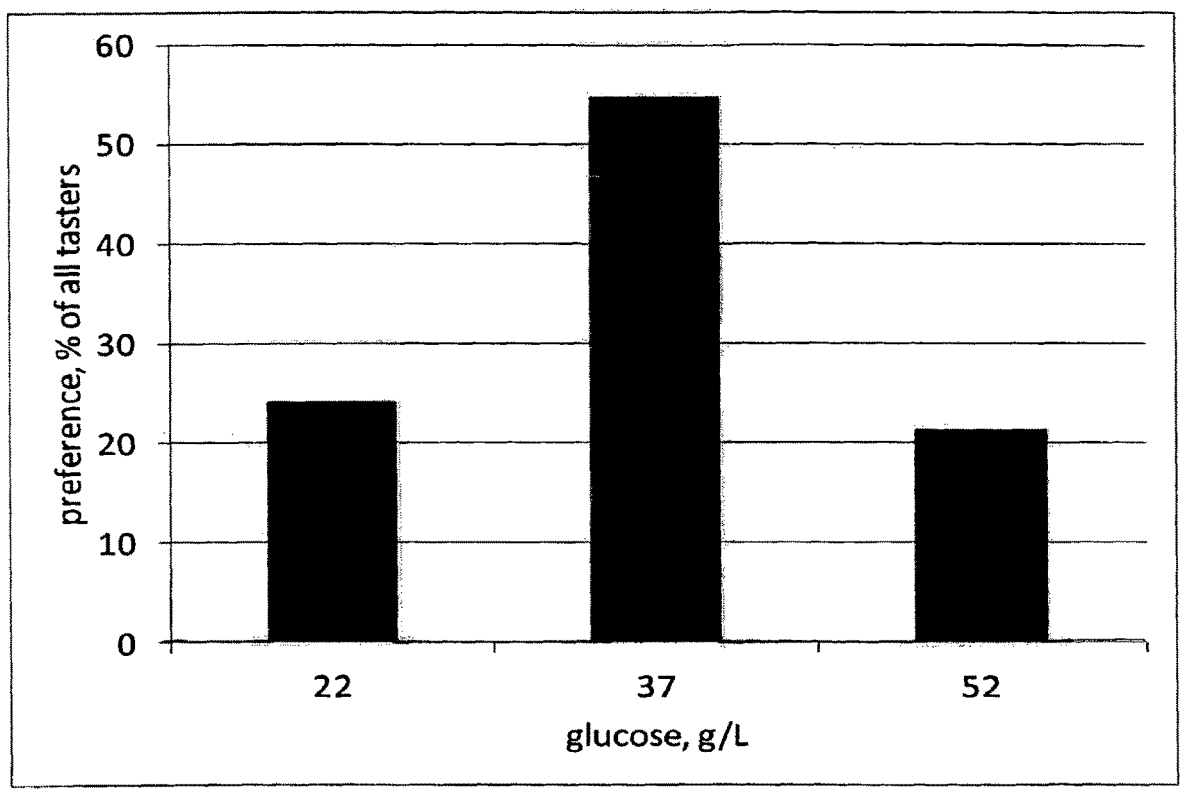
FIG. 5 shows the preference for beverages with either 22 g/L, 37 g/L or 52 g/L of glucose in a test panel of 75 persons. There is a clear preference for the beverage containing 37 g/L.

The three beverages were then tasted by a total of 75 persons. 34 persons were women, and 41 were men; 33 were aged 20-40, and 42 were aged 41-65. At the tasting session, all three samples were served at the same time to each person. The participants were asked to evaluate the three beverages as "non-alcoholic hop-flavoured softdrinks for adults", informed about the glucose content of the beverages, and then asked to select their favorite. This survey showed a very clear preference for the beverage with a glucose content of 37 g/L. 41 persons preferred 37 g/L, while 18 preferred 22 g/L and 16 preferred 57 g/L. This preference was not significantly influenced by age or gender. The results are shown in FIG. 5.

The three beverages were also evaluated by a taste panel trained in beer evaluation. The panelists were asked to score "beer flavour attributes" on a scale from 0-5, where 0 indicates absence of a flavour and 5 a very intense flavour. The panelists were also asked to assign a total flavour score for each beverage on a scale from 0-9, where 0 is undrinkable and 9 is excellent. The panel gave almost equal scores for glucose 22 g/L and 37 g/L, but glucose 52 g/L was judged as markedly oversweet. The beverages with 22 g/L and 37 g/L sugar were also considered significantly better in the total flavour test. Thus total flavour scores for 22, 37, and 52 g/L glucose were 6.0, 6.1 and 5.5, respectively.

Example 9

This examples demonstrates the particularly pleasant taste of a beverage prepared by REED-assisted bacterial fermentation of glucose wort. Glucose wort, prepared essentially as described in example 4, was fermented with *Lactococcus lactis* in REED equipment essentially as described in Example 4, except that the fermentation was interrupted when the glucose content in the liquid was ca. 37 g/L, the lactic acid content was 6.7 g/L, and pH was 4.35. Also no lactic acid was added to the glucose wort and only 200 g KOH. The liquid also contained minor amounts of fructose (<1 g/L), sucrose (ca. 3 g/L), maltose (ca. 3 g/L), and maltotriose (<1 g/L). This base had a mild sweetness and a mild acidity. In order to flavour the liquid, hop pellets were added at a dose of 2 g/L and left in the liquid for 24 hours at 5-8° C. The hop pellets were then removed, and the liquid was carbonized. This beverage was called Beverage A.

Another beverage was prepared from glucose wort, prepared essentially as described in example 4 To obtain pH, sweetness, and acidity comparable to the REED-based beverage, the glucose wort was diluted with water, and a mixture of lactic acid and calcium lactate was added. The blend was then flavoured with hop pellets as described above and finally carbonized. This beverage was called Beverage B.

The two beverages were compared by taste panels trained in beer evaluation. The panelists were presented with a glass of each beverage and asked to score "beer flavour attributes" for each of the two beverages on a scale from 0-5, where 0 designates absence of a specific flavour and 5 designates a very intense flavour. Finally, the panelists were asked to give a total flavour score for each beverage on a scale from 0-9, where 0 is undrinkable and 9 is excellent.

Table 10 shows the contents of fermentable sugars and organic acids in Beverage A and Beverage B. It is evident that the two beverages contain practically the same total amounts of fermentable sugars and organic acids. However, due to the natural content of tartaric, malic, acetic, citric, and succinic acid in wort, the acid compositions of the two beverages are not completely identical.

Figure 6:
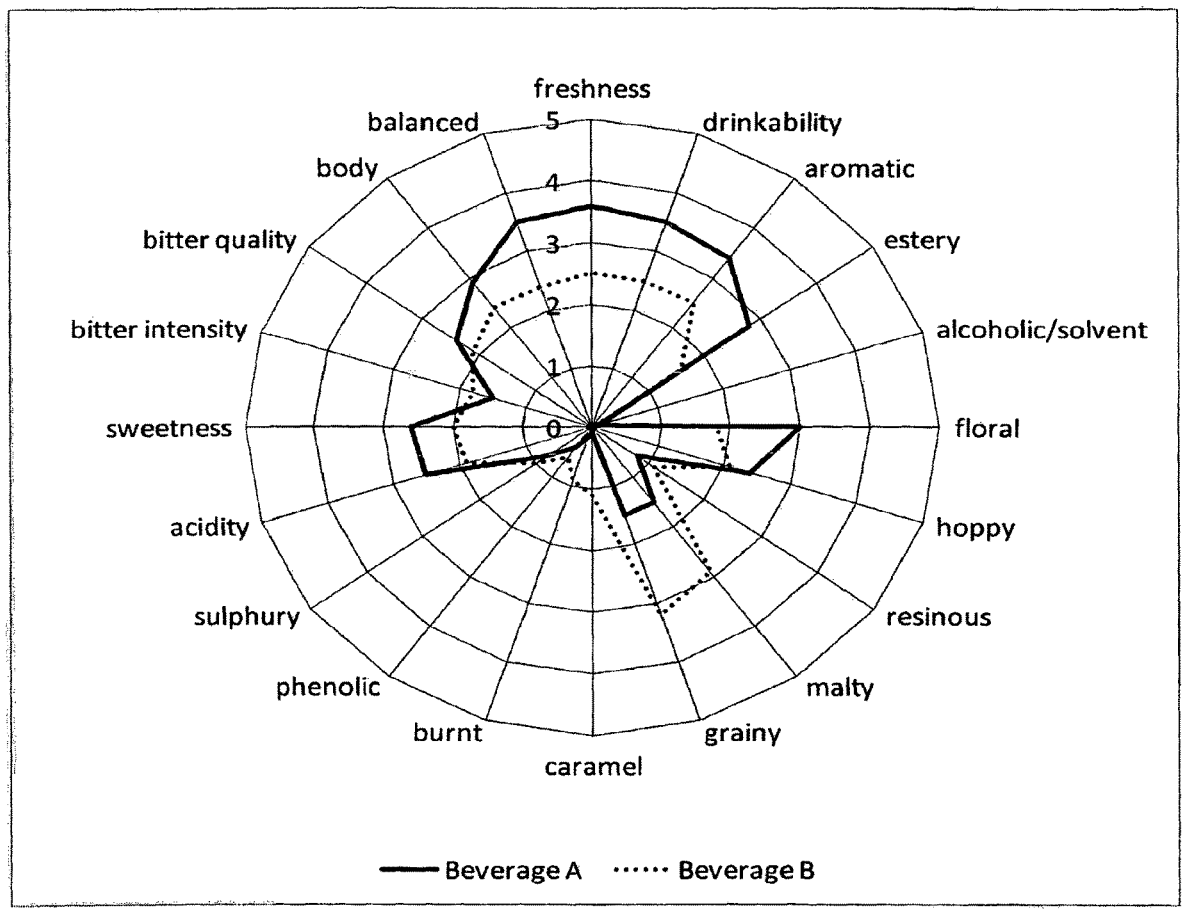
FIG. 6 shows beer flavour profiles for Beverage A and Beverage B as evaluated by a trained taste panel. Full line: Beverage A (REED-based).

FIG. 6 shows the beverage flavour profiles. Beverage A scored significantly higher than Beverage B in freshness, drinkability, aromatic, estery, floral, and balance. The perceived sweetness and acidity of Beverage A was also somewhat higher than that of Beverage B. In contrast, Beverage B scored higher in less desirable flavours such as malty, grainy, caramel, and burnt than Beverage A. The total flavour score for Beverage A was 7.1, which is significantly higher than the total flavour score for Beverage B, which was 5.9.

Furthermore, a taste panel of 19 were presented with the beverages in a triangular test. In triangular tests each panelist is presented with 3 samples, two of which are identical. All 19 were able to identify, which samples were identical, thus demonstrating a significant difference in taste of beverage A and B. 13 of the panelist identified beverage A as the preferred beverage and 1 found beverage A and B equally good.

TABLE 10

Composition of Beverage A and Beverage B.

| | | Beverage A | Beverage B |
|---|---|---|---|
| Fermentable sugars (g/L) | Glucose | 36.9 | 38.9 |
| | Fructose | 0.6 | 0.7 |
| | Sucrose | 2.7 | 1.2 |
| | Maltose | 3.0 | 1.8 |
| | Maltotriose | 0 | 0 |
| | Total fermentable sugars | 43.3 | 42.6 |
| Organic acids (g/L) | Tartaric | 0 | 0.2 |
| | Malic | 0 | 0.1 |
| | Lactic | 6.7 | 5.8 |
| | Acetic | 0 | 0.3 |

TABLE 10-continued

Composition of Beverage A and Beverage B.

| | Beverage A | Beverage B |
|---|---|---|
| Citric | 0 | 0.1 |
| Succinic | 0 | 0.4 |
| Total organic acids | 6.7 | 6.9 |
| pH | 4.35 | 4.35 |

Example 10

50 L glucose wort prepared essentially as described in Example 4 was transferred to the tank of a REED equipment (corresponding to 4 on FIG. 4). The REED equipment was set up with Ionics AR103/Nafion N117 AX-membranes and Nafion N117/Fumatech FAB CX-membranes. The AX-REED and the CX-REED membrane stack were connected in parallel. An enzyme preparation containing both glucose oxidase and catalase activity was added to the glucose wort at a dose of 2 g/L. In order to oxygenate the wort, oxygen enriched air (approx. 52% oxygen) was bubbled through the wort by means of a gas diffuser attached to a tube. The tube with the diffuser was inserted into the tank via a venting hole at the top of the tank and the length of the tube was adjusted in order to position the diffuser near the bottom of the tank. Throughout the enzymatic treatment, oxygen was supplied via the gas diffuser.

The experiment was repeated twice—the individual experiments are herein named trial 48 and trial 49. In trial 48, the enzymatic treatment and REED treatment was run for 21.5 hours at 30° C. In trial 49, the enzymatic treatment and REED treatment was run for 23 hours at 13° C. Calcium lactate was added at the start of trial 49 in order to increase the calcium content in the REED liquid. A high calcium content is desirable from a nutritional point of view.

Vitamin content and mineral content was determined in the glucose wort and in the product obtained after the enzymatic treatment. The results are shown in Tables 11 and 12. The Ca-recovery was not calculated for trial no. 49, because Ca-lactate was deliberately added at the start of the process.

TABLE 11

B1 and B2 vitamins in trial 48

| | B1, thiamine | B2, riboflavin |
|---|---|---|
| Start of process (glucose wort) | 392 µg/L | 217 µg/L |
| End of process (liquid after enzymatic treatment) | 294 µg/L | 171 µg/L |
| Recovery | 75% | 79% |

TABLE 12

| | recovery, % | | |
|---|---|---|---|
| trial no. | Ca | Mg | Fe |
| 48 | 122 | 89 | 151 |
| 49 | — | 99 | 129 |

Example 11

210 kg Spanish lemons (cultivar Verna) were cut in halves and squeezed to obtain lemon juice. Pulp and pits were removed by filtration through fine-meshed sieves, and finer sediments were then removed by centrifugation at 3000×G for 10 minutes. A total of about 54 L juice was obtained. The taste of this juice was very acidic; the citric acid content was 57 g/L, pH was 2.8, and conductivity was 4.8 mS/cm². In order to improve the taste of the juice, two trials were carried out where most of the citric acid content was removed by treatment in a REED equipment. The REED equipment used for this purpose was set up with Ionics AR103/Nafion N117 AX-membranes and Nafion N117/Fumatech FAB CX-membranes. In one trial (trial 59), the lemon juice was first subjected to AX-REED only followed by CX-REED only. Thus, the AX-REED and the CX-REED were performed in series one after the other. In another trial (trial 60), the lemon juice was first subjected to AX-REED, and subsequently the AX-REED and CX-REED were then run in parallel.

In trial 59, 25 L juice was transferred to a tank connected with the REED rig, and the AX-REED was started. Citrate was gradually removed from the liquid, and pH rose. After about 6.25 hours, pH was 4.5. An aliquot of the liquid removed for tasting seemed somewhat acidic, but rather bland and somewhat salty. The AX-REED was now stopped, and the CX-REED started. During this step, both pH and conductivity decreased. After approx. 0.75 hours, pH was 3.5, and the conductivity was 3.5 mS/cm². The CX-process was then stopped, and the liquid was collected for tasting and analyses. In order to arrive at comparable pH and conductivity in both trial 59 and 60, then it was required that the AX-REED was performed until a higher pH was reached than the desired end pH, because during CX-REED the pH falls. The pH profile during the experiment is shown in FIG. 7A.

In trial 60, another 25 L juice was transferred to a tank connected with the REED rig, and the AX-REED was started. As in trial 59, citrate was gradually removed from the liquid, and pH rose. After approx. 5.5 hours, pH was 3.5. An aliquot of the liquid removed for tasting still seemed quite acidic and somewhat salty. The AX-REED was continued, but the CX-REED was now also started. The two processes were allowed to run in parallel for approx. 2.5 hours. Throughout this period, citrate was still gradually removed, and the conductivity was gradually decreased to 3.5 mS/cm², but pH was kept at approx. 3.5 throughout this step. Both the AX REED and the CX REED were then stopped, and the liquid was collected for tasting and analyses. In this process the AX-REED is allowed to run until the desired end pH is achieved, and then this pH is maintained by running AX-REED and CX-REED in parallel. The pH profile is shown in FIG. 7B.

Vitamin C content in the starting juice and in the final products was determined. Limonene, the dominating aroma compound in citrus fruits, was also determined. Analytical data for the lemon juice before processing and the final juices obtained from trial 59 and trial 60 are shown in table 13.

The juices obtained from the two trials were evaluated by trained tasters in triangular tests. In these tests, each of 19 panelists was presented with a sample set composed of two samples of one of the juices together with one sample of the other. The panelists were asked to identify the two identical samples in the set and then to select their preference, either the two identical samples or the single sample. Results are shown in table 14. Preference data are only shown for the 15 panelists who had the correct combination of samples. There was a significant difference between the juices, and clear and statistical significant preference for juice from trial 60, where the AX-REED and the CX-REED were run in parallel during the last part of the process, and pH was kept constant at approx. 3.5.

TABLE 13

Analytical data for fresh lemon juice and juices after REED treatment.

|  | Freshly squeezed lemon juice | Juice from trial 59 | Juice from trial 60 |
|---|---|---|---|
| Citric acid | 57 g/L | 9 g/L | 9 g/L |
| pH | 2.8 | 3.5 | 3.5 |
| Conductivity (mS/cm²) | 4.8 | 3.5 | 3.5 |
| Vitamin C, | 380 mg/L | 140 mg/L | 180 mg/L |
| Vitamin C, % recovery |  | 37% | 47% |
| Limonene | 370 mg/L | 208 mg/L | 351 mg/L |
| Limonene, % recovery |  | 56% | 95% |

TABLE 14

Triangular tests performed on REED-treated lemon juices from trial 1 and trial 2.

|  | Number of panellists |
|---|---|
| Total number | 19 |
| Correct combination | 15 |
| Incorrect combination | 4 |
| Preference for juice from trial 59 | 4 |
| Preference for juice from trial 60 | 10 |
| No preference | 1 |

Example 12

Apple juice prepared from concentrate was purchased at a local grocery store. The apple juice was subjected to a REED fermentation essentially as described in Example 4; however, with the following amendments: 52 L apple juice was used instead of glucose wort, 170 g 46% potassium hydroxide was added at the start of fermentation in order to increase pH to 4.5, fermentation temperature was 30° C., and the REED fermentation was terminated after 45 hours. The resulting liquid is also referred to as REED liquid.

The sugar content in apple juice and in the REED liquid were determined as described in Example 3 and the results are shown in Table 15. Results for organic acids in the REED liquid, determined as described in Example 3, are also included in Table 15. According to Eisele and Drake (2005), Journal of Food Composition and Analysis 18: 213-221, the malic acid content in apple juice is in the range 1.9-17.4 g/L, with an average of 8.5 g/L; the contents of other organic acids are typically <1 g/L. It is evident that the REED liquid is reduced in sugar content, and the contents of organic acids differ from typical contents in apple juice.

TABLE 15

|  | Apple juice | REED liquid |
|---|---|---|
| Glucose, g/L | 23.8 | 11.5 |
| Fructose, g/L | 58.7 | 35.4 |
| Sucrose, g/L | 12.7 | 10.9 |
| Total fermentable sugars, g/L | 95.2 | 57.8 |
| Malic acid, g/L | n.d | 0.6 |
| Lactic acid, g/L | n.d | 2.1 |
| pH | 3.4 | 3.8 |

The invention claimed is:

1. A method of preparing a beverage, wherein the method comprises
a) providing a starting liquid comprising at least one micro-nutrient and at least one organic acid; and
b) removing at least some anions of the at least one organic acid from the starting liquid,
wherein said anions are removed through an Anion Exchange Reverse Electro-Enhanced Dialysis (AX-REED) membrane stack, said membrane stack comprising:
i) at least one cell consisting of:
a. two anion exchange membranes defining a chamber for the starting liquid; and
b. two further chambers for a dialysis liquid, wherein said two further chambers are positioned adjacent to the chamber for the starting liquid on opposing sides and wherein said two further chambers may be connected to each other,
ii) a set of end membranes,
iii) means for applying an electric field over the membrane stack by means of at least two electrodes, and
iv) means for reversing the direction of the electric field within said membrane stack;
and wherein the removal comprises:
I. inserting the starting liquid into the chamber for the starting liquid;
II. inserting a dialysis liquid in the two further chambers for the dialysis liquid;
III. applying an electric field over the membrane stack; and
IV. incubating said starting liquid in said chamber, whereby the direction of electric field is reversed at intervals, thereby obtaining a partly AX-REED treated liquid; and
c) removing at least some cations from the starting liquid or from partly AX-REED treated liquid, thereby obtaining a REED liquid, wherein said cations are removed through a Cation Exchange Reverse Electro-Enhanced Dialysis (CX-REED) membrane stack, said membrane stack comprising:
i) at least one cell consisting of:
a. two cation exchange membranes defining a chamber for the starting liquid or the partly AX-REED treated liquid; and
b. two further chambers for a second dialysis liquid, wherein said two further chambers are positioned adjacent to the chamber for the starting liquid or the partly AX-REED treated liquid on opposing sides and wherein said two further chamber may be connected to each other,
ii) a set of end membranes,
iii) means for applying an electric field over the membrane stack by means of at least two electrodes, and
iv) means for reversing the direction of the electric field within said membrane stack;
and wherein the cation removal comprises:
I. inserting the starting liquid or the partly AX-REED treated liquid into the chamber for the starting liquid or the partly AX-REED treated liquid;
II. inserting a second dialysis liquid in the two further chambers for the second dialysis liquid;
III. applying an electric field over the membrane stack; and
IV. incubating said starting liquid or said partly AX-REED treated liquid in said chamber, whereby the direction of electric field is reversed at intervals;
wherein steps b) and c) are performed simultaneously,
wherein step b) is performed within the AX-REED equipment,
wherein the AX-REED membrane stack and the CX-REED membrane stack are connected to a tank, and the AX-REED receives starting liquid from the tank and said starting liquid is returned to the tank after being treated in the AX-REED stack, and the CX-REED membrane stack receives starting liquid or partly AX-REED treated liquid from the tank and said liquid is returned to the tank after being treated in the CX-REED stack,
wherein at least 65% of the at least one micro-nutrient is retained in the REED liquid, and
wherein the REED liquid is the beverage or may be further processed to obtain the beverage.

2. The method according to claim 1, wherein the starting liquid comprises a fruit juice, a citrus fruit juice, a fermented fruit juice, a fermented apple juice, a fermented pear juice, and/or an aqueous extract of a fruit.

3. The method according to claim 1, wherein the starting liquid comprises vitamin C, and the REED liquid comprises at least 40% of the vitamin C contained in the starting liquid.

4. The method according to claim 1, wherein the starting liquid comprises at least one micro-nutrient, at least one aroma compound and at least one sugar; and
wherein the REED liquid retains at least 65% of said at least one aroma compound present in the starting liquid.

5. The method according to claim 4, wherein the starting liquid comprises at least two aroma compounds, and wherein the REED liquid retains at least 80% of the at least two aroma compounds present in the starting liquid.

6. The method according to claim 4, wherein at the least one aroma compound comprises an ester, a terpene or a terpenoid.

7. The method according to claim 1, wherein the organic acid is selected from the group consisting of lactic acid, citric acid, malic acid, tartaric acid, acetic acid, succinic acid, isocitric acid, α-ketoglutaric acid, fumaric acid and oxaloacetic acid.

8. The method according to claim 1, wherein the beverage has a ratio of sugar to organic acid in the range of 6:1 to 10:1.

9. The method according to claim 1, wherein the method comprises an additional step f) and/or an additional step g), wherein step f) comprises adding one or more additional compounds to the starting liquid of step a), to the partly AX-REED treated liquid, to the REED liquid and/or to the beverage; and wherein step g) comprises adding one or more additional liquids to the starting liquid, to the partly AX-REED treated liquid, to the REED liquid and/or to the beverage.

10. The method according to claim 9, wherein the method comprises additional step g) and wherein the one or more additional liquids comprise beer.

11. The method according to claim 1, wherein the method further comprises a step h) of incubating the partly AX-REED treated liquid, the REED liquid and/or the beverage with one or more micro-organisms.

12. The method according to claim 11, wherein the one or more microorganisms comprise yeast.

13. The method according to claim 1, wherein steps b) and c) are repeated more than once.

14. The method according to claim 1, wherein step b) comprises removing at least 30% of anions of at least one organic acid from the starting liquid.

15. The method according to claim 1, wherein step c) comprises removing at least one cation until a conductivity of at the most 7 mS/cm is achieved.

16. The method according to claim 1, wherein step b) comprises:
- I. inserting the starting liquid into the chamber for the starting liquid;
- II. inserting a dialysis liquid in the two further chambers for the dialysis liquid;
- III. applying an electric field over the membrane stack;
- IV. incubating said starting liquid in said chamber whereby the direction of electric field is reversed at intervals, thereby obtaining a partly AX-REED treated liquid;
- V. circulating the partly AX-REED treated liquid to a tank;
- VI. inserting the partly AX-REED treated liquid into the chamber for the starting liquid;
- VII. applying an electric field over the membrane stack;
- VIII. incubating said partly AX-REED treated liquid in said chamber, whereby the direction of electric field is reversed at intervals; and
- IX. optionally repeating steps VI. to VIII.

17. The method according to claim 1, wherein step c) comprises:
- I. inserting the starting liquid or the partly AX-REED treated liquid into the chamber for the starting liquid or the partly AX-REED treated liquid;
- II. inserting a second dialysis liquid in the two further chambers for the second dialysis liquid;
- III. applying an electric field over the membrane stack;
- IV. incubating said starting liquid or the partly AX-REED treated liquid in said chamber, whereby the direction of electric field is reversed at intervals, thereby obtaining a partly CX-REED treated liquid;
- V. circulating the partly CX-REED treated liquid to a tank;
- VI. inserting the partly CX-REED treated liquid into the chamber for the starting liquid or the partly AX-REED treated liquid;
- VII. applying an electric field over the membrane stack;
- VIII. incubating said partly CX-REED treated liquid in said chamber, whereby the direction of electric field is reversed at intervals; and
- IX. optionally repeating steps VI. to VIII.

18. The method according to claim 1, wherein the starting liquid comprises at the most 10% sugar.

19. The method according to claim 18, wherein the sugar is selected from the group consisting of fructose, maltose, lactose, sucrose and glucose.

20. The method according to claim 1, wherein the method further comprises a step i) of adding $CO_2$, thereby obtaining a carbonated beverage.

* * * * *